United States Patent
Choi et al.

(10) Patent No.: US 11,412,465 B2
(45) Date of Patent: Aug. 9, 2022

(54) METHOD AND APPARATUS FOR COMMUNICATION IN MOBILE COMMUNICATION SYSTEM

(71) Applicant: Samsung Electronics Co., Ltd., Gyeonggi-do (KR)

(72) Inventors: Seunghoon Choi, Gyeonggi-do (KR); Yongjun Kwak, Gyeonggi-do (KR); Donghan Kim, Gyeonggi-do (KR); Youngbum Kim, Seoul (KR); Taehyoung Kim, Seoul (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/347,418

(22) PCT Filed: Nov. 3, 2017

(86) PCT No.: PCT/KR2017/012432
§ 371 (c)(1),
(2) Date: May 3, 2019

(87) PCT Pub. No.: WO2018/084647
PCT Pub. Date: May 11, 2018

(65) Prior Publication Data
US 2019/0281610 A1    Sep. 12, 2019

(30) Foreign Application Priority Data
Nov. 3, 2016    (KR) .................. 10-2016-0146075

(51) Int. Cl.
*H04W 56/00*    (2009.01)
*H04L 5/14*    (2006.01)
(Continued)

(52) U.S. Cl.
CPC .......... *H04W 56/001* (2013.01); *H04W 4/06* (2013.01); *H04W 72/0446* (2013.01);
(Continued)

(58) Field of Classification Search
CPC ........... H04W 56/001; H04W 72/0426; H04W 72/0446; H04W 72/0453; H04W 72/06;
(Continued)

(56) References Cited

U.S. PATENT DOCUMENTS

| | | | |
|---|---|---|---|
| 2010/0124184 A1* | 5/2010 | Dayal | H04W 16/14 370/280 |
| 2010/0227622 A1* | 9/2010 | Mody | H04W 16/10 455/452.1 |

(Continued)

FOREIGN PATENT DOCUMENTS

KR    1020170126376    11/2017

OTHER PUBLICATIONS

Samsung; "Co-existence of LTE and NR"; 3GPP TSG RAN WG1 #85 Nanjing, China, May 23-27, 2016 R1-164020 (Year: 2016).*

(Continued)

*Primary Examiner* — Gary Mui
(74) *Attorney, Agent, or Firm* — The Farrell Law Firm, P.C.

(57) ABSTRACT

The present disclosure relates to a 5G or pre-5G communication system for supporting a higher data rate than a 4G communication system such as LTE. According to an embodiment of the present invention, a method for a first base station in a first communication system comprises the steps of: identifying information related to a resource which can be used by a second base station in a second communication system; generating a message including the information related to the resource which can be used by the second base station; and transmitting the signal to the second base station.

12 Claims, 35 Drawing Sheets

(51) Int. Cl.
*H04W 4/06* (2009.01)
*H04W 72/04* (2009.01)
*H04W 72/12* (2009.01)

(52) U.S. Cl.
CPC ... *H04W 72/0453* (2013.01); *H04W 72/1278* (2013.01); *H04L 5/1469* (2013.01); *H04W 72/0426* (2013.01); *H04W 72/1215* (2013.01)

(58) Field of Classification Search
CPC ... H04W 72/1278; H04L 5/001; H04L 5/0035
See application file for complete search history.

(56) References Cited

U.S. PATENT DOCUMENTS

| | | | |
|---|---|---|---|
| 2010/0322227 A1* | 12/2010 | Luo | H04W 72/082 370/345 |
| 2011/0032853 A1* | 2/2011 | Moon | H04L 5/1484 370/280 |
| 2011/0032855 A1* | 2/2011 | Kim | H04L 5/0037 370/294 |
| 2011/0249642 A1* | 10/2011 | Song | H04W 28/16 370/329 |
| 2012/0002662 A1 | 1/2012 | Wan et al. | |
| 2014/0064133 A1* | 3/2014 | Kazmi | H04W 24/10 370/252 |
| 2014/0112260 A1* | 4/2014 | Sorrentino | H04W 52/325 370/329 |
| 2014/0302863 A1* | 10/2014 | Chen | H04W 16/10 455/452.1 |
| 2015/0049649 A1* | 2/2015 | Zhu | H04W 52/367 370/277 |
| 2015/0055541 A1* | 2/2015 | Zhang | H04W 72/005 370/312 |
| 2015/0189638 A1* | 7/2015 | Lin | H04W 16/02 370/330 |
| 2015/0349931 A1* | 12/2015 | Damnjanovic | H04W 56/001 370/280 |
| 2016/0095108 A1 | 3/2016 | Ryoo et al. | |
| 2016/0112177 A1* | 4/2016 | Zheng | H04W 72/082 370/330 |
| 2016/0269940 A1* | 9/2016 | Takeda | H04W 24/02 |
| 2016/0316466 A1* | 10/2016 | Liu | H04L 5/0098 |
| 2016/0345224 A1* | 11/2016 | Agyapong | H04W 36/0072 |
| 2017/0064658 A1* | 3/2017 | Yun | H04L 5/1438 |
| 2017/0086076 A1* | 3/2017 | Sadek | H04W 76/28 |
| 2017/0155483 A1* | 6/2017 | Na | H04W 88/08 |
| 2017/0202006 A1* | 7/2017 | Rao | H04W 72/1231 |
| 2017/0257774 A1* | 9/2017 | Ghosh | H04L 5/0048 |
| 2017/0346609 A1* | 11/2017 | Li | H04W 72/10 |
| 2018/0006780 A1* | 1/2018 | Jeon | H04L 5/0035 |
| 2018/0020462 A1* | 1/2018 | Xiong | H04B 7/0417 |
| 2018/0041979 A1* | 2/2018 | Hampel | H04W 72/0413 |
| 2018/0070369 A1* | 3/2018 | Papasakellariou | H04W 16/14 |
| 2018/0084539 A1* | 3/2018 | Kubota | H04W 76/15 |
| 2018/0098293 A1* | 4/2018 | Jiang | H04L 7/041 |
| 2018/0110019 A1* | 4/2018 | Ly | H04L 27/2613 |
| 2018/0123666 A1* | 5/2018 | Chen | H04B 7/0617 |
| 2019/0081842 A1 | 3/2019 | Kim et al. | |
| 2019/0089498 A1* | 3/2019 | Pelletier | H04W 72/042 |
| 2019/0208495 A1* | 7/2019 | Takahashi | H04W 36/0033 |

OTHER PUBLICATIONS

LG Electronics; "On coexistence of NR and LTE"; 3GPP TSG RAN WG1 meeting #86bis Lisbon, Portugal Oct. 10-14, 2016 R1-1609286 (Year: 2016).*
Intel Corporation; "LTE/NR coexistence"; 3GPP TSG RAN WG1 Meeting #86bis Lisbon, Portugal Oct. 10-14, 2016 R1-1609544 (Year: 2016).*
Samsung; "Co-existence scenarios for LTE and NR"; 3GPP TSG-RAN WG2 Meeting #94 Nanjing, China, May 23-27, 2016 R2-163776 (Year: 2016).*
Intel Corporation; Requirements and solutions for LTE/NR coexistence; 3GPP TSG RAN WG1 Meeting #86 Gothenburg, Sweden Aug. 22-26, 2016; R1-166556 (Year: 2016).*
LG Electronics; On coexistence of NR and LTE; 3GPP TSG RAN WG1 meeting #86 Gothenburg, Sweden Aug. 22-26, 2016 ; R1-166924 (Year: 2016).*
PCT/ISA/210 Search Report issued on PCT/KR2017/012432, pp. 5.
PCT/ISA/237 Written Opinion issued on PCT/KR2017/012432, pp. 9.
3GPP TR 38.913 V14.0.0 (Oct. 2016) Technical Report, 3rd Generation Partnership Project; Technical Specification Group Radio Access Network; Study on Scenarios and . . .
Requirements for Next Generation Access Technologies; (Release 14), Copyright 2016, #3GPP Organizational Partners, pp. 40.
AT&T, 3GPP TSG RAN WG1 Meeting #86, R1-166489, Goteborg, Sweden, Aug. 22-26, 2016, NR and LTE Co-Existence, pp. 3.
LG Electronics, 3GPP TSG RAN WG1 meeting #86, R1-166924, Gothenburg, Sweden, Aug. 22-26, 2016, On coexistence of NR and LTE, pp. 3.
Intel Corporation, 3GPP TSG RAN WG1 Meeting #86bis, R1-1609544, Lisbon, Portugal, Oct. 1, 2016, LTE/NR coexistence, p. 6.
LG Electronics, 3GPP TSG RAN WG1 meeting #86bis, R1-1609286, Lisbon, Portugal, Oct. 1, 2016, On coexistence of NR and LTE, pp. 5.
Samsung, 3GPP TSG RAN WG1 #86b, R1-1609137, Lisbon, Portugal, Septmeber 30, 2016, NR-LTE Coexistence, pp. 5.

* cited by examiner

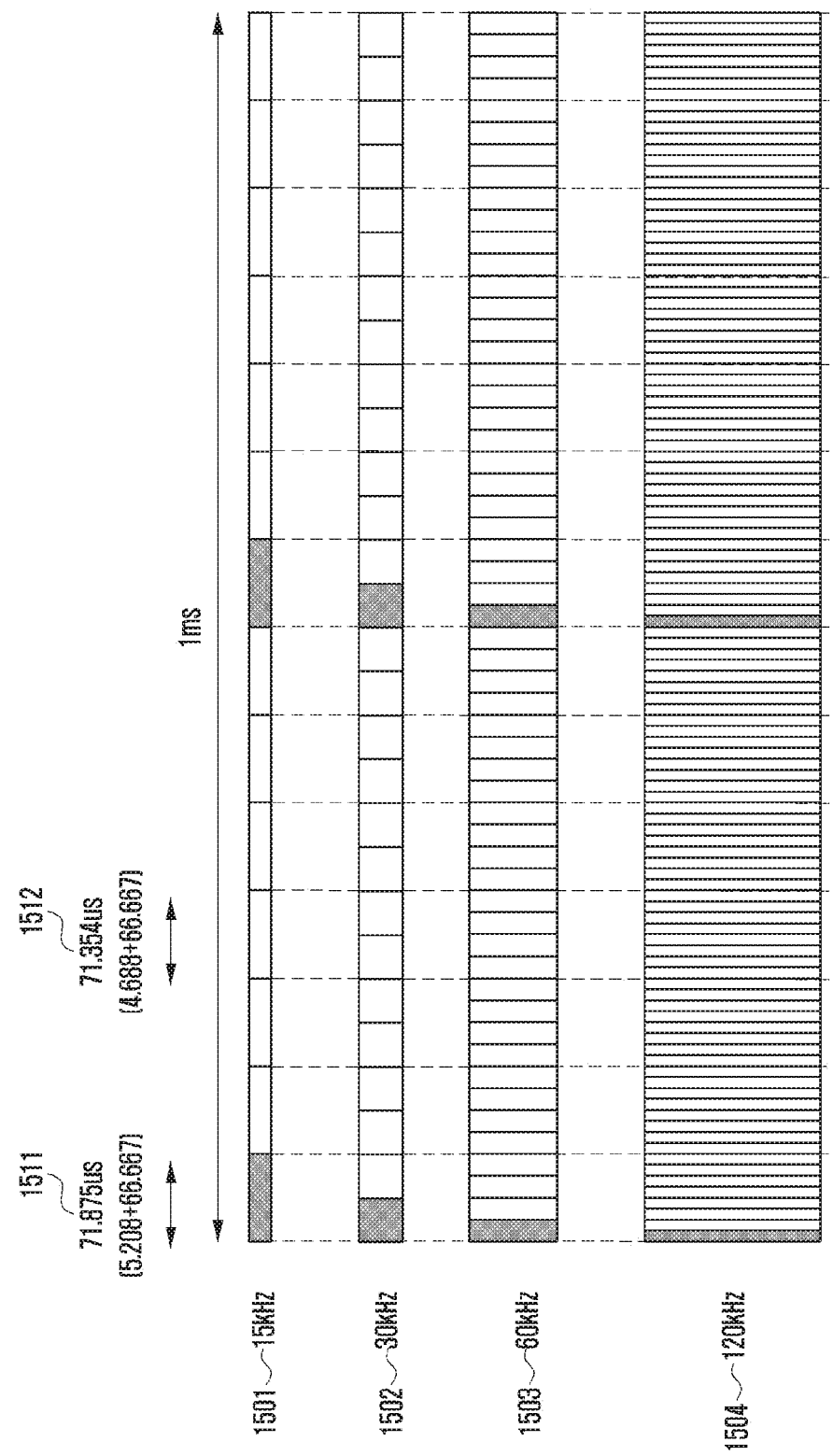

METHOD AND APPARATUS FOR COMMUNICATION IN MOBILE COMMUNICATION SYSTEM

TECHNICAL FIELD

The disclosure relates to a method and apparatus for coexistence of signal transmission of a long-term evolution (LTE) system and signal transmission of a new radio (NR) system in a mobile communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

There is a desire for a method of enabling new 5G communication (also referred to as NR communication in the disclosure) and legacy LTE communication to coexist in the same spectrum in a mobile communication system.

DISCLOSURE OF INVENTION

Technical Problem

Therefore, the disclosure has been made in view of the above-mentioned problems, and an aspect of the disclosure is to provide a method based on an MBSFN subframe, a method based on a UL subframe, a method based on an LAA operation in an unlicensed band, and a method based on cell activation in CA, as a method of enabling LTE and 5G to coexist on at least one carrier, and an apparatus therefor.

Another aspect of the disclosure is to provide a method and apparatus for aligning symbol lengths in frame structures based on various numerologies.

Solution to Problem

In accordance with an aspect of the disclosure, a method of a first base station in a first communication system includes: identifying information related to resources available to a second base station in a second communication system; generating a message including the information related to the resources; and transmitting a signal to the second base station.

In accordance with another aspect of the disclosure, a method of a second base station in a second communication system includes: receiving, from a first base station in a first communication system, a message including information related to resources available to the second base station in the second communication system; and scheduling a terminal based on the message.

In accordance with another aspect of the disclosure, a method of a terminal in a wireless communication system includes: receiving scheduling information determined based on information related to resources available to a second base station in a second communication system; and performing data transmission or reception with the second base station based on the scheduling information, wherein the information related to the resources is transmitted from a base station in a first communication system to the second base station.

In accordance with another aspect of the disclosure, a first base station in a first communication system includes: a transceiver; and a controller configured to identify information related to resources available to a second base station in a second communication system, generate a message including the information related to the resources, and transmit a signal to the second base station.

In accordance with another aspect of the disclosure, a second base station of a second communication system includes: a transceiver; and a controller configured to receive, from a first base station in a first communication system, a message including information related to resources available to the second base station in the second communication system, and schedule a terminal based on the message.

In accordance with another aspect of the disclosure, a terminal in a wireless communication system includes: a transceiver; and a controller configured to receive scheduling information determined based on information related to resources available to a second base station of a second communication system, and perform data transmission or reception with the second base station based on the scheduling information, wherein the information related to the resources is transmitted from a base station of a first communication system to the second base station.

Advantageous Effects of Invention

The disclosure provides a method based on an MBSFN subframe, a method based on a UL subframe, a method based on an LAA operation in an unlicensed band, and a method based on cell activation in CA, as a method of operating LTE and 5G communication systems by enabling them to coexist on one LTE carrier or multiple LTE carriers without introducing an additional carrier for 5G (or NR), and an apparatus therefor.

Also, the disclosure provides a method and apparatus for performing data transmission or reception with each communication system by a terminal that is capable of transmitting or receiving data in at least one of an LTE communication system and a 5G communication system, which are different communication systems. Meanwhile, various other effects will be explicitly or implicitly disclosed in the detailed description in association with the embodiments of the disclosure to be set forth in the following description.

BRIEF DESCRIPTION OF DRAWINGS

FIG. 15 is a diagram illustrating an example of aligning OFDM symbol lengths of frame structures based on various numerologies;

MODE FOR THE INVENTION

Figure 1:
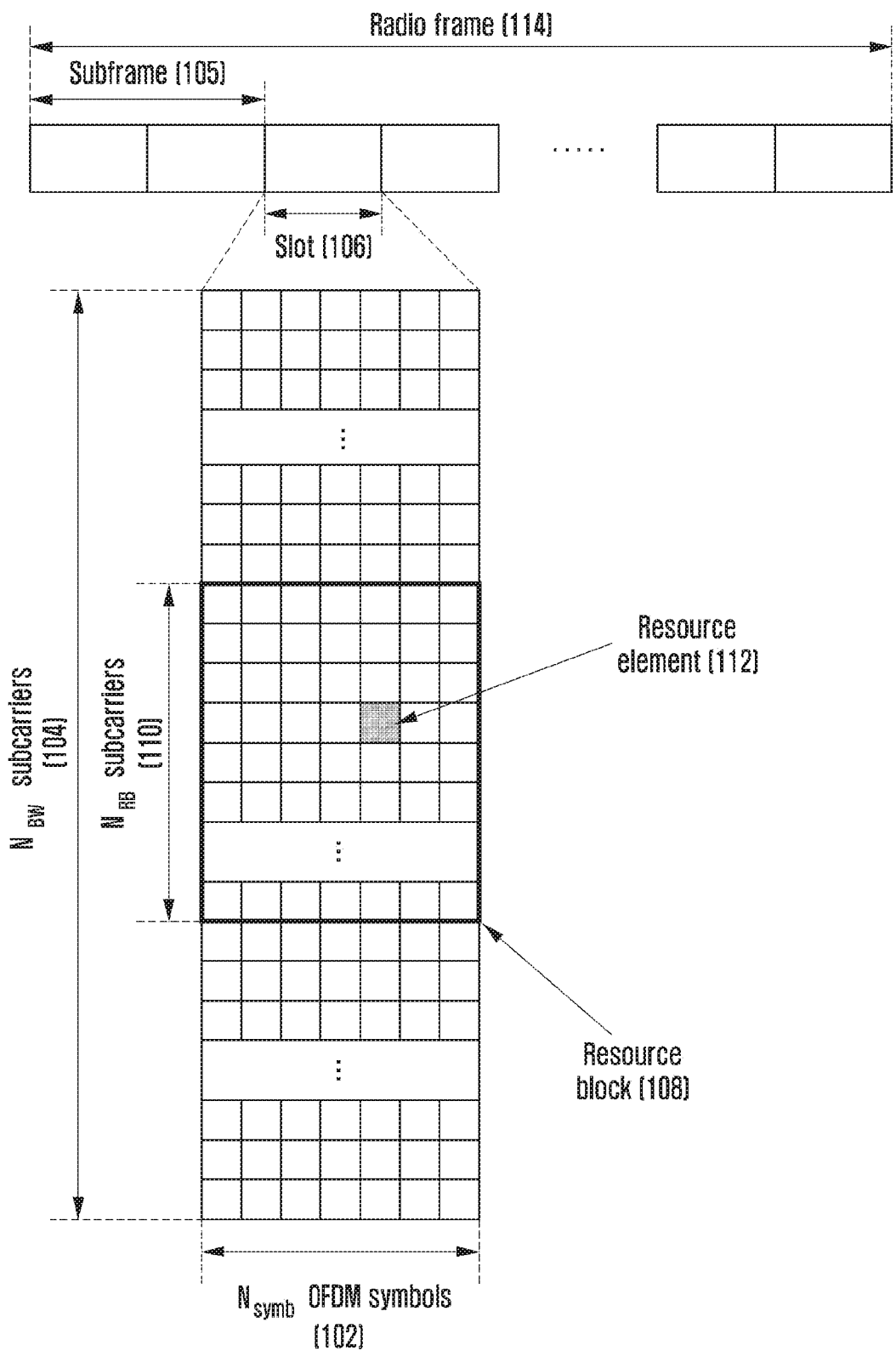
FIG. 1 is a diagram illustrating the basic structure of a time-frequency domain in an LTE system.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

Hereinafter, an embodiment of the disclosure will be described in detail with reference to the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

Further, the detailed description of embodiments of the disclosure is made mainly based on a wireless communication system based on OFDM, particularly 3GPP EUTRA standard, but the subject matter of the disclosure can be applied to other communication systems having a similar technical background and channel form after a little modification without departing from the scope of the disclosure and the above can be determined by those skilled in the art.

The disclosure relates to a wireless communication system, and more particularly, to a method and apparatus for enabling different wireless communication systems to coexist in a single carrier frequency or multiple carrier frequencies, and for enabling a terminal, which is capable of transmitting or receiving data in at least one of different communication systems, to perform data transmission or reception with each communication system.

In general, a mobile communication system is developed to provide voice services while enabling mobility of users. The mobile communication system has gradually expanded its service scope from voice to data services. In recent years, the wireless communication system has evolved to the degree that it is capable of providing high-speed data services. However, since resources are lacking and users are demanding higher-speed services from the mobile communication system currently providing service, a further improved mobile communication system is needed.

To meet the demands, standardization of long term evolution (LTE) is progressing according to the 3rd generation partnership project (3GPP), which is one of the next-generation mobile communication systems that are being developed. LTE is a technology of implementing high-speed packet-based communication with a transmission rate of up to about 100 Mbps. To this end, several methods are under discussion, including a method of reducing the number of nodes located on a communication channel by simplifying a network architecture, a method of making wireless protocols closest to a wireless channel, and the like.

An LTE system adopts a hybrid automatic repeat request (HARQ) scheme of retransmitting data in a physical layer when decoding fails upon initial transmission. HARQ refers to a scheme in which a receiver transmits information (NACK) indicating the failure of decoding to a transmitter when the receiver fails to accurately decode data, so that the transmitter retransmits the corresponding data in a physical layer. The receiver may combine data retransmitted from the transmitter and previous data, decoding of which fails, whereby data reception performance may increase. Also, when the receiver accurately decodes data, the receiver transmits, to the transmitter, information (ACK) reporting that decoding has been successfully executed, and the transmitter therefore transmits new data.

FIG. 1 is a diagram illustrating the basic structure of the time-frequency domain, which is a radio resource region in which data or a control channel is transmitted in a downlink of an LTE system.

Referring to FIG. 1, the horizontal axis indicates the time domain and the vertical axis indicates the frequency domain. In the time domain, the minimum transmission unit is an OFDM symbol. One slot 106 includes $N_{symb}$ OFDM symbols 102, and one subframe 105 includes two slots. The length of one slot is 0.5 ms, and the length of one subframe is 1.0 ms. A radio frame 114 is a time-domain unit including 10 subframes. In the frequency domain, the minimum transmission unit is a subcarrier. The entire system transmission bandwidth may include a total of $N_{BW}$ subcarriers 104.

In the time-frequency domain, the basic resource unit is a resource element (RE) 112, and an RE is expressed by an OFDM symbol index and a subcarrier index. A resource block (RB) (or a physical resource block (PRB)) 108 is defined by $N_{symb}$ consecutive OFDM symbols 102 in the time domain and $N_{RB}$ consecutive subcarriers 110 in the frequency domain. Therefore, one RB 108 includes $N_{symb} \times N_{RB}$ REs 112. Generally, the minimum transmission unit of data is an RB. In the LTE system, generally, $N_{symb}=7$ and $N_{RB}=12$. $N_{BW}$ and $N_{RB}$ are proportional to a system transmission bandwidth. A data rate increases in proportion to the number of RBs scheduled for a terminal. In the LTE system, six transmission bandwidths are defined and used. In the case of a FDD system that operates a downlink and an uplink by distinguishing them based on frequencies, a downlink transmission bandwidth and an uplink transmission bandwidth may be different from each other. A channel bandwidth may indicate an RF bandwidth corresponding to a system transmission bandwidth. Table 1 indicates the relationship between a system transmission bandwidth and a channel bandwidth defined in the LTE system. For example, when an LTE system has a channel bandwidth of 10 MHz, the transmission bandwidth may include 50

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Downlink control information is transmitted within the first N OFDM symbols in the subframe. Generally, N={1, 2, 3}. Therefore, the value of N may be changed for each subframe based on the amount of control information to be transmitted in the current subframe. The control information may include a control channel transmission interval indicator indicating the number of OFDM symbols via which control information is to be transmitted, scheduling information associated with downlink data or uplink data, a HARQ ACK/NACK signal, or the like.

In the LTE system, scheduling information associated with downlink data or uplink data may be transmitted from a base station to a terminal via downlink control information (DCI). An uplink (UL) refers to a radio link via which a terminal transmits data or a control signal to a base station, and a downlink (DL) refers to a radio link via which a base station transmits data or a control signal to a terminal. The DCI may be defined in various formats. A DCI format may be determined and applied for operation based on whether scheduling information is for uplink data (uplink (UL) grant) or for downlink data (DL grant), whether it is compact DCI of which the control information is small, whether spatial multiplexing using multiple antennas is applied, whether it is DCI used for controlling power, and the like. For example, DCI format 1, corresponding to scheduling control information on downlink data (DL grant), may be configured to include at least the following control information.

Resource allocation type 0/1 flag: reporting whether a resource allocation type is type 0 or type 1. Type 0 applies a bitmap scheme and allocates resources in units of resource block groups (RBGs). In the LTE system, a basic scheduling unit is a resource block (RB), expressed by time and frequency domain resources, and an RBG includes a plurality of RBs and is used as a basic scheduling unit in the type 0 scheme. Type 1 allows allocation of a predetermined RB in an RBG.

Resource block assignment: reporting an RB allocated to data transmission. A resource to be expressed is determined according to the system bandwidth and resource allocation scheme.

Modulation and coding scheme (MCS): reporting a modulation scheme used for data transmission and the size of a transport block, which is data to be transmitted.

HARQ process number: reporting the process number of HARQ

New data indicator (NDI): reporting whether transmission is HARQ initial transmission or retransmission.

Redundancy version (RV): reporting the redundancy version of HARQ

Transmit power control (TPC) command for physical uplink control channel (PUCCH): reporting a TPC command for a PUCCH, which is an uplink control channel.

The DCI is transmitted via a physical downlink control channel (PDCCH) or an enhanced PDCCH (EPDCCH) after passing through a channel coding and modulation process.

Generally, the DCI independently passes through channel coding for each terminal, is configured as an independent PDCCH, and is transmitted. In the time domain, a PDCCH is mapped and transmitted during the control channel transmission interval. The frequency-domain mapping position of a PDCCH is determined by the identifier (ID) of each terminal, and is propagated to the entire system transmission band.

Downlink data is transmitted via a physical downlink shared channel (PDSCH), which is a physical channel for downlink data transmission. A PDSCH is transmitted after the control channel transmission interval. Scheduling information, such as a modulation scheme, a specific mapping position in the frequency domain, or the like, may be reported by DCI transmitted via the PDCCH.

Via an MCS, formed of 5 bits in the control information included in the DCI, a base station may report the modulation scheme applied to a PDSCH to be transmitted to a terminal and the size (transport block size (TBS)) of data to be transmitted. The TBS corresponds to the size of data (transport block (TB)) that the base station desires to transmit before channel coding for error correction is applied to the data.

The modulation scheme supported by the LTE system includes quadrature phase shift keying (QPSK), 16 quadrature amplitude modulation (16QAM), and 64QAM. Modulation orders ($Q_m$) correspond to 2, 4, and 6 respectively. That is, in the case of QPSK modulation, 2 bits are transmitted per symbol. In the case of 16QAM modulation, 4 bits are transmitted per symbol. In the case of 64QAM modulation, 6 bits are transmitted per symbol.

3GPP LTE Rel-10 adopts a bandwidth extension technology in order to support a larger amount of data transmission than LTE Rel-8. A technology called "bandwidth extension" or "carrier aggregation (CA)" may extend a band to be larger than that of an LTE Rel-8 terminal, which transmits data in one band, and thus the amount of data transmission may be increased by an amount corresponding to the extended band. Each of the bands is referred to as a component carrier (CC), and an LTE Rel-8 terminal is defined as having one component carrier for a downlink and one component carrier for an uplink. Also, a downlink CC and an uplink CC, which is connected to the downlink CC via SIB-2, are together referred to as a cell. The SIB-2 connection between the downlink CC and the uplink CC is transmitted via a system signal or an upper signal. A terminal that supports CA may receive downlink data and transmit uplink data via multiple serving cells.

According to Rel-10, if a base station has difficulty transmitting a physical downlink control channel (PDCCH)

to a predetermined terminal in a predetermined serving cell, the base station transmits a PDCCH in another serving cell and configures a carrier indicator field (CIF), which is a field indicating that the corresponding PDCCH is a physical downlink shared channel (PDSCH) or a physical uplink shared channel (PUSCH) of another serving cell. The CIF may be configured for a terminal that supports CA. The CIF is determined to indicate a different serving cell by adding three bits to the PDCCH information in a predetermined serving cell. The CIF is included in DCI only when the base station performs cross carrier scheduling. If the CIF is not included, the base station does not perform cross carrier scheduling. If the CIF is included in downlink assignment information (DL assignment), the CIF indicates a serving cell in which a PDSCH scheduled by DL assignment is to be transmitted. If the CIF is included in uplink resource assignment information (UL grant), the CIF is defined to indicate a serving cell in which a PUSCH scheduled by UL grant is to be transmitted.

As described above, in LTE-10, carrier aggregation (CA), which is a bandwidth extension technology, is defined, and multiple serving cells are configured for a terminal. The terminal may periodically or aperiodically transmit channel information associated with the multiple serving cells to a base station for the data scheduling by the base station. The base station schedules and transmits data for each carrier, and the terminal transmits A/N feedback associated with the data transmitted for each carrier. In LTE Rel-10, a terminal is designed to transmit a maximum of 21 bits of A/N feedback. If transmission of A/N feedback and transmission of channel information overlap in one subframe, the design is such that the A/N feedback is transmitted and the channel information is discarded. In LTE Rel-11, the design is such that A/N feedback and channel information of one cell are multiplexed, so that a maximum of 22 bits of A/N feedback and the channel information of one cell are transmitted via PUCCH format 3 in transmission resources of PUCCH format 3.

LTE-13 assumes a scenario of configuring a maximum of 32 serving cells. The number of serving cells is extended up to a maximum of 32 serving cells by using an unlicensed band in addition to a licensed band. Also, by taking into consideration that the number of licensed bands, such as LTE frequencies, is limited, an LTE service may be provided in an unlicensed band, such as a 5 GHz band, which is called "licensed assisted access (LAA)". LAA applies carrier aggregation (CA) technology of LTE so as to support operation of an LTE cell of a licensed band as a PCell and operation of an LAA cell of an unlicensed band as an SCell. Therefore, in the same manner as LTE, feedback generated in the LAA cell, which is an SCell, needs to be transmitted only in a PCell, and a downlink subframe and an uplink subframe may be freely applied to the LAA cell. Unless otherwise specified in the disclosure, LTE includes technologies evolved from LTE, such as LTE-A, LAA, and the like.

A $5^{th}$ wireless cellular communication system (hereinafter referred to as 5G or NR), which is a communication system beyond LTE, may support a service that satisfies various requirements in order to freely apply various requirements from users, service providers, and the like.

Therefore, 5G may be defined to be a technology for satisfying requirements selected from among various requirements, such as a terminal's maximum transmission rate of 20 Gbps, a terminal's maximum speed of 500 km/h, a maximum latency time of 0.5 ms, a terminal access density of 1,000,000 terminal/km2, and the like, for various 5G oriented services such as enhanced mobile broadband (eMBB) communication, massive machine-type communication (mMTC), ultra-reliable and low-latency communication (URLLC), and the like.

For example, in order to provide eMBB in 5G, from the perspective of a single base station, a terminal's maximum transmission speed of 20 Gbps needs to be supported in a downlink, and a terminal's maximum transmission speed of 10 Gbps needs to be supported in an uplink. Also, a terminal's average transmission speed, which is noticeable upon practical application, needs to be increased. In order to satisfy the requirements, transmission/reception technology needs to be improved, including a further enhanced multiple-input multiple-output transmission.

Also, in 5G, mMTC is under consideration with the goal of supporting an application service, such as the Internet of Things (IoT). The mMTC requires massive terminal access supported in a cell, improvement of terminal coverage, prolonged battery lifetime, decreased terminal expenses, and the like, so as to efficiently support the IoT. The IoT provides communication via attachment to various sensors and various devices, whereby IoT needs to support a large number of terminals in a cell (e.g., 1,000,000 terminals/km$^2$). Also, by its nature, mMTC has a high possibility of being located in a shadow region, such as the basement of a building or an area that a cell does not cover, and may require coverage wider than the coverage provided by eMBB. mMTC has a high possibility of being configured using inexpensive terminals, and the batteries of the terminals are difficult to exchange frequently. Accordingly, a long battery lifetime may be required.

URLLC is cellular-based wireless communication which is used for specific purposes, is a service used for remote control of robots or machine devices, industrial automation, unmanned aerial vehicles, remote health control, emergency notification, and the like, and needs to provide communication with ultra-low latency and ultra-high reliability. For example, the URLLC needs to satisfy a maximum delay time lower than 0.5 ms, and also needs to provide a packet error rate less than or equal to 10-5. Therefore, a transmit time interval (TTI) smaller than that of the 5G service, such as the eMBB, needs to be provided for the URLLC, and a design that assigns wider frequency band resources is required.

The services considered for the above-described 5G wireless cellular communication system need to be provided in a single framework. That is, it is preferable to integrate, control, and transmit various services as a single system, as opposed to operating each service independently, in order to effectively manage and control resources.

Figure 2:
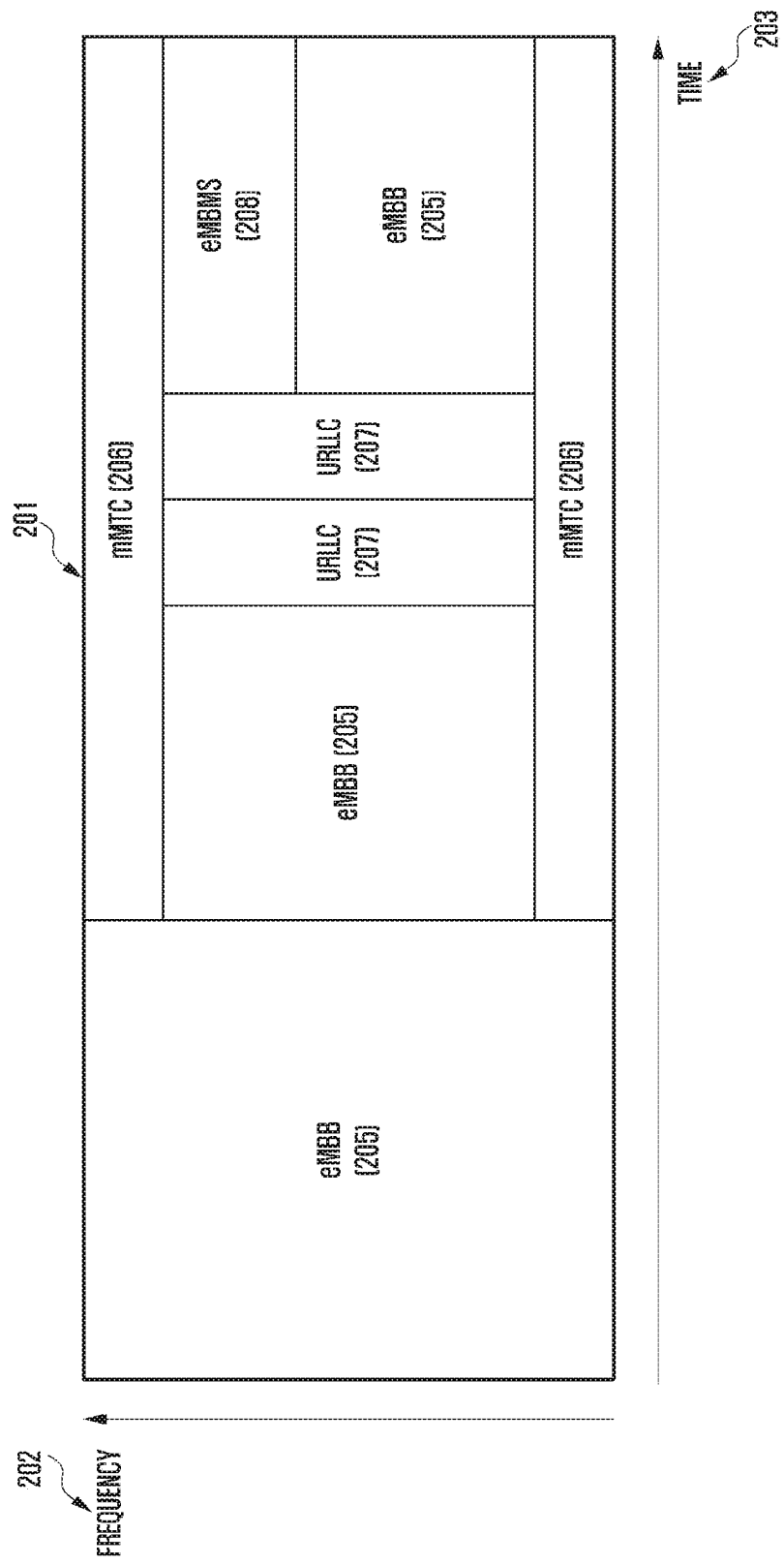
FIG. 2 is a diagram illustrating an example in which 5G services are multiplexed and transmitted in a single system.

FIG. 2 is a diagram illustrating an example in which services considered by 5G are transmitted as a single system.

In FIG. 2, frequency-time resources 201 used in 5G may include a frequency axis 202 and a time axis 203. FIG. 2 illustrates that 5G operates an eMBB 205, an mMTC 206, and an URLLC 207 in a single framework. Also, as a service additionally considered for implementation in 5G, an enhanced mobile broadcast/multicast service (eMBMS) 208 for providing a cellular-based broadcast service may be considered. Services under consideration for 5G, such as the eMBB 205, the mMTC 206, the URLLC 207, the eMBMS 208, and the like, may be multiplexed via time-division multiplexing (TDM) or frequency division multiplexing (FDM), and transmitted in a single system frequency bandwidth that 5G operates, and spatial division multiplexing may be also considered. In the case of the eMBB 205, it is preferable to occupy the maximum frequency bandwidth at a predetermined time and to perform transmission in order to provide the above-described increased data transmission speed. Therefore, it is preferable that the eMBB 205 service be TDM with another service and be transmitted within a system transmission bandwidth 201, and it is also preferable that the eMBB 205 service be FDM with other services and be transmitted within the system transmission bandwidth, as demanded by the other services.

In the case of the mMTC 206, an extended transmission interval is required in order to secure a wide coverage, unlike other services. Coverage may be secured by repeatedly transmitting the same packet within a transmission interval. Also, in order to reduce the complexity of a terminal and the price of the terminal, the transmission bandwidth within which the terminal is capable of performing reception may be limited. By taking into consideration the above-described requirements, it is preferable that the mMTC 206 be FDM with other services and be transmitted within the transmission system bandwidth 201 of 5G.

It is preferable that the URLLC 207 have a transmit time interval (TTI) shorter than those of other services in order to satisfy the ultra-low-latency requirement that the service requires. Also, a low coding rate is needed in order to satisfy the ultra-high-reliability requirement. Accordingly, it is preferable to have a wide bandwidth from the perspective of frequency. By taking into consideration the above-described requirements, it is preferable that the URLLC 207 be TDM with other services within the transmission system bandwidth 201 of 5G.

The above-described services may have different transmission/reception schemes and transmission/reception parameters in order to satisfy the requirements of each service. For example, each service may have a different numerology for each service requirement. Here, the numerology may include a cyclic prefix (CP) length, subcarrier spacing, OFDM symbol length, transmit time interval (TTI), and the like in a communication system based on orthogonal frequency division multiplexing (OFDM) or orthogonal frequency division multiple access (OFDMA). The services may have different numerologies. For example, the eMBMS 208 may have a CP length longer than other services. The eMBMS transmits broadcast-based upper-layer traffic, and thus may transmit the same data in all cells. In this instance, from the perspective of a terminal, if signals received in a plurality of cells are received within a CP length, the terminal may receive and decode all of the signals. Accordingly, the terminal may obtain a single frequency network (SFN) diversity gain, and even though the terminal is located at a cell boundary, the terminal may receive broadcasting information without coverage restraint. However, when 5G supports eMBMS, if the CP length is longer than those of other services, waste attributable to CP overhead may occur. Accordingly, an OFDM symbol length longer than that for other services may also be required, and thus, a subcarrier spacing narrower than those for other services may be required.

Also, services may use different numerologies in 5G. For example, in the case of URLLC, a TTI shorter than those of other services is required. Accordingly, a shorter OFDM symbol length is required, and a wider subcarrier spacing may also be required.

At present, LTE is mainly used in a frequency band of 2 GHz. Unlike LTE, 5G uses a frequency of 20 MHz or higher in a frequency band less than or equal to 6 GHz (referred to as sub-6 GHz) or a frequency band greater than or equal to 6 GHz (referred to as over-6 GHz), and may satisfy the data transmission speed that 5G requires. Accordingly, the disclosure considers supporting the existence of LTE and 5G on a single LTE carrier or multiple LTE carriers in sub-6 GHz, and technology that supports the coexistence of LTE and 5G is considered as an important technology for early commercialization of 5G without the introduction of an additional carrier for 5G. Therefore, there is a desire for a method of enabling LTE and 5G to coexist on at least one LTE carrier.

Hereinafter, embodiments of the disclosure will be described in detail with reference to the accompanying drawings. Here, it is noted that identical reference numerals denote the same structural elements in the accompanying drawings. Further, a detailed description of known functions and configurations that may make the subject matter of the disclosure unclear will be omitted.

Further, although the following detailed description of embodiments of the disclosure will be directed to the LTE and 5G systems, it will be understood by those skilled in the art that the main gist of the disclosure may also be applied to any other communication system having similar technical backgrounds and channel formats, with a slight modification, without substantially departing from the scope of the disclosure.

Hereinafter, a coexistence system in which an LTE cell and a 5G cell coexist and are connected via dual connectivity or carrier aggregation, or a coexistence system in which an LTE cell and a 5G cell separately operate in a standalone state, will be described.

FIGS. 3A to 3C, FIGS. 4A to 4C, and FIGS. 5A to 5C are, respectively, diagrams illustrating a first embodiment, a second embodiment, and a third embodiment of a communication system to which the disclosure is applied. The drawings illustrate examples in which an LTE system and a 5G system, which are two different systems, coexist. The methods of the disclosure are applicable to the system of FIGS. 3A to 3C, the system of FIGS. 4A to 4C, and the system of FIGS. 5A to 5C.

Figure 3A:
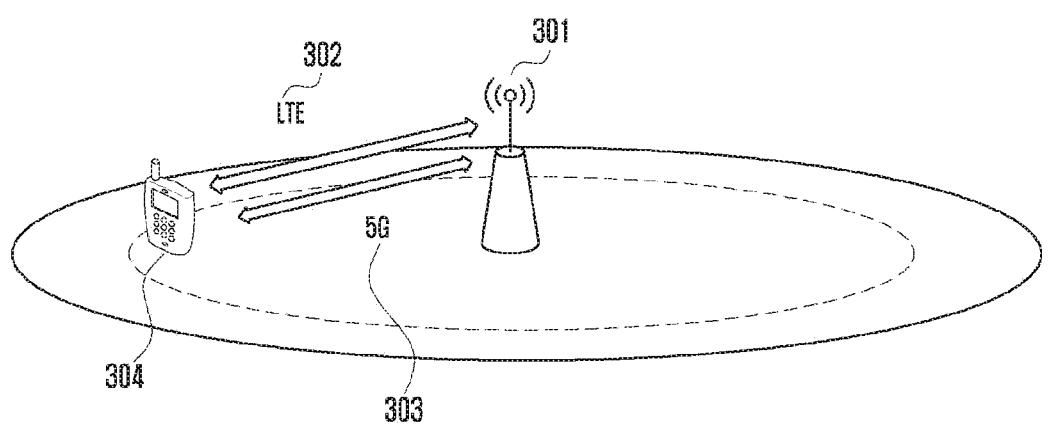
FIGS. 3A to 3C are diagrams illustrating a first embodiment of a communication system to which the disclosure is applied.
Figure 3B:
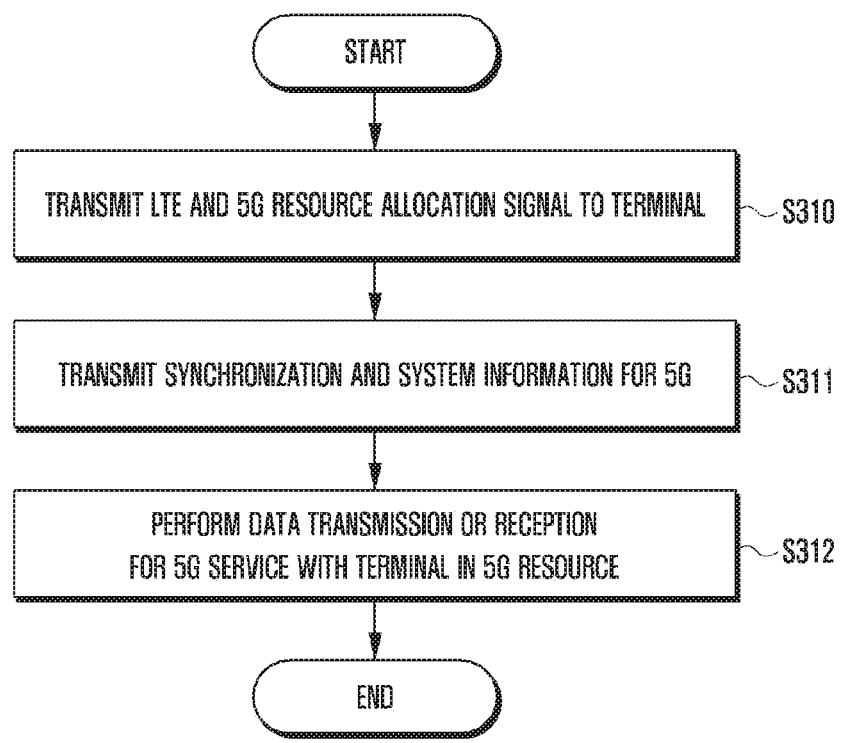
Figure 3C:
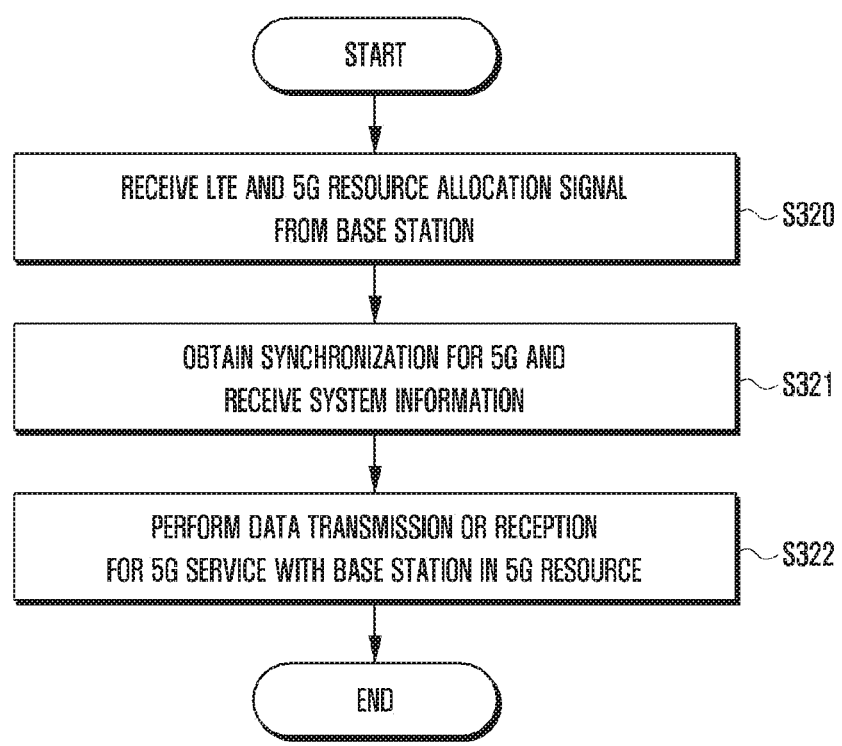

FIGS. 3A to 3C are diagrams illustrating a first embodiment of a communication system to which the disclosure is applied.

A description will be provided with reference to FIG. 3A. FIG. 3A is a diagram illustrating an example in which an LTE cell 302 and a 5G cell 303 coexist in a single base station 301 in a network according to the disclosure.

A terminal 304 may be an LTE-capable terminal having an LTE transmission/reception module, may be a 5G-capable terminal having a 5G transmission/reception module, or may be a terminal having both an LTE transmission/reception module and a 5G transmission/reception module.

The terminal 304 may be synchronized using a synchronization signal transmitted from the LTE cell 302 or the 5G cell 303, and may perform data transmission/reception with the base station 301 via the LTE cell 302 or the 5G cell 303 after receiving system information. In this instance, the duplexing scheme of the LTE cell 302 or the 5G cell 303 is not limited.

When an LTE cell is a PCell, uplink control information is transmitted via the LTE cell 302. When a 5G cell is a PCell, uplink control information is transmitted via the 5G cell 303. An LTE cell and a 5G cell in the system of FIG. 3A may include a plurality of serving cells, and may support a total of 32 serving cells.

It is assumed that the base station 301 in the network includes both an LTE transmission/reception module (system) and a 5G transmission/reception module (system), and the base station 301 is capable of managing and operating the LTE system and the 5G system in real time. When the LTE system and the 5G system are operated at different times by dividing resources in time, the base station 301 is capable of dynamically selecting allocation of time resources to the LTE system and the 5G system. The terminal 304 may receive, from the LTE cell 302 or the 5G cell 303, a signal indicating allocation of resources (time resources, frequency resources, antenna resources, spatial resources, or the like) which the LTE cell and the 5G cell dividedly operate, and may recognize a resource via which data is received from each of the LTE cell 302 and the 5G cell 303.

Subsequently, referring to FIG. 3B, a procedure in which the base station 301 configures a 5G resource and performs data transmission or reception with the 5G-capable terminal 304 in the resource for 5G will be described.

In operation S310, the base station 301 transmits an LTE or 5G resource allocation signal to the 5G-capable terminal 304. The signal may be an upper signal or may be a physical signal.

The LTE or 5G resource allocation signal is information indicating where an LTE or 5G resource is located, and may include frequency information (a carrier frequency, a physical resource block, or the like), time information (a radio frame index, a subframe index, MBSFN subframe information for 5G transmission, uplink subframe information for 5G transmission, information on a blank resource which is determined not to be used by 5G terminals for 5G transmission, or the like), antenna information, spatial information, duplexing information (FDD DL, UL carrier information, TDD configuration (TDD UL/DL configuration) information, LAA-operation-related information), a signal used for a terminal to recognize, in real time, whether an LTE/5G resource is occupied by transmission of a reference signal or a synchronization signal, or the like. Also, the 5G resource allocation signal may include information indicating whether a 5G resource is an LTE uplink subframe or an LTE MBSFN subframe. Also, the 5G resource allocation signal may include information indicating whether a 5G resource starts from a first OFDM symbol, a second OFDM symbol, or a third OFDM symbol. Also, the 5G resource allocation signal may include offset information indicating the location where a 5G resource starts in each subframe or each slot. Also, the 5G resource allocation signal may include information indicating whether 12 OFDM symbols, 13 OFDM symbols, or 14 OFDM symbols are to be used for 5G transmission. Synchronization information of the LTE system may be additionally obtained by the 5G-capable terminal, or the base station 301 may transmit the synchronization information of the LTE system to the terminal.

In operation S311, the base station 301 transmits synchronization and system information for 5G to the 5G-capable terminal 304. As the synchronization signal for 5G, a synchronization signal different for each of the eMBB, the mMTC, and the URLLC, which use different numerologies, may be transmitted, or a common synchronization signal for a predetermined 5G resource may be transmitted using one numerology. The system information may be a common system signal transmitted via a predetermined 5G resource using one numerology, or may be different system information for each of the eMBB, mMTC, and URLLC, which use different numerologies.

In operation S312, the base station 301 may perform data transmission or reception for 5G services with the terminal 304 in the 5G resource.

Subsequently, referring to FIG. 3C, a procedure in which a 5G resource is configured for the 5G-capable terminal 304 by the base station 301 and the 5G-capable terminal 304 performs data transmission or reception in the 5G resource will be described.

In operation S320, the 5G-capable terminal 304 may receive an LTE or 5G resource allocation signal from the base station 301. The signal may be an upper signal, or may be a physical signal. The LTE or 5G resource allocation signal is information indicating where an LTE or 5G resource is located, and may include frequency information (a carrier frequency, a physical resource block, or the like), time information (a radio frame index, a subframe index, MBSFN subframe information for 5G transmission, uplink subframe information for 5G transmission, information on a blank resource which is determined not to be used by 5G terminals for 5G transmission, or the like), antenna information, spatial information, duplexing information (FDD DL, UL carrier information, TDD UL/DL configuration information, LAA-operation-related information), a signal used for a terminal to recognize, in real time, whether an LTE/5G resource is occupied by transmission of a reference signal or a synchronization signal, or the like. Also, the 5G resource allocation signal may include information indicating whether a 5G resource is an LTE uplink subframe or an LTE MBSFN subframe. Also, the 5G resource allocation signal may include information indicating whether a 5G resource starts from a first OFDM symbol, a second OFDM symbol, or a third OFDM symbol. Also, the 5G resource allocation signal may include offset information indicating the location where a 5G resource starts in each subframe or each slot. Also, the 5G resource allocation signal may include information indicating whether 12 OFDM symbols, 13 OFDM symbols, or 14 OFDM symbols are to be used for 5G transmission. Synchronization information of the LTE system may be additionally obtained by the 5G-capable terminal, or the synchronization information of the LTE system may be transmitted by the base station 301.

In operation S321, the 5G-capable terminal 304 may receive a synchronization signal for 5G, which is transmitted by the base station 301, may be synchronized using the synchronization signal for the 5G, and may receive system information transmitted by the base station 301. The synchronization signal for 5G may be different for each of the eMBB, the mMTC, and the URLLC, which use different numerologies, or may be a common synchronization signal transmitted in a predetermined 5G resource using one numerology. The system information may be a common system signal received via a predetermined 5G resource using one numerology, or may be different system information for each of the eMBB, mMTC, and URLLC, which use different numerologies.

In operation S322, the 5G-capable terminal 304 may perform data transmission or reception for 5G services with the base station 301 in the 5G resource.

Figure 4A:
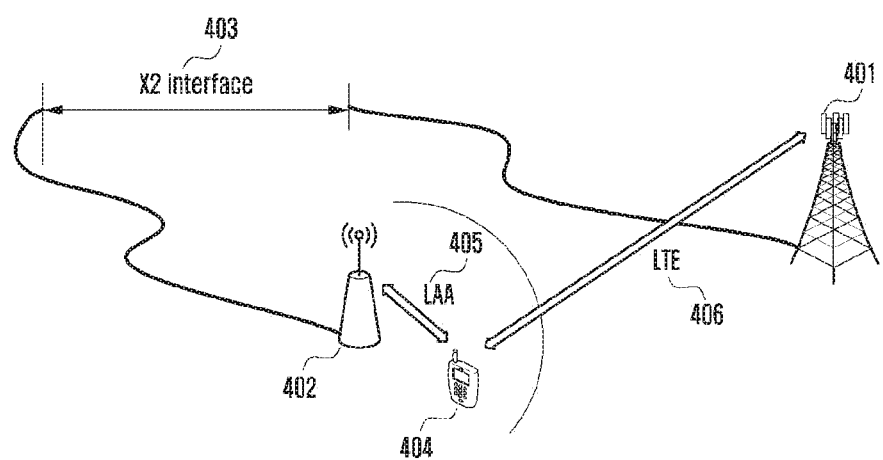
FIGS. 4A to 4C are diagrams illustrating a second embodiment of a communication system to which the disclosure is applied.
Figure 4B:
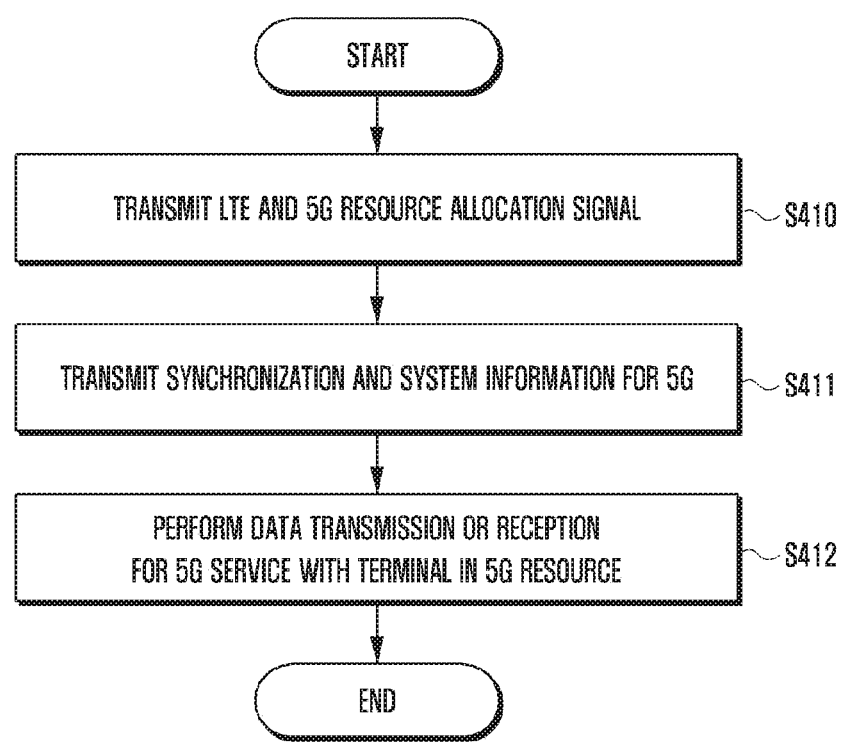
Figure 4C:
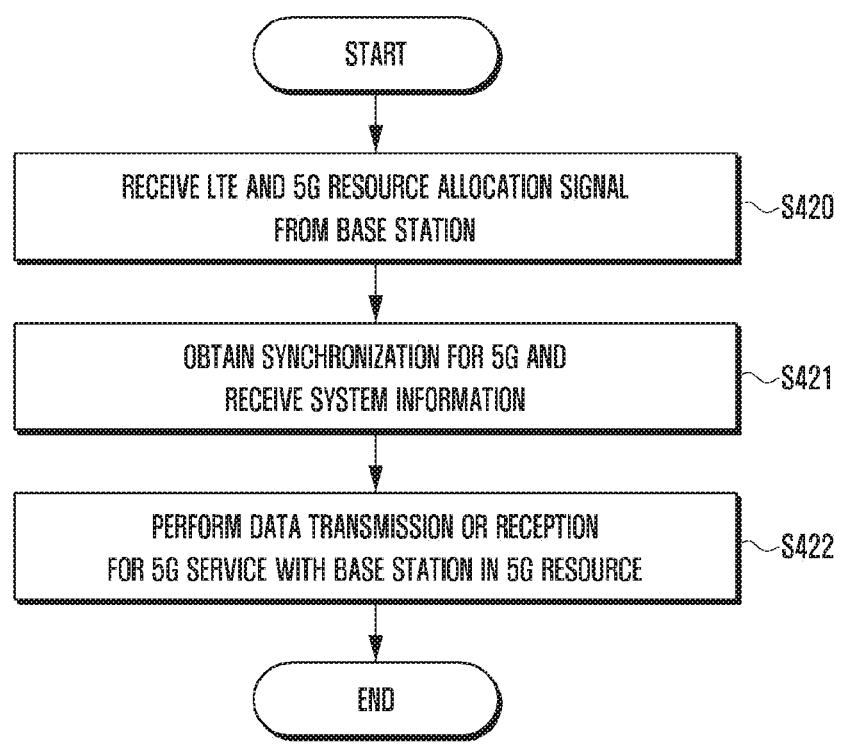

FIGS. 4A to 4C are diagrams illustrating a second embodiment of a communication system to which the disclosure is applied.

A description will be provided with reference to FIG. 4A. FIG. 4A is a diagram illustrating an example in which an LTE macro base station 401 for wide coverage and a 5G small base station 402 for increasing the amount of data transmission coexist in a network.

A terminal 404 may be an LTE-capable terminal having an LTE transmission/reception module, may be a 5G-capable terminal having a 5G transmission/reception module, or may be a terminal having both an LTE transmission/reception module and a 5G transmission/reception module.

The terminal 404 may be synchronized using a synchronization signal transmitted from the LTE base station 401 or the 5G base station 402, and may perform data transmission/reception via the LTE base station 401 or the 5G base station 402 after receiving system information. In this instance, the duplexing scheme of the LTE macro base station 401 or the 5G small base station 402 is not limited.

When an LTE cell is a PCell, uplink control information is transmitted via the LTE cell 401. When a 5G cell is a PCell, uplink control information is transmitted via the 5G cell 402. In this instance, the LTE base station 401 and the 5G base station 402 may have an ideal backhaul network or a non-ideal backhaul network.

Therefore, when the LTE base station 401 and the 5G base station 402 have an ideal backhaul network 403, fast inter-base-station X2 communication 403 is available. Accordingly, although an uplink signal is transmitted only to the LTE base station 401, the 5G base station 402 may receive related control information from the LTE base station 401 in real time via the X2 communication 403. An LTE cell and a 5G cell in the system of FIG. 4A may include a plurality of serving cells, and may support a total of 32 serving cells.

Therefore, when the LTE base station 401 and the 5G base station 402 have an ideal backhaul network, the base station 401 or 402 is capable of managing and operating the LTE system and the 5G system in real time. For example, when the base station 401 divides time resources and operates the LTE system and the 5G system at different times, the base station 401 may dynamically select allocation of time resources to the LTE system and the 5G system, and may transmit a corresponding signal to another base station 402 via an X2 interface. Therefore, the terminal 404 may receive, from the LTE base station 401 or the 5G base station 402, the signal indicating allocation of resources (time resources, frequency resources, antenna resources, spatial resources, or the like), which the LTE cell and the 5G cell dividedly operate, and may recognize the resource via which each of the LTE cell 401 and the 5G cell 402 performs data transmission or reception.

When the LTE base station 401 and the 5G base station 402 have a non-ideal backhaul network 403, fast inter-base-station X2 communication 403 is not available. Therefore, the base station 401 or 402 may semi-statically operate the LTE system and the 5G system. For example, when the base station 401 divides resources in time and operates the LTE system and the 5G system at different times, the base station 401 may select allocation of time resources to the LTE system and the 5G system, and may transmit, in advance, a corresponding signal to another base station 402 via an X2 interface, thereby separately using resources for the LTE system and the 5G system. Therefore, the terminal 404 may receive, from the LTE base station 401 or the 5G base station 402, the signal indicating allocation of resources (time resources, frequency resources, antenna resources, spatial resources, or the like) which the LTE cell and the 5G cell dividedly operate, and may recognize the resources via which each of the LTE cell 401 and the 5G cell 402 performs data transmission or reception.

Subsequently, a procedure in which the base station 401 or 402 configures a 5G resource and performs data transmission or reception with the 5G-capable terminal 404 in the resource for 5G will be described.

In operation S410, the base station 401 transmits an LTE or 5G resource allocation signal to the 5G base station 402 via the X2 interface 403, and may transmit the LTE or 5G resource allocation signal to a terminal. When the LTE system and the 5G system are operated in different resources by resource division, the base station 401 may select allocation of time resources to the LTE system and the 5G system, and may transmit allocation information to another base station 402 via the X2 interface 403, thereby distinguishing resources for the LTE system and the 5G system.

When the base station 401 transmits an LTE or 5G resource allocation signal to the 5G-capable terminal 404, the signal may be an upper signal or may be a physical signal. The LTE or 5G resource allocation signal is information indicating where an LTE or 5G resource is located, and may include frequency information (a carrier frequency, a physical resource block, or the like), time information (a radio frame index, a subframe index, MBSFN subframe information for 5G transmission, uplink subframe information for 5G transmission, information on a blank resource which is determined not to be used by 5G terminals for 5G transmission, or the like), antenna information, spatial information, duplexing information (FDD DL, UL carrier information, TDD UL/DL configuration information, LAA-operation-related information), a signal used for a terminal to recognize, in real time, whether an LTE/5G resource is occupied by transmission of a reference signal or a synchronization signal, or the like. Also, the 5G resource allocation signal may include information indicating whether a 5G resource is an LTE uplink subframe or an LTE MBSFN subframe. Also, the 5G resource allocation signal may include information indicating whether a 5G resource starts from a first OFDM symbol, a second OFDM symbol, or a third OFDM symbol. Also, the 5G resource allocation signal may include offset information indicating the location where a 5G resource starts in each subframe or each slot. Also, the 5G resource allocation signal may include information indicating whether 12 OFDM symbols, 13 OFDM symbols, or 14 OFDM symbols are to be used for 5G transmission. Synchronization information of the LTE system may be additionally obtained by the 5G-capable terminal, or the base station 401 may transmit the synchronization information of the LTE system to the terminal.

In operation S411, the base station 301 or 402 transmits synchronization and system information for 5G to the 5G-capable terminal 304. The synchronization signal for 5G may be a synchronization signal different for each of eMBB, mMTC, and URLLC, which use different numerologies, or may be a common synchronization signal transmitted via a predetermined 5G resource using one numerology. The system information may be a common system signal transmitted via a predetermined 5G resource using one numerology, or may be different system information for each of eMBB, mMTC, and URLLC, which use different numerologies.

In operation S412, the base station 402 may perform data transmission or reception for a 5G service with the terminal 404 in the 5G resource.

Subsequently, referring to FIG. 4C, a procedure in which a 5G resource is configured for the 5G-capable terminal 404 by the base station 401 or 402 and the 5G-capable terminal 404 performs data transmission or reception in the 5G resource will be described.

In operation S420, the 5G-capable terminal 404 may receive an LTE or 5G resource allocation signal from the base station 401 or 402. The signal may be an upper signal, or may be a physical signal. The LTE or 5G resource allocation signal is information indicating where an LTE or 5G resource is located, and may include frequency information (a carrier frequency, a physical resource block, or the like), time information (a radio frame index, a subframe index, MBSFN subframe information for 5G transmission, uplink subframe information for 5G transmission, information on a blank resource which is determined not to be used by 5G terminals for 5G transmission, or the like), antenna information, spatial information, duplexing information (FDD DL, UL carrier information, TDD UL/DL configuration information, LAA-operation-related information), a signal used for a terminal to recognize, in real time, whether an LTE/5G resource is occupied by transmission of a reference signal or a synchronization signal, or the like. Also, the 5G resource allocation signal may include information indicating whether a 5G resource is an LTE uplink subframe or an LTE MBSFN subframe. Also, the 5G resource allocation signal may include information indicating whether a 5G resource starts from a first OFDM symbol, a second OFDM symbol, or a third OFDM symbol. Also, the 5G resource allocation signal may include offset information indicating the location where a 5G resource starts in each slot or each subframe. Also, the 5G resource allocation signal may include information indicating whether 12 OFDM symbols, 13 OFDM symbols, or 14 OFDM symbols are to be used for 5G transmission. Synchronization information of the LTE system may be additionally obtained by the 5G-capable terminal, or the synchronization information of the LTE system may be transmitted by the base station 301.

In operation S421, the 5G-capable terminal 404 may receive a synchronization signal for 5G, which is transmitted by the base station 401 or 402, may be synchronized using the synchronization signal for 5G, and may receive system information transmitted by the base station 401 or 402. The synchronization signal for 5G may be different for each of eMBB, mMTC, and URLLC, which use different numerologies, or may be a common synchronization signal transmitted in a predetermined 5G resource using one numerology. The system information may be a common system signal received via a predetermined 5G resource using one numerology, or may be different system information for each of eMBB, mMTC, and URLLC, which use different numerologies.

In operation S422, the 5G-capable terminal 404 may perform data transmission or reception for a 5G service with the base station 402 in the 5G resource.

Figure 5A:
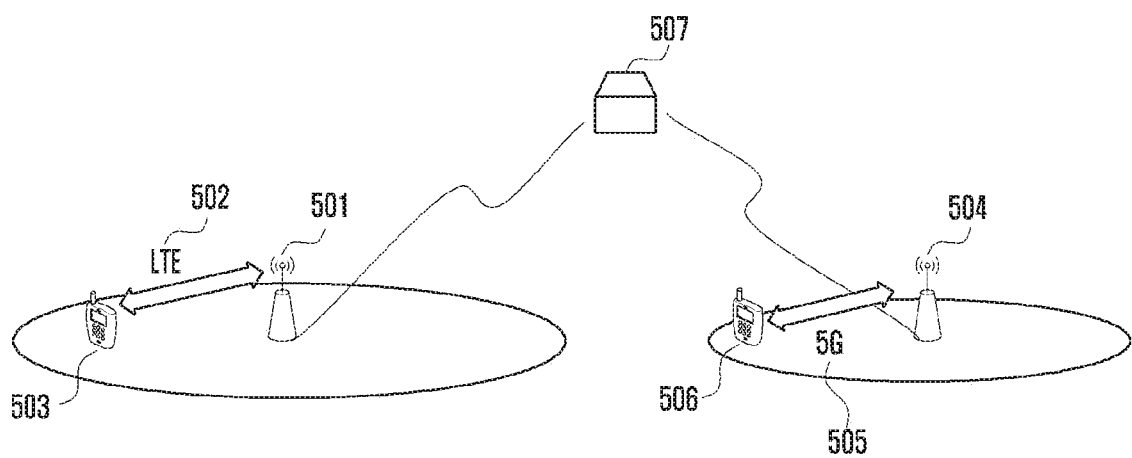
FIGS. 5A to 5C are diagrams illustrating a third embodiment of a communication system to which the disclosure is applied.
Figure 5B:
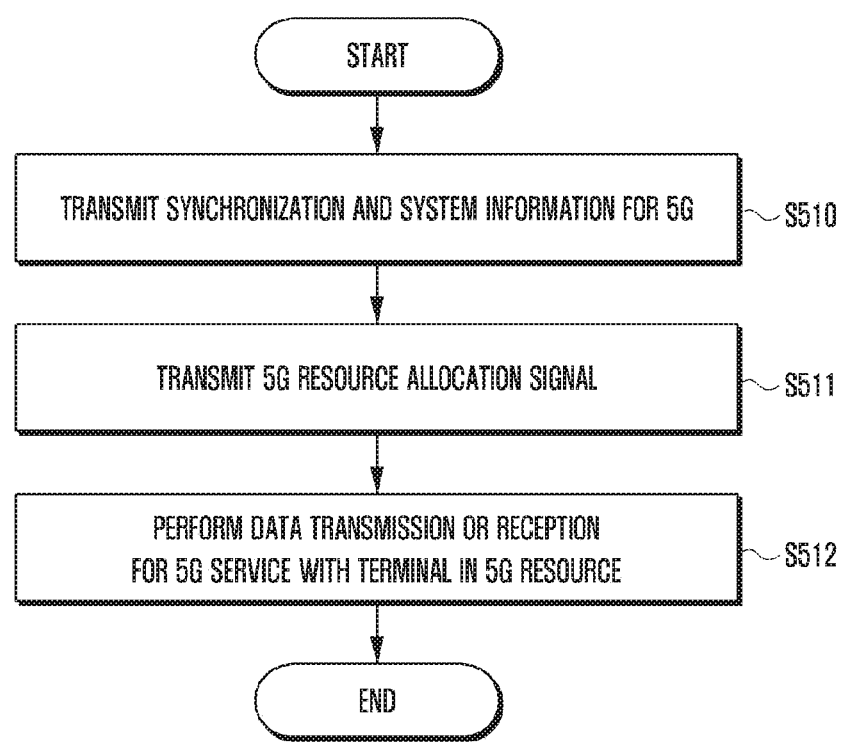
Figure 5C:
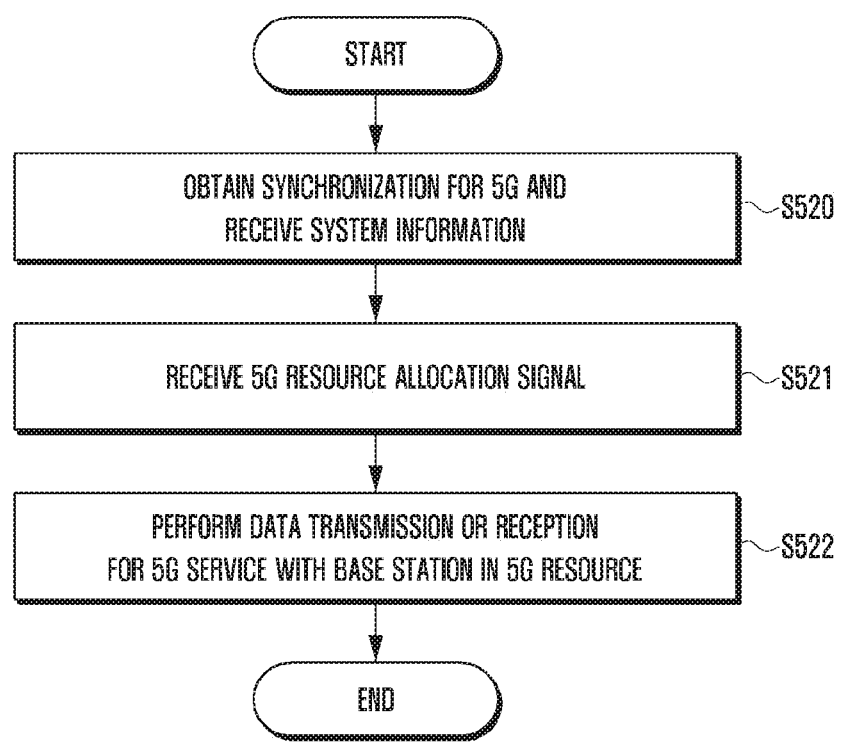

FIGS. 5A to 5C are diagrams illustrating a third embodiment of a communication system to which the disclosure is applied.

Descriptions will be provided with reference to FIG. 5A. FIG. 5A is a diagram illustrating an example in which an LTE base station 501 and a 5G base station 504 exist. In this instance, the duplexing scheme of the LTE base station 501 or the 5G base station 504 is not limited. The LTE base station 501 or the 5G base station 504 may operate in the standalone state, and a terminal may camp on each base station.

An LTE-capable terminal 503 having an LTE transmission/reception module may camp on the LTE base station 501. The LTE-capable terminal 503 may be synchronized using a synchronization signal transmitted from the LTE base station 501, and may perform data transmission or reception with the LTE base station 501 as shown in diagram 502 after receiving system information.

A 5G-capable terminal 506 having a 5G transmission/reception module may camp on the 5G base station 504. The 5G-capable terminal 506 may be synchronized using a synchronization signal transmitted from the 5G base station 504, and may perform data transmission or reception with the 5G base station 504 after receiving system information, as shown in diagram 505.

When an integrated controller 507 that controls the LTE base station 501 and the 5G base station 504 exists, the integrated controller 507 is capable of managing and operating the LTE base station 501 and the 5G base station 504 in real time. When the integrated controller 507 operates the LTE system and the 5G system at different times by dividing time resources, the integrated controller 507 may dynamically select allocation of time resources to the LTE system and the 5G system, and may transmit a corresponding signal to the LTE base station 501 and the 5G base station 504.

The LTE-capable terminal 503 may receive a signal indicating a resource via which an LTE signal is to be transmitted or received by the LTE base station 501, and may recognize a resource via which data is transmitted or received by the LTE base station. The 5G-capable terminal 506 receives a signal indicating a resource (time resource, frequency resource, antenna resource, spatial resource, or the like), via which a 5G signal is to be transmitted or received by the 5G base station 504, and may recognize a resource via which data is transmitted or received by the 5G base station.

When no integrated controller 507 exists, a base station procedure and a terminal procedure of FIG. 4A are basically used. When a non-ideal backhaul exists, fast inter-base-station X2 communication is not available. Therefore, the base station 501 or 504 may semi-statically operate the LTE system and the 5G system. For example, when the base station 501 or 504 divides time resources and operates the LTE system and the 5G system at different times, the base station 501 or 504 may select allocation of time resources to the LTE system and the 5G system, and may transmit, in advance, a corresponding signal to another base station 504 or 501 via an X2 interface, thereby separately using resources for the LTE system and the 5G system. Therefore, the LTE-capable terminal 503 may receive a signal indicating a resource via which an LTE signal is to be transmitted or received by the LTE base station 501, and may recognize a resource via which data is transmitted or received by the LTE base station. The 5G-capable terminal 506 receives a signal indicating a resource (time resource, frequency resource, antenna resource, spatial resource, or the like) via which a 5G signal is to be transmitted or received by the 5G base station 504, and may recognize a resource via which data is transmitted or received by the 5G base station.

Subsequently, referring to FIG. 5B, a procedure in which the base station 504 configures a 5G resource and performs data transmission or reception with the 5G-capable terminal 506 in the resource for 5G will be described.

In operation S510, the base station 504 transmits synchronization and system information for 5G to the 5G-capable terminal 506 in the resource configured for 5G transmission. The synchronization signal for 5G may be a synchronization signal different for each of eMBB, mMTC, and URLLC, which use different numerologies, or may be a common synchronization signal transmitted via a predetermined 5G resource using one numerology. The system information may be a common system signal transmitted via a predetermined 5G resource using one numerology, or may be different system information for each of eMBB, mMTC, and URLLC, which use different numerologies.

In operation S511, the 5G base station 504 may transmit an LTE or 5G resource allocation signal to the terminal 506. When an LTE or 5G resource allocation signal is transmitted to the 5G-capable terminal 406, the signal may be an upper signal or may be a physical signal. The LTE or 5G resource allocation signal is information indicating where an LTE or 5G resource is located, and may include frequency information (a carrier frequency, a physical resource block, or the like), time information (a radio frame index, a subframe index, MBSFN subframe information for 5G transmission, uplink subframe information for 5G transmission, information on a blank resource which is determined not to be used by 5G terminals for 5G transmission, or the like), antenna information, spatial information, duplexing information (FDD DL, UL carrier information, TDD UL/DL configuration information, LAA-operation-related information), a signal used for a terminal to recognize, in real time, whether an LTE/5G resource is occupied by transmission of a reference signal or a synchronization signal, or the like. Also, the 5G resource allocation signal may include information indicating whether a 5G resource is an LTE uplink subframe or an LTE MBSFN subframe. Also, the 5G resource allocation signal may include information indicating whether a 5G resource starts from a first OFDM symbol, a second OFDM symbol, or a third OFDM symbol. Also, the 5G resource allocation signal may include offset information indicating the location where a 5G resource starts in each subframe or each slot. Also, the 5G resource allocation signal may include information indicating whether 12 OFDM symbols, 13 OFDM symbols, or 14 OFDM symbols are to be used for 5G transmission. Synchronization information of the LTE system may be additionally obtained by the 5G-capable terminal, or may be transmitted by the base station 504.

When the integrated controller 507 exists, the LTE or 5G resource allocation is determined by the integrated controller 507, and information thereon may be transmitted to the 5G base station 504 via an X2. Therefore, when the LTE system and the 5G system are operated in different resources by dividing resources, the integrated controller 507 may select resource allocation to the LTE system and the 5G system, and may transmit allocation information to the base station 501 or 504 via the X2, whereby the resources for the LTE system and the 5G system may be separately used.

When the integrated controller 507 does not exist, the LTE base station or the 5G base station may select LTE or 5G resource allocation and transmit the same to another base station, as shown in the base station procedure of FIG. 4B.

In operation S512, the base station 504 may perform data transmission or reception for a 5G service with a terminal in the 5G resource.

Subsequently, referring to FIG. 5C, a procedure is described in which a 5G resource is configured for the 5G-capable terminal 506 by the base station 504, and the 5G-capable terminal 506 performs data transmission or reception in the 5G resource.

In operation S520, the 5G-capable terminal 506 may receive a synchronization signal for 5G, which is transmitted by the base station 504 in the resource configured for 5G transmission, may be synchronized using the synchronization signal, and may receive system information transmitted by the base station 504. The synchronization signal for 5G may be a synchronization signal different for each of eMBB, mMTC, and URLLC, which use different numerologies, or may be a common synchronization signal transmitted in a predetermined 5G resource using one numerology. The system information may be a common system signal received via a predetermined 5G resource using one numerology, or may be different system information for each of eMBB, mMTC, and URLLC, which use different numerologies.

In operation S521, the 5G-capable terminal 506 may receive an LTE or 5G resource allocation signal from the base station 504. The signal may be an upper signal or may be a physical signal. The LTE or 5G resource allocation signal is information indicating where an LTE or 5G resource is located, and may include frequency information (a carrier frequency, a physical resource block, or the like), time information (a radio frame index, a subframe index, MBSFN subframe information for 5G transmission, uplink subframe information for 5G transmission, information on a blank resource which is determined not to be used by 5G terminals for 5G transmission, or the like), antenna information, spatial information, duplexing information (FDD DL, UL carrier information, TDD UL/DL configuration information, LAA-operation-related information), a signal used for a terminal to recognize, in real time, whether an LTE/5G resource is occupied by transmission of a reference signal or a synchronization signal, or the like. Also, the 5G resource allocation signal may include information indicating whether a 5G resource is an LTE uplink subframe or an LTE MBSFN subframe. Also, the 5G resource allocation signal may include information indicating whether a 5G resource starts from a first OFDM symbol, a second OFDM symbol, or a third OFDM symbol. Also, the 5G resource allocation signal may include offset information indicating a location where a 5G resource starts in each subframe or each slot. Also, the 5G resource allocation signal may include information indicating whether 12 OFDM symbols or 14 OFDM symbols are to be used for 5G transmission. Synchronization information of the LTE system may be additionally obtained by the 5G-capable terminal, or the base station 501 may transmit the synchronization information of the LTE system to the terminal.

In operation S522, the 5G-capable terminal 506 may perform data transmission or reception for a 5G service with the base station 504 in the 5G resource.

Subsequently, a method of operating LTE data transmission/reception and 5G data transmission/reception on one LTE carrier based on time division, in the state in which the LTE system and the 5G system of FIGS. 3A to 5C coexist, will be described.

Figure 6:
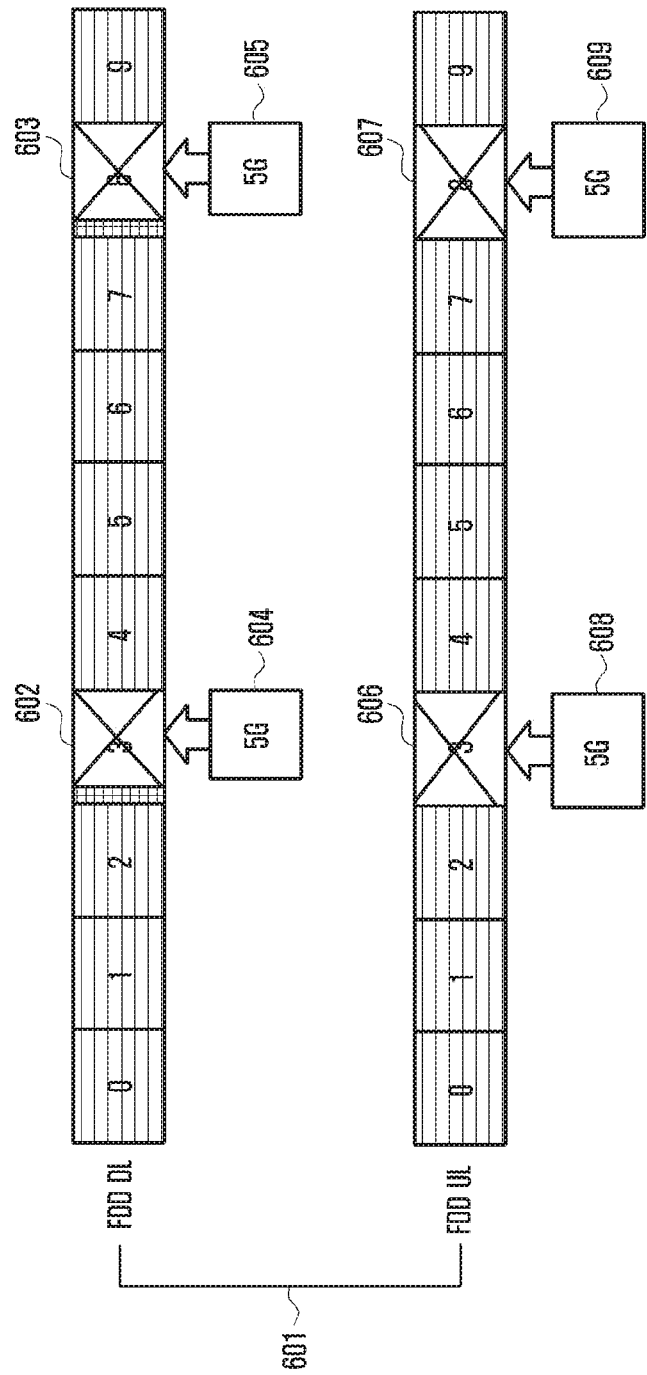
FIG. 6 is a diagram illustrating an example of operating LTE and 5G based on time division using an MBSFN subframe on a single LTE FDD carrier.

FIG. 6 is a diagram illustrating a method of operating LTE data transmission/reception and 5G data transmission/reception based on time division using a multimedia broadcast single-frequency network (MBSFN) subframe on a single LTE FDD carrier.

In FIG. 6, information associated with FDD 601 (DL carrier frequency BW and location information and UL carrier frequency BW and location information) may be transmitted to a 5G-capable terminal from a 5G base station. The 5G-capable terminal may obtain the information by being synchronized and receiving system information. Unlike a carrier on which only 5G transmission exists, on a carrier on which LTE and 5G coexist, 5G transmission is allowed only in an MBSFN subframe. Accordingly, a synchronization signal may be transmitted in a subframe which is different from that of the carrier on which only 5G transmission exists. However, in order to maintain a period (e.g., 5 ms) by which a synchronization signal is transmitted, a predetermined MBSFN subframe, for example, subframe #2, #7, or the like, is configured to always be used for 5G transmission. A terminal may receive, from a base station, information associated with a subframe index and a slot index used for 5G transmission, and may utilize the index information for RS and data reception.

In the FDD 601, the MBSFN subframe may be selectively configured by an upper signal from among subframes #1, #2, #3, #6, #7, #8, and the like. Subframes used for 5G transmission among the configured MBSFN subframes may be transmitted from a 5G base station to a 5G-capable terminal. Based on the subframe information that the 5G-capable terminal receives, the 5G-capable terminal may determine a resource via which 5G data transmission is performed.

Two OFDM symbols, which are foremost among the 14 OFDM symbols included in the MBSFN subframe, may be used for CRS and control channel transmission for an LTE terminal. Therefore, 5G transmission 604 or 605 may be performed in 12 OFDM symbols, excluding the two foremost OFDM symbols, and 5G downlink transmission 604 or 605 needs to be performed from a third OFDM symbol, excluding the two foremost OFDM symbols. Therefore, a 5G terminal may need to be synchronized with the start of the third OFDM symbol, so as to obtain a starting point at which 5G downlink transmission 604 or 605 begins.

All of the 14 OFDM symbols may be used for 5G transmission 608 or 609 in an uplink resource 606 or 607 for 5G data, which is configured for 5G uplink transmission. Therefore, for 5G uplink transmission 608 or 609, 5G uplink transmission needs to be started at the start of the first OFDM symbol. The 5G terminal needs to be synchronized with the state of the first OFDM symbol, so as to obtain a starting point at which 5G uplink transmission 608 or 609 begins.

An example in which two OFDM symbols, which are foremost among the 14 OFDM symbols included in the MBSFN subframe, are used for CRS and control channel transmission for an LTE terminal has been described. However, embodiments of the disclosure may be applied to an example in which a first OFDM symbol is used for CRS and control channel transmission for an LTE terminal. In this instance, 13 OFDM symbols may be used for 5G transmission.

Also, LTE terminals, which exist in an LTE cell and are capable of supporting transmission modes (TM) 9 and 10, are capable of performing data transmission via a demodulation reference signal (DMRS) and a channel statement information reference signal (CSI-RS) in an MBSFN subframe. Accordingly, LTE transmission and 5G transmission may be divided based on frequency resources in the MBSFN subframe for 5G terminals and LTE terminals. In this instance, LTE transmission and 5G transmission need to have the same numerology. For example, subcarrier spacing of 15 kHz in LTE also needs to be used for 5G transmission. By applying the method, LTE transmission and 5G transmission may be performed without affecting each other.

To support the LTE and 5G to have different numerologies, a guard band to protect LTE transmission is required between an LTE resource and a 5G resource. Therefore, when the guard band is configured, information associated with the guard band may be signaled to a 5G terminal. The 5G terminal may receive the signal, and may receive 5G control information and reference signal or data information in the 5G resource excluding the guard band. In order to divide the frequency resources, the base station and terminal procedures described with reference to FIGS. 3A to 3C, FIGS. 4A to 4C, and FIGS. 5A to 5C may be applied.

In FIG. 6, MBSFN subframes #3 and #8 602 and 603 are used for 5G data transmission 604 or 605. The detailed procedure for 5G data transmission or reception may conform to the base station and terminal procedures described with reference to FIGS. 3A to 3C, FIGS. 4A to 4C, and FIGS. 5A to 5C.

In order to perform uplink control information transmission for 5G data, an uplink resource 608 or 609 for 5G data may be configured for 5G. The location of the uplink resource may be changed depending on the 5G HARQ feedback timing or the design of uplink control information. For example, when the uplink feedback timing for 5G downlink data is defined at a subsequent uplink subframe #4 or #9, the uplink subframe #4 or #9 may be configured as an uplink resource.

Figure 7:
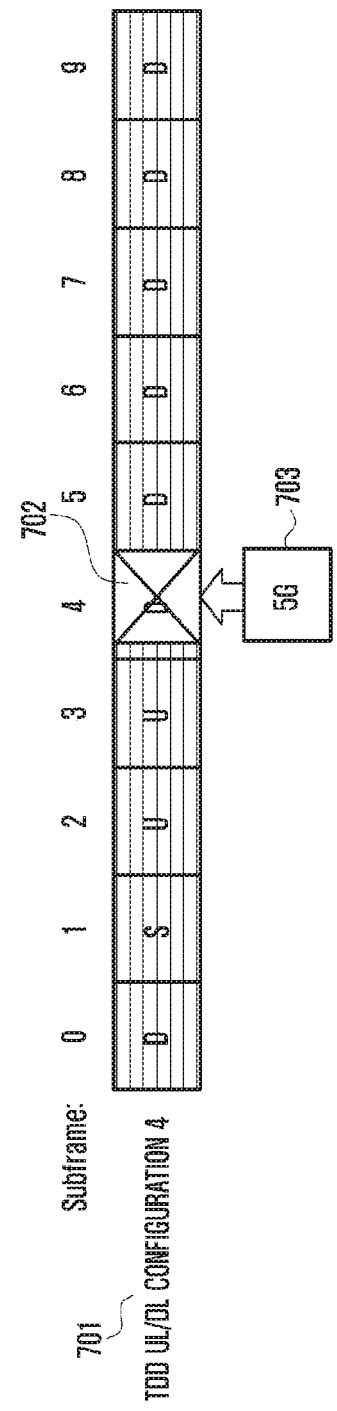
FIG. 7 is a diagram illustrating an example of operating LTE and 5G based on time division using an MBSFN subframe on a single LTE TDD carrier.

FIG. 7 is a diagram illustrating a method of operating LTE data transmission/reception and 5G data transmission/reception based on time division using an MBSFN subframe on one LTE TDD carrier.

In FIG. 7, information associated with TDD 701 (carrier frequency BW and location information, TDD UL-DL configuration information, TDD special subframe configuration information, TDD UL-DL configuration information for operating an eIMTA, and the like) may be transmitted from a 5G base station to a 5G-capable terminal, and the 5G-capable terminal may obtain the information by being synchronized and receiving system information.

Unlike a carrier on which only 5G transmission exists, on a carrier on which LTE and 5G coexist, 5G transmission is allowed only in an MBSFN subframe. Accordingly, a synchronization signal may be transmitted in a subframe which is different from that of the carrier on which only 5G transmission exists. However, in order to maintain a period (e.g., 5 ms) by which a synchronization signal is transmitted, a predetermined MBSFN subframe, for example, subframe #2, #7, or the like, may be configured to always be used for 5G transmission. A terminal may receive, from a base station, information associated with a subframe index and a slot index used for 5G transmission, and may utilize the index information for RS and data reception.

In the TDD 701, when the MBSFN subframe is a downlink subframe, the MBSFN subframe may be selectively configured by an upper signal from among subframes #4, #7, #8, #9, and the like. Subframes used for 5G transmission among the configured MBSFN subframes may be transmitted from a 5G base station to a 5G-capable terminal. Based on the subframe information that the 5G-capable terminal receives, the 5G-capable terminal may determine the resource via which 5G data transmission is performed.

Two OFDM symbols, which are foremost among the 14 OFDM symbols included in the MBSFN subframe, may be used for CRS and control channel transmission for an LTE terminal. Therefore, 5G transmission 702 may be performed in 12 OFDM symbols, excluding the two foremost OFDM symbols, and 5G uplink transmission or downlink transmission 703 needs to be performed from a third OFDM symbol, excluding the two foremost OFDM symbols. Therefore, a 5G terminal may need to be synchronized with the start of the third OFDM symbol so as to obtain a starting point at which 5G uplink transmission or downlink transmission 703 begins.

Also, LTE terminals, which exist in an LTE cell and are capable of supporting transmission modes (TM) 9 and 10, are capable of performing data transmission via a demodulation reference signal (DMRS) and a channel statement information reference signal (CSI-RS) in an MBSFN subframe. Accordingly, LTE transmission and 5G transmission may be divided based on frequency resources in the MBSFN subframe for 5G terminals and LTE terminals. In this instance, LTE transmission and 5G transmission need to have the same numerology. For example, a subcarrier spacing of 15 kHz in LTE also needs to be used for 5G transmission. By applying the method, LTE transmission and 5G transmission may be performed without affecting each other.

To support LTE and 5G to have different numerologies, a guard band to protect LTE transmission is required between an LTE resource and a 5G resource. Therefore, when the guard band is configured, information associated with the guard band may be signaled to a 5G terminal. The 5G terminal may receive the signal, and may receive 5G control information and reference signal or data information in the 5G resource excluding the guard band.

In order to divide the frequency resources, the base station and terminal procedures described with reference to FIGS. 3A to 3C, FIGS. 4A to 4C, and FIGS. 5A to 5C may be applied.

In FIG. 7, MBSFN subframe #4 702 is used for 5G data transmission 703. The detailed procedure for 5G data transmission or reception may conform to the base station and terminal procedures described with reference to FIGS. 3A to 3C, FIGS. 4A to 4C, and FIGS. 5A to 5C.

Uplink control information transmission for 5G data may be performed in the subframe #4. The detailed location thereof in the subframe #4 may be changed depending on 5G HARQ feedback timing or the design of uplink control information.

Figure 8:
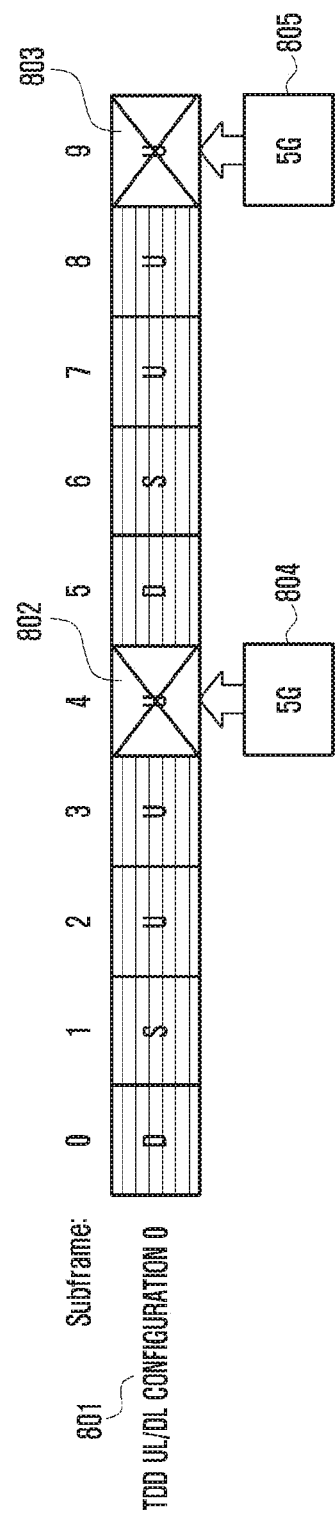
FIG. 8 is a diagram illustrating an example of operating LTE and 5G based on time division using an uplink subframe on a single LTE TDD carrier.

FIG. 8 is a diagram illustrating a method of operating LTE data transmission/reception and 5G data transmission/reception based on time division using an uplink subframe on one LTE TDD carrier.

In FIG. 8, information associated with TDD 801 (carrier frequency BW and location information, TDD UL-DL configuration information, TDD special subframe configuration information, TDD UL-DL configuration information for operating an eIMTA, and the like) may be transmitted from a 5G base station to a 5G-capable terminal, and the 5G-capable terminal may obtain the information by being synchronized and receiving system information.

Unlike a carrier on which only 5G transmission exists, on a carrier on which LTE and 5G coexist, 5G transmission is allowed only in an uplink subframe. Accordingly, a synchronization signal may be transmitted in a subframe which is different from that of the carrier on which only 5G transmission exists. However, in order to maintain a period (e.g., 5 ms) by which a synchronization signal is transmitted, a predetermined uplink subframe, for example, subframe #2, #7, or the like, may be configured to always be used for 5G transmission. A terminal may receive, from a base station, information associated with a subframe index and a slot index used for 5G transmission, and may utilize the index information for RS and data reception.

Uplink subframes used for 5G transmission in TDD 801 may be transmitted from a 5G base station to a 5G-capable terminal. Based on the subframe information that the 5G-capable terminal receives, the 5G-capable terminal may determine a resource via which 5G data transmission is performed.

All of the 14 OFDM symbols may be used for 5G transmission 804 or 805 in a resource 802 or 803 for 5G data, which is configured for 5G uplink transmission or downlink transmission. Therefore, for 5G uplink or downlink transmission 804 or 805, 5G uplink or downlink transmission needs to be started at the start of the first OFDM symbol. The 5G terminal needs to be synchronized with the state of the first OFDM symbol so as to obtain a starting point at which 5G uplink or downlink transmission 804 or 805 begins.

In FIG. 8, uplink subframes #4 and #9 802 and 803 are used for 5G data transmission 804 or 805. The detailed procedure for 5G data transmission or reception may conform to the base station and terminal procedures described with reference to FIGS. 3A to 3C, FIGS. 4A to 4C, and FIGS. 5A to 5C. Uplink control information transmission for 5G data may be performed in the subframe #4 or subframe #9. The detailed location thereof in the subframe #4 or #9 may be changed depending on a 5G HARQ feedback timing or the design of uplink control information.

Figure 9:
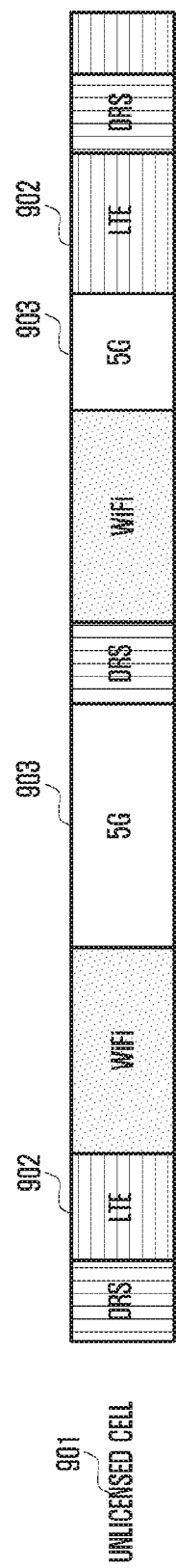
FIG. 9 is a diagram illustrating an example of operating LTE and 5G based on time division using an LAA operation on a single carrier of an unlicensed band.

FIG. 9 is a diagram illustrating a method of operating LTE data transmission/reception and 5G data transmission/reception based on time division using an LAA operation on a single carrier in an unlicensed band.

Although FIG. 9 illustrates an example of applying an LAA operation on a single carrier in an unlicensed band, a method of applying an LAA operation on a single carrier in a licensed band is possible.

In FIG. 9, information associated with a carrier 901 (e.g., carrier frequency BW and location information, discovery reference signal (DRS) configuration information, or the like) may be transmitted from a 5G base station to a 5G-capable terminal. The 5G-capable terminal may obtain the information by being synchronized and receiving system information.

Uplink subframes used for 5G transmission on the carrier 901 may be transmitted from a 5G base station to a 5G-capable terminal. Based on the subframe information that the 5G-capable terminal receives, the 5G-capable terminal may determine the resource via which 5G data transmission is performed.

As an embodiment of FIG. 9, LTE transmission is performed in a resource 902, and 5G transmission is performed in a resource 903. The detailed procedure for 5G data transmission or reception may conform to the base station and terminal procedures described with reference to FIGS. 3A to 3C, 4A to 4C, and 5A to 5C. Uplink control information for 5G data may be transmitted in the resource 903 for the 5G transmission. The detailed location thereof in the resource 903 may be changed depending on a 5G HARQ feedback timing or the design of uplink control information.

Figure 10:
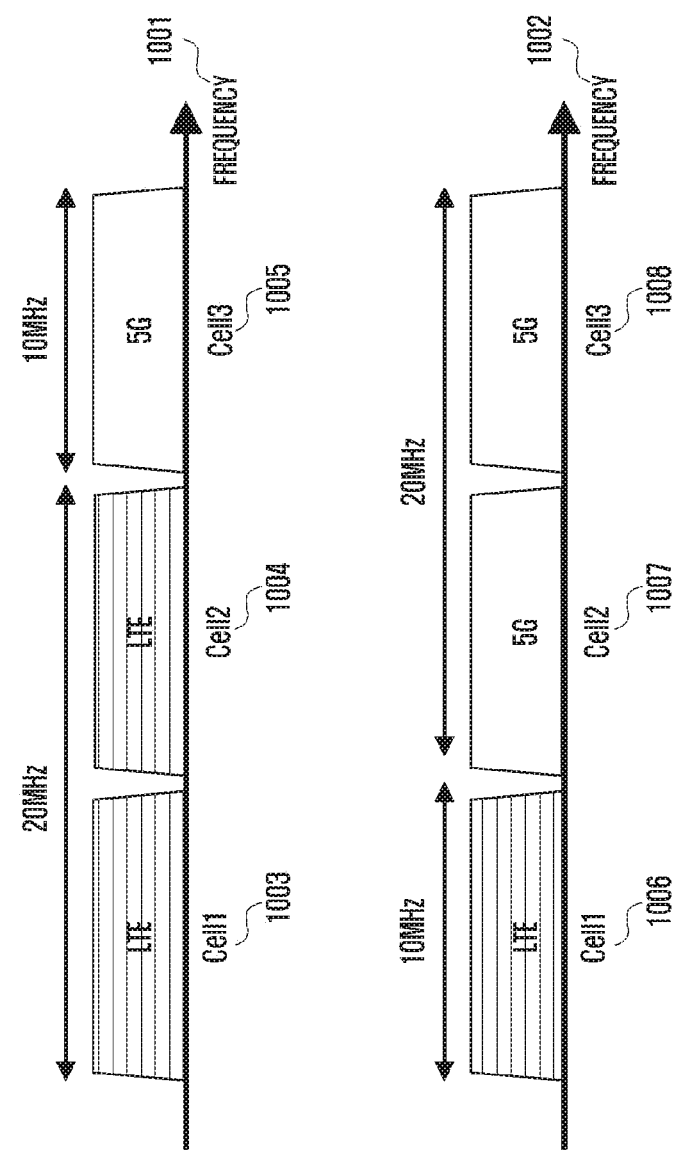
FIG. 10 is a diagram illustrating an example of dividedly operating LTE and 5G using activation and deactivation operations in CA on multiple LTE carriers.

FIG. 10 is a diagram illustrating a method of operating LTE data transmission/reception and 5G data transmission/reception based on frequency division using cell activation or deactivation (activation/deactivation) in the situation in which multiple LTE carriers are carrier aggregated (carrier aggregation).

In FIG. 10, cells 1003 to 1008 may be configured to be duplexing, such as FDD, TDD, and LAA. FDD cell information (DL carrier frequency BW and location information, UL carrier frequency BW and location information, or the like), TDD cell information (carrier frequency BW and location information, TDD UL-DL configuration information, TDD special subframe configuration information, TDD UL-DL configuration information for operating an eIMTA, or the like), or LAA cell information (carrier frequency BW and location information, DRS configuration information, or the like) may be transmitted from a 5G base station to a 5G-capable terminal. The 5G-capable terminal may obtain the information by being synchronized and receiving system information.

The base station may activate or deactivate cells for LTE and 5G transmission so as to prevent or resume data transmission or reception by an LTE terminal in a corresponding cell. Also, the base station may prevent or resume data transmission or reception by 5G terminals. Although the embodiment of FIG. 10 describes an example of activating or deactivating cells, an example in which a base station configures or deconfigures cells in CA so as to separate LTE transmission and 5G transmission in frequency is possible.

Cells used for 5G transmission may be deactivated with respect to LTE terminals, and information associated with the cells may be transmitted from a 5G base station to a 5G-capable terminal. Therefore, the 5G-capable terminal may determine the resource via which 5G data transmission is performed based on the information associated with the cells.

FIG. 10 shows an example in which cell 1 1003, cell 2 1004, and cell 3 1005 are used for an LTE terminal, and cell 3 1005 is deactivated with respect to the LTE terminal and is used for 5G data transmission. When a larger number of cells needs to be deactivated with respect to the LTE terminal and needs to be used for 5G transmission in order to support a larger amount of 5G transmission, the cell 2 1007 may be deactivated with respect to the LTE terminal, and may be additionally used for 5G transmission.

Figure 11A:
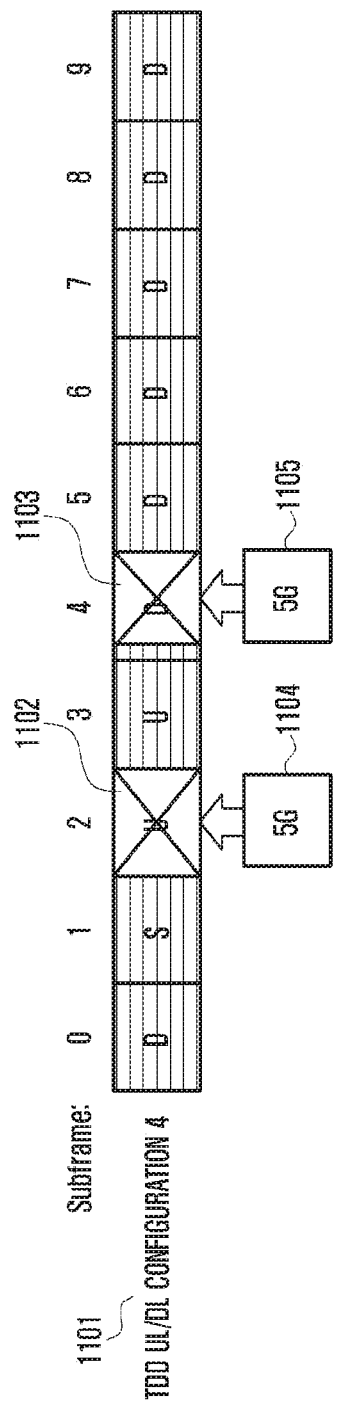
FIGS. 11A to 11C are diagrams illustrating an example of operating LTE data transmission/reception and 5G data transmission/reception based on time division using an MBSFN or uplink subframe on a single LTE TDD carrier.
Figure 11B:
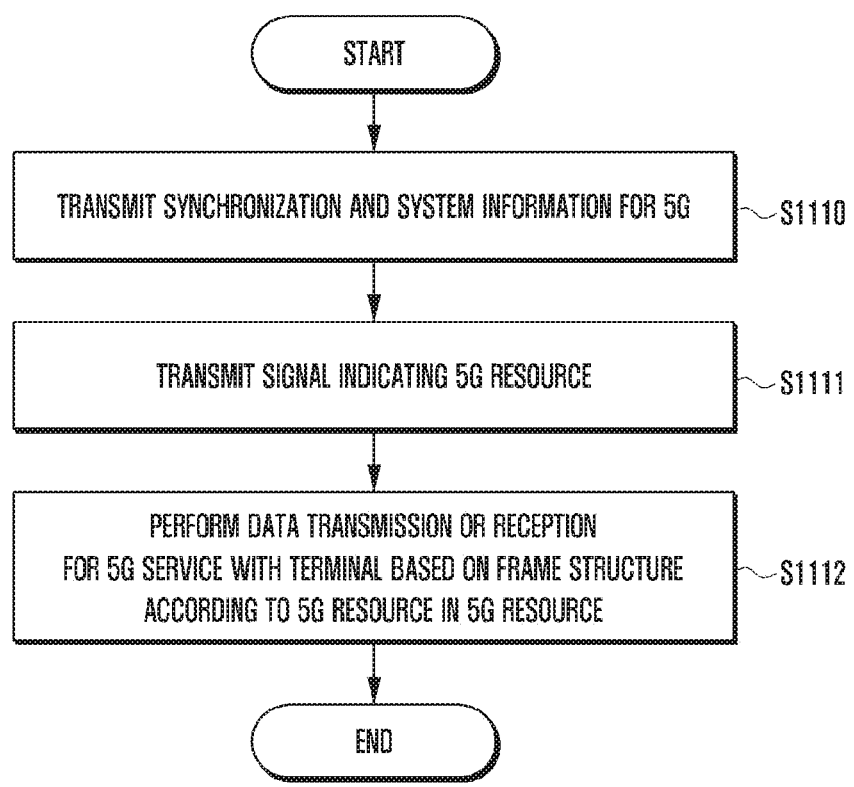
Figure 11C:
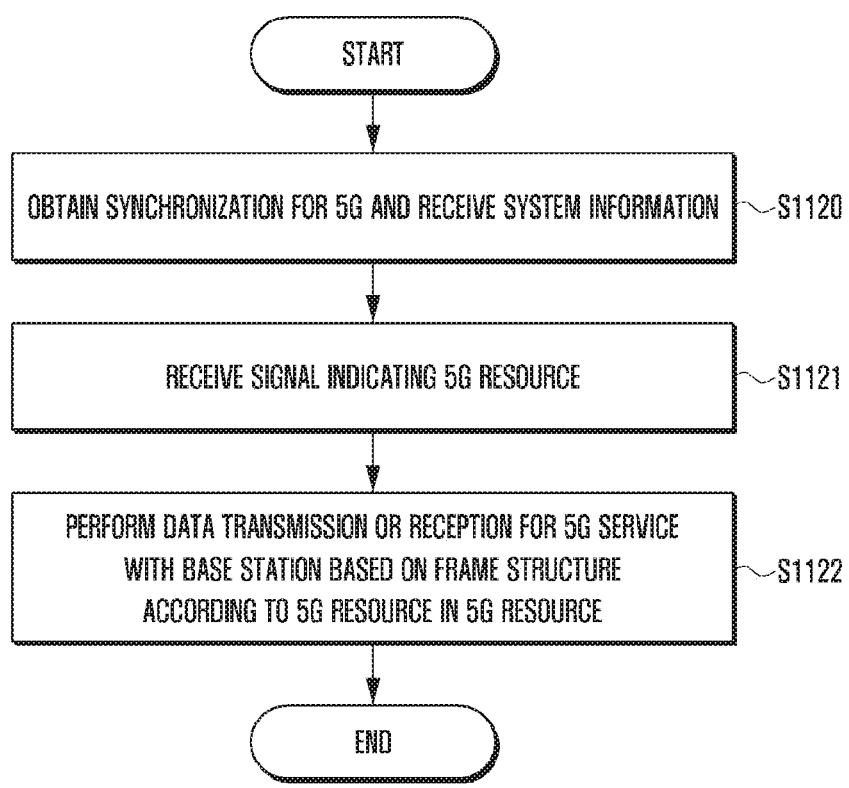

FIGS. 11A to 11C are diagrams illustrating a method of operating LTE data transmission/reception and 5G data transmission/reception based on time division using an MBSFN or uplink subframe on a single LTE TDD carrier.

In FIG. 11A, information associated with TDD 1101 (carrier frequency BW and location information, TDD UL-DL configuration information, TDD special subframe configuration information, TDD UL-DL configuration information for operating an eIMTA, and the like) may be transmitted from a 5G base station to a 5G-capable terminal, and the 5G-capable terminal may obtain the information by being synchronized and receiving system information.

Unlike a carrier on which only 5G transmission exists, on a carrier on which LTE and 5G coexist, 5G transmission is allowed only in an uplink subframe or an MBSFN subframe. Accordingly, a synchronization signal may be transmitted in a subframe which is different from that of the carrier on which only 5G transmission exists. However, in order to maintain a period (e.g., 5 ms) by which a synchronization signal is transmitted, a predetermined uplink subframe or a predetermined MBSFN subframe, for example, subframe #2, #7, or the like, may be configured to always be used for 5G transmission. A terminal may receive, from a base station, information associated with a subframe index and a slot index used for 5G transmission, and may utilize the index information for RS and data reception.

In the TDD 1101, when the MBSFN subframe is a downlink subframe, the MBSFN subframe may be selectively configured by an upper signal from among subframes #4, #7, #8, #9, and the like. Subframes used for 5G transmission among the configured MBSFN subframe or uplink subframes may be transmitted from a 5G base station to a 5G-capable terminal. Based on the subframe information that the 5G-capable terminal receives, the 5G-capable terminal may determine the resource via which 5G data transmission is performed.

Two OFDM symbols, which are foremost among the 14 OFDM symbols included in the MBSFN subframe, may be used for CRS and control channel transmission for an LTE terminal. Therefore, 5G transmission 1105 may be performed in 12 OFDM symbols 1103, excluding the two foremost OFDM symbols, and 5G uplink transmission or downlink transmission 1105 may be performed from a third OFDM symbol excluding the two foremost OFDM symbols. Therefore, a 5G terminal may need to be synchronized with the start of the third OFDM symbol so as to obtain the starting point at which the 5G uplink transmission or downlink transmission 1105 begins.

Also, LTE terminals, which exist in an LTE cell and are capable of supporting transmission modes (TM) 9 and 10, are capable of performing data transmission via a DMRS and a CSI-RS in an MBSFN subframe. Accordingly, LTE transmission and 5G transmission may be divided based on frequency resources in the MBSFN subframe for 5G terminals and LTE terminals. In this instance, LTE transmission and 5G transmission need to have the same numerology. For example, a subcarrier spacing of 15 kHz in LTE also needs to be used for 5G transmission. By applying the method, LTE transmission and 5G transmission may be performed without affecting each other.

To support LTE and 5G having different numerologies, a guard band to protect LTE transmission is required between an LTE resource and a 5G resource. Therefore, when the guard band is configured, information associated with the guard band may be signaled to a 5G terminal. The 5G terminal may receive the signal, and may receive 5G control information and reference signal or data information in the 5G resource, excluding the guard band.

In order to divide the frequency resources, the base station and terminal procedures described with reference to FIGS. 3A to 3C, FIGS. 4A to 4C, and FIGS. 5A to 5C may be applied.

All of the 14 OFDM symbols may be used for 5G transmission 1104 in an uplink subframe 1102 configured for 5G uplink/downlink transmission. Therefore, for 5G uplink or downlink transmission 1104, 5G uplink or downlink transmission needs to be started at the start of the first OFDM symbol. The 5G terminal needs to be synchronized with the state of the first OFDM symbol, so as to obtain a starting point at which 5G uplink or downlink transmission 1104 begins.

In the TDD 1101, when the uplink subframe 1102 and the MBSFN subframe 1103 are used for 5G transmission and the TDD UL-DL configuration is changed by an eIMTA for each radio frame, the 5G base station needs to indicate, to a terminal, whether a resource configured for 5G transmission is an UL subframe or an MBSFN subframe via signal transmission. That is, whether the resource configured for 5G transmission starts from the first OFDM symbol, the second OFDM symbol, or the third OFDM symbol may be indicated, such that the terminal may obtain a signal indicating the information, may determine the starting point of 5G transmission, and may receive a 5G control channel, a 5G reference signal, and 5G data based on a 5G frame structure according to the starting point.

In FIG. 11A, uplink subframes #2 1102 and MBSFN subframe #4 1103 are used for 5G data transmission 1104 or 1105. The detailed procedure for 5G data transmission or reception may be performed according to the base station and terminal procedures described with reference to FIGS. 3B and 3C, FIGS. 4B and 4C, and FIGS. 5B to 5C. Also, 5G base station and 5G terminal procedures, which are changed as the starting point is changed depending on which subframe is configured as the 5G resource, will be described.

First, referring to FIG. 11B, a 5G base station procedure will be described.

In operation S1110, the 5G base station transmits synchronization and system information for 5G to a 5G-capable terminal in a resource configured for 5G transmission. The synchronization signal for 5G may be designed to always be transmitted from a third OFDM. Therefore, this helps erase the effect of whether a subframe for 5G transmission starts from a first OFDM symbol, a second OFDM symbol, or a third OFDM symbol when obtaining synchronization and system information for 5G. However, the embodiments of the disclosure are not limited thereto.

A synchronization signal for 5G may be a synchronization signal different for each of eMBB, mMTC, and URLLC, which use different numerologies, or may be a common synchronization signal transmitted via a predetermined 5G resource using one numerology. The system information may be a common system signal transmitted via a predetermined 5G resource using one numerology, or may be different system information for each of eMBB, mMTC, and URLLC, which use different numerologies.

In operation S1111, the 5G base station transmits a signal indicating 5G resource allocation to a 5G terminal. When the 5G resource allocation signal is transmitted to a 5G-capable terminal, the signal may be an upper signal or may be a physical signal. The LTE or 5G resource allocation signal is information indicating where an LTE or 5G resource is located, and may include frequency information (a carrier frequency, a physical resource block, or the like), time information (a radio frame index, a subframe index, MBSFN subframe information for 5G transmission, uplink subframe information for 5G transmission, information on a blank resource which is determined not to be used by 5G terminals for 5G transmission, or the like), antenna information, spatial information, duplexing information (FDD DL, UL carrier information, TDD UL/DL configuration information, LAA-operation-related information), a signal used for a terminal to recognize, in real time, whether an LTE/5G resource is occupied by transmission of a reference signal or a synchronization signal, or the like. Also, the 5G resource allocation signal may include information indicating whether a 5G resource is an LTE uplink subframe or an LTE MBSFN subframe. Also, the 5G resource allocation signal may include information indicating whether a 5G resource starts from a first OFDM symbol, a second OFDM symbol, or a third OFDM symbol. Also, the 5G resource allocation signal may include offset information indicating the location where a 5G resource starts in each subframe or each slot. Also, the 5G resource allocation signal may include information indicating whether 12 OFDM symbols, 13 OFDM symbols, or 14 OFDM symbols are to be used for 5G transmission. Synchronization information of an LTE system may be additionally obtained by the 5G-capable terminal, or the value of the difference between LTE synchronization and 5G synchronization may be transmitted by the 5G base station.

When an integrated controller exists, LTE or 5G resource allocation may be determined by the integrated controller and may be transmitted to the 5G base station via an X2. Therefore, when the LTE system and the 5G system are operated in different resources by dividing resources, the integrated controller may select resource allocation to the LTE system and the 5G system, and may transmit allocation information to a base station via the X2, whereby the resources for the LTE system and the 5G system may be separately used.

When no integrated controller exists, an LTE base station or a 5G base station may select LTE or 5G resource allocation and transmit the same to another base station, as shown in the base station procedure of FIG. 4B.

In operation S1112, the 5G base station may perform transmission or reception of data, control information, and reference signals for 5G service with a terminal based on a frame structure associated with the location where a 5G resource starts in the 5G resource (e.g., whether an OFDM symbol where 5G transmission starts is a first OFDM symbol, a second OFDM symbol, or a third OFDM symbol), or the size that a 5G resource occupies in a single subframe (e.g., whether 5G transmission transmits over 14, 13, or 12 OFDM symbols).

Subsequently, referring to FIG. 11C, a 5G terminal procedure will be described.

In operation S1120, the 5G terminal is synchronized and obtains system information for 5G from a 5G base station. The synchronization signal for 5G may be designed to always be transmitted from a third OFDM. Therefore, this helps erase the effect of whether a subframe for 5G transmission starts from a first OFDM symbol, a second OFDM symbol, or a third OFDM symbol when obtaining synchronization and system information for 5G.

The synchronization signal for 5G may be a synchronization signal different for each of eMBB, mMTC, and URLLC, which use different numerologies, or may be a common synchronization signal received via a predetermined 5G resource using one numerology. The system information may be a common system signal received via a predetermined 5G resource using one numerology, or may be different system information for each of eMBB, mMTC, and URLLC, which use different numerologies.

In operation S1121, the 5G terminal may receive a signal indicating 5G resource allocation from the 5G base station. The 5G resource allocation signal may be an upper signal or may be a physical signal. The LTE or 5G resource allocation signal is information indicating where an LTE or 5G resource is located, and may include frequency information (a carrier frequency, a physical resource block, or the like), time information (a radio frame index, a subframe index, MBSFN subframe information for 5G transmission, uplink subframe information for 5G transmission, information on a blank resource which is determined not to be used by 5G terminals for 5G transmission, or the like), antenna information, spatial information, duplexing information (FDD DL, UL carrier information, TDD UL/DL configuration information, LAA-operation-related information), a signal used for a terminal to recognize, in real time, whether an LTE/5G resource is occupied by transmission of a reference signal or a synchronization signal, or the like. Also, the 5G resource allocation signal may include information indicating whether a 5G resource is an LTE uplink subframe or an LTE MBSFN subframe. Also, the 5G resource allocation signal may include information indicating whether a 5G resource starts from a first OFDM symbol, a second OFDM symbol, or a third OFDM symbol. Also, the 5G resource allocation signal may include offset information indicating the location where a 5G resource starts in each subframe or each slot. Also, the 5G resource allocation signal may include information indicating whether 12 OFDM symbols, 13 OFDM symbols, or 14 OFDM symbols are to be used for 5G transmission. Synchronization information of an LTE system may be additionally obtained by the 5G-capable terminal, or the value of the difference between 5G synchronization and LTE synchronization may be received from the 5G base station.

In operation S1122, based on the signal received in operation S1121, the 5G terminal may determine the location where the 5G resource starts in the 5G transmission resource (e.g., whether an OFDM symbol where 5G transmission starts is a first OFDM symbol, a second OFDM symbol, or a third OFDM symbol) or the size that the 5G resource occupies in a single subframe (e.g., whether 5G transmission is transmitted over 14, 13, or 12 OFDM symbols), may perform transmission or reception of data, control information, and reference signals for a 5G service with a base station based on a frame structure associated with the determined 5G resource size and the location where the 5G resource starts.

Figure 12:
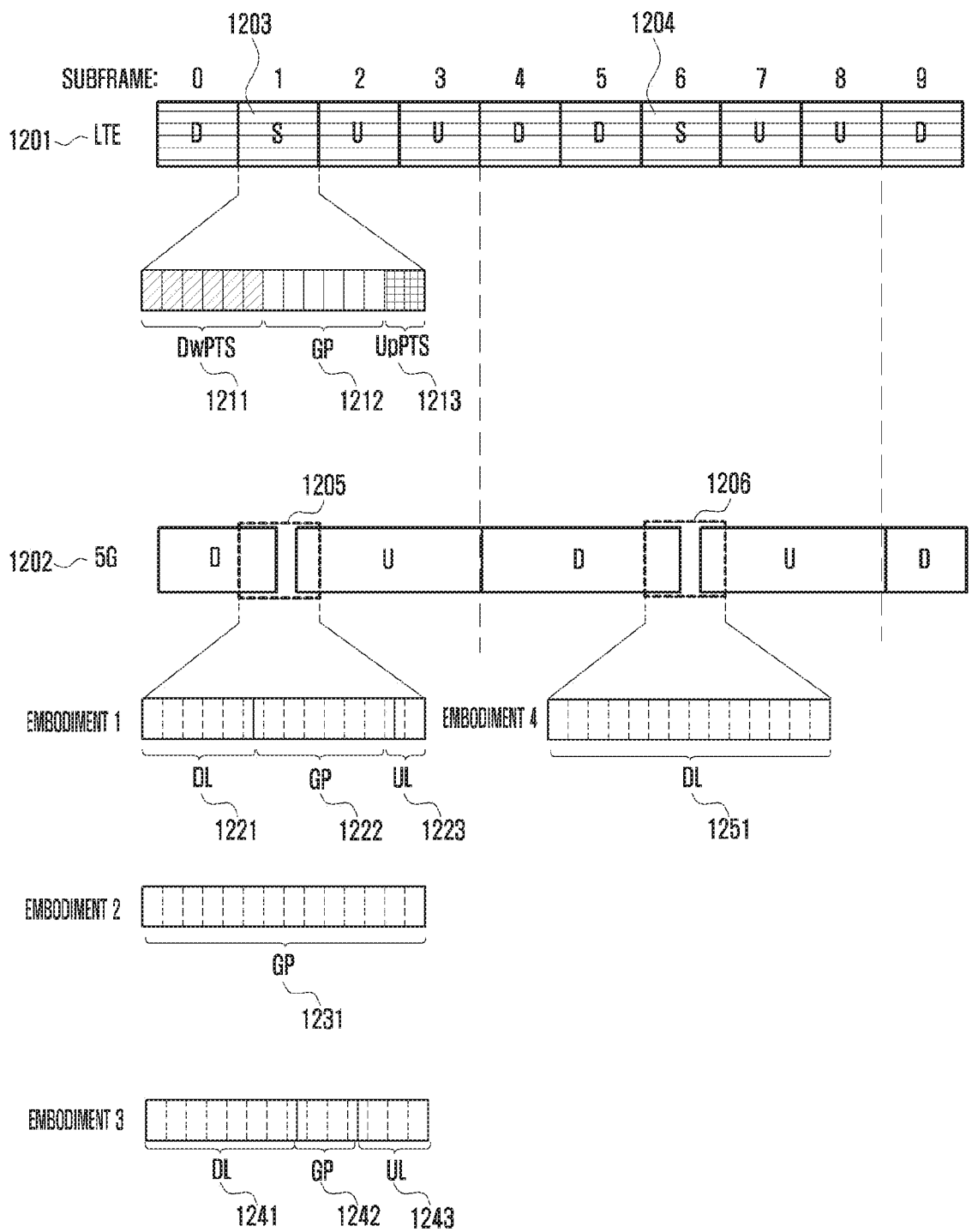
FIG. 12 is a diagram illustrating an example in which an LTE base station and a 5G base station operate LTE transmission/reception and 5G transmission/reception independently and respectively, without dividing resources in a single LTE TDD carrier based on time or frequency.

FIG. 12 is a diagram illustrating a method in which an LTE base station and a 5G base station operate LTE transmission/reception and 5G transmission/reception independently and respectively without time or frequency resource division on one LTE TDD carrier.

An interference problem needs to be taken into consideration when the LTE base station and the 5G base station perform transmission or reception independently. Interference in transmission performed in the same direction between the LTE base station and the 5G base station (i.e., interference between LTE downlink transmission and 5G downlink transmission or interference between LTE uplink transmission and 5G uplink transmission) may be similar to interference between LTE base stations, and may be overcome by implementation by the LTE base station or the 5G base station. However, a method of removing interference in transmission performed in different directions between the LTE base station and the 5G base station (i.e., interference between LTE downlink transmission and 5G uplink transmission or interference between LTE uplink transmission and 5G downlink transmission) may be required, and the disclosure may provide a method of removing such interference.

Referring to FIG. 12, FIG. 12 illustrates a method in which an LTE base station 1201 and a 5G base station 1202 respectively operate TDD. TDD information (carrier frequency BW and location information, TDD UL-DL configuration information, TDD special subframe configuration information, dynamic TDD UL-DL configuration information for operating an eIMTA, or the like) of each base station may be transmitted from the 5G base station to a 5G-capable terminal. Therefore, the 5G-capable terminal may obtain the above-described information by being synchronized and receiving system information.

The LTE base station 1201 may perform transmission or reception of a signal according to TDD UL-DL configuration, and the 5G base station 1202 may perform uplink transmission or downlink transmission based on the TDD UL-DL configuration of the LTE base station 1201. That is, in subframes #0, #4, #5, and #9, which the LTE base station 1201 operates as a downlink, the 5G base station 1202 may also operate the same frequency resources as a downlink. In subframes #2, #3, #7, and #8, which the LTE base station 1201 operates as an uplink, the 5G base station 1202 may also operate the same frequency resources as an uplink. Through the above-described method, the LTE base station and the 5G base station may remove interference caused by transmission performed in different directions.

The 5G terminal may obtain information associated with whether the 5G base station 1202 operates a transmission resource as an uplink or a downlink via a signal from the 5G base station, and the 5G terminal may identify uplink and downlink resource operation information of the 5G base station using the information.

In LTE UL-DL configuration, a special subframe 1203 or 1204 exists. The special subframe 1203 or 1204 may be configured to include a downlink pilot time slot (DwPTS) 1211, in which downlink transmission is performed, a guard period (GP) 1212 for a propagation delay time and a terminal RF switching delay time, and an uplink pilot time slot (UpPTS) 1213 in which uplink transmission is performed.

When the 5G base station operates a frequency resource 1205 or 1206 in the subframes #1 and #6 in which the LTE base station operates the special subframes, the LTE base station may need a method of removing interference associated with transmission in a different direction.

When LTE transmission and 5G transmission have the same numerology, for example, when a subcarrier spacing of 15 kHz is also used for 5G transmission in LTE, the 5G base station may perform downlink transmission in 6 OFDM symbols that the LTE base station operates as the DwPTS 1211, and may perform uplink transmission in two OFDM symbols that the LTE base station operates as the UpPTS 1213. When the LTE transmission and 5G transmission have different numerologies, for example, when a subcarrier spacing greater than or equal to 15 kHz is used or a shorter transmission time instance (TTI) is used in 5G, the methods of first to fourth embodiments of FIG. 12 will be used.

The first embodiment of FIG. 12 provides a method in which a 5G base station performs downlink transmission in a resource 1221 within the DwPTS 1211 and performs uplink transmission in a resource 1223 within the UpPTS 1213. LTE transmission and 5G transmission have different numerologies and thus may have different TTIs. Accordingly, the 5G base station performs downlink transmission 1221 so as not to exceed the DwPTS 1211 according to the TTI in which 5G transmission is allowed, and may perform uplink transmission 1223 so as not to go beyond the end point where UpPTS 1213 ends according to the TTI in which 5G transmission is allowed.

The second embodiment of FIG. 12 provides a method in which a 5G base station does not perform any transmission in a subframe that an LTE base station operates as a special subframe. The subframe may be used as a resource that is reserved as a blank resource for a service to be determined in the future.

The third embodiment of FIG. 12 provides a method in which a 5G base station performs downlink transmission in a resource 1241 that goes beyond the DwPTS 1211 and performs uplink transmission in a resource 1243 that goes beyond the UpPTS 1243, within the range within which the 5G base station does not cause interference associated with transmission in a different direction to the LTE base station.

Therefore, when the 5G base station has smaller cell coverage than that of LTE, the 5G base station may perform uplink and downlink transmission using a larger amount of resources via the above-described method.

The fourth embodiment of FIG. 12 provides a method in which a 5G base station uses all of the special subframe 1204 for downlink transmission 1251 when an LTE base station uses a special subframe as a downlink subframe via an eIMTA.

In the first through 4th embodiments of FIG. 12, a 5G base station may transmit information, associated with the interval in which downlink transmission is performed and the interval in which uplink transmission is performed, to a 5G terminal via a signal. The 5G terminal receives the signal and obtains the information, and may identify information indicating whether the TDD frequency resource is operated as a downlink or uplink based on the information.

The arrangement of an LTE base station and a 5G base station in the TDD frequency resources may conform to the arrangement of FIGS. 3A, 4A, and 5A, and base station and terminal procedures described in FIGS. 3B and 3C, 4B and 4C, and 5B and 5C may be applied thereto.

Figure 13A:
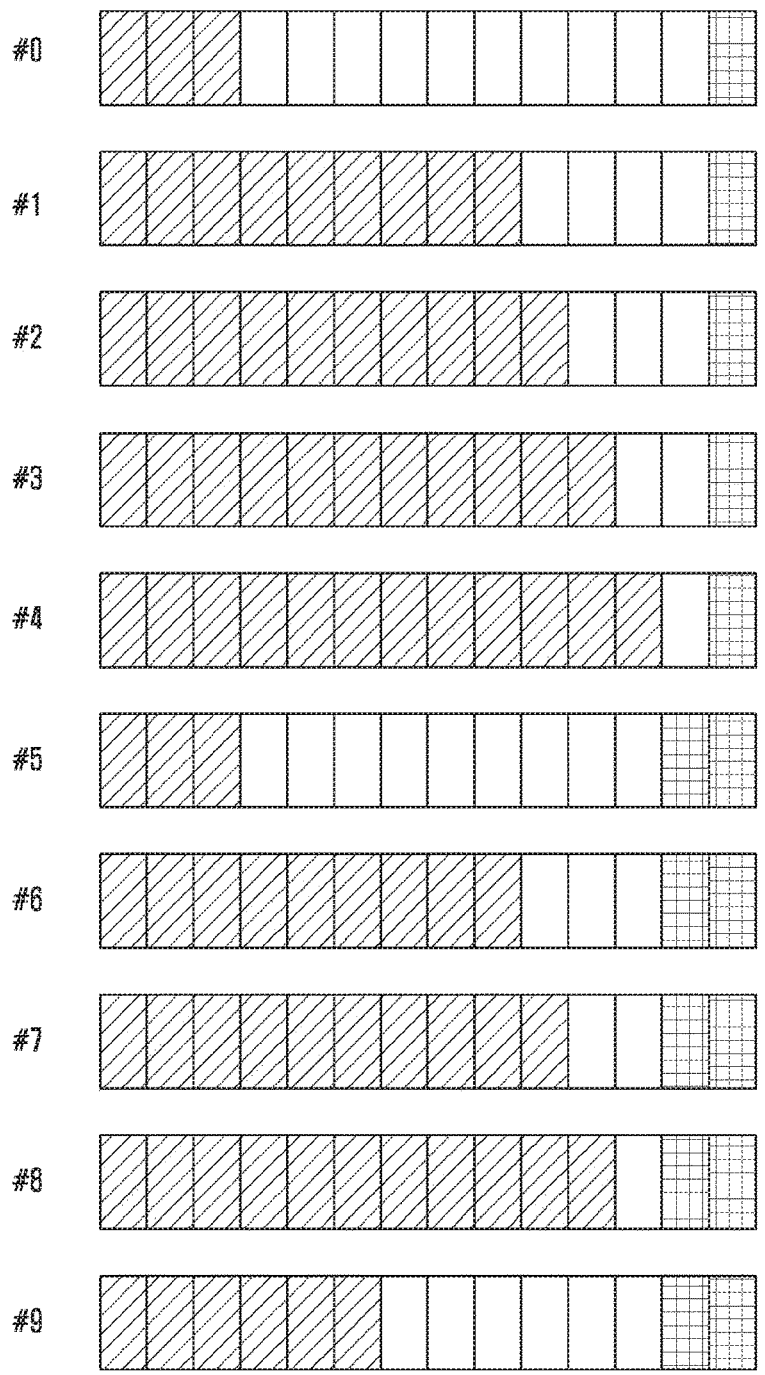
FIGS. 13A and 13B are diagrams illustrating a special subframe configuration in LTE according to embodiments of the disclosure.
Figure 13B:
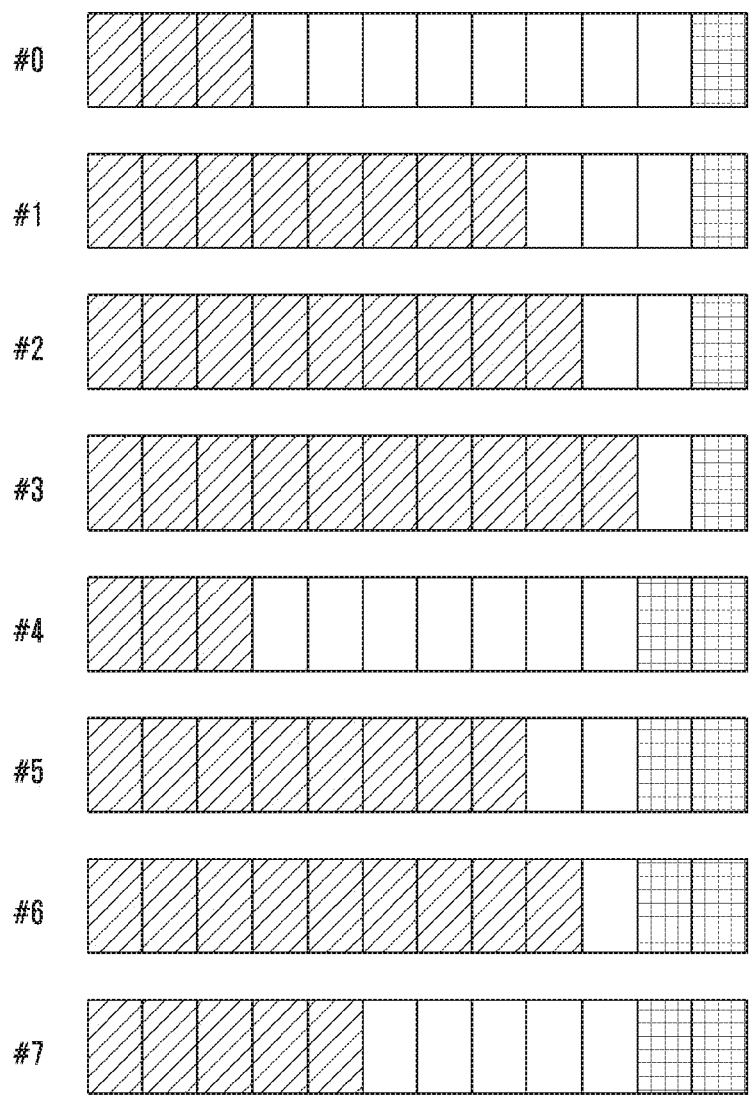

FIGS. 13A and 13B are diagrams illustrating a special subframe configuration in LTE according to embodiments of the disclosure.

A special subframe configuration defines the lengths of a DwPTs, a GP, and an UpPTS of a special subframe. 10 special subframe configurations 1301 of FIG. 13A and 8 special subframe configurations 1311 of FIG. 13B may be defined depending on whether a cyclic prefix (CP) applied in downlink is a normal cyclic prefix or an extended cyclic prefix. Whether a cyclic prefix applied in downlink is a normal cyclic prefix or an extended cyclic prefix may be determined when a terminal decodes a synchronization signal received in a cell or the like.

When a cyclic prefix is a normal cyclic prefix in each special subframe of TDD operated by an LTE base station of FIG. 12, one of the 10 special subframe configurations 1301 of FIG. 13A may be selected according to cell coverage. When the cyclic prefix is an extended cyclic prefix, one of the 8 special subframe configurations 1311 of FIG. 13B may be selected according to cell coverage. When the LTE base station performs LTE transmission according to the selected special subframe configuration, the 5G base station may transmit signaling associated with a 5G resource to 5G terminals according to the above-described embodiment of FIG. 12 so as not to affect the LTE transmission, and the 5G terminals may receive the signaling and may recognize resources for 5G downlink transmission and uplink transmission.

Figure 14A:
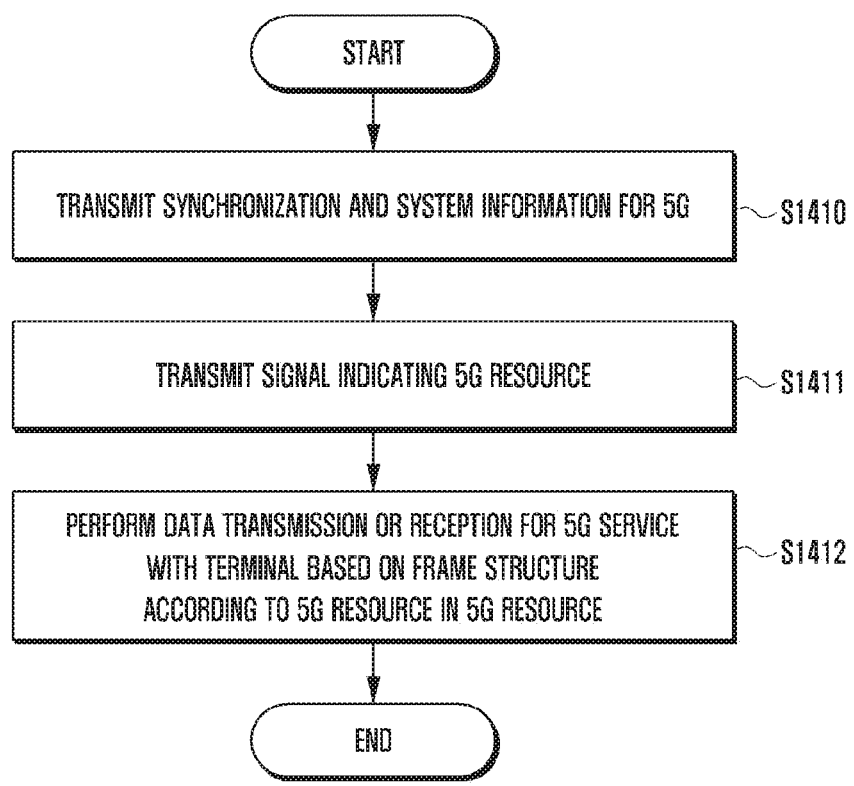
FIGS. 14A and 14B are diagrams illustrating a base station procedure and a terminal procedure according to embodiments of the disclosure of FIG. 12.
Figure 14B:
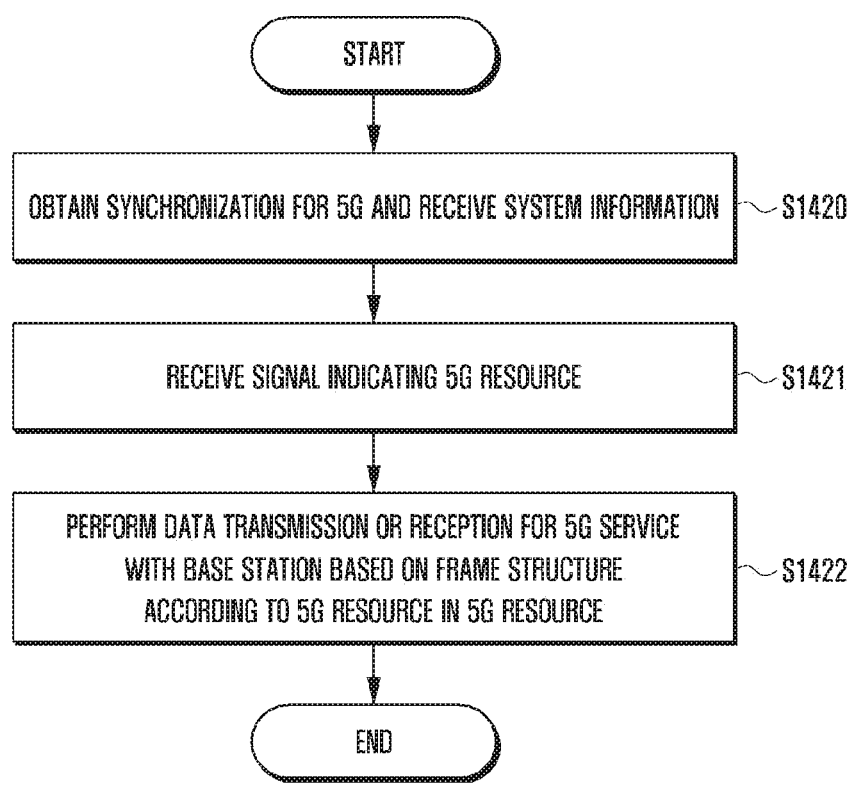

FIGS. 14A and 14B are diagrams illustrating base station and terminal procedures according to embodiments of the disclosure of FIG. 12.

With reference to FIGS. 14A and 14B, the base station and terminal procedures according to embodiments of the disclosure of FIG. 12 will be described.

First, referring to FIG. 14A, a 5G base station procedure will be described.

In operation S1410, a 5G base station transmits synchronization and system information for 5G to a 5G-capable terminal in a resource configured for 5G transmission. The synchronization signal for 5G may be a synchronization signal different for each of eMBB, mMTC, and URLLC, which use different numerologies, or may be a common synchronization signal transmitted via a predetermined 5G resource using one numerology. The system information may be a common system signal transmitted via a predetermined 5G resource using one numerology, or may be different system information for each of the eMBB, mMTC, and URLLC, which use different numerologies.

In operation S1411, the 5G base station transmits a signal indicating 5G resource allocation to a 5G terminal. When a 5G resource allocation signal is transmitted to a 5G-capable terminal, the signal may be an upper signal or may be a physical signal. The LTE or 5G resource allocation signal is information indicating where an LTE or 5G resource is located, and may include frequency information (a carrier frequency, a physical resource block, or the like), time information (a radio frame index, a subframe index, MBSFN subframe information for 5G transmission, uplink subframe information for 5G transmission, information on a blank resource which is determined not to be used by 5G terminals for 5G transmission, or the like), antenna information, spatial information, duplexing information (FDD DL, UL carrier information, TDD UL/DL configuration information, LAA-operation-related information), a signal used for a terminal to recognize, in real time, whether an LTE/5G resource is occupied by transmission of a reference signal or a synchronization signal, or the like. Also, the 5G resource allocation signal may include information indicating whether a 5G resource according to FIGS. 12, 13A and 13B is an LTE special subframe. Also, the 5G resource allocation signal may be a signal indicating where 5G downlink transmission according to FIGS. 12, 13A, and 13B starts and ends, and where 5G uplink transmission starts and ends. Synchronization information of an LTE system may be additionally obtained by the 5G-capable terminal, or the value of the difference between 5G synchronization and LTE synchronization may be transmitted by the 5G base station.

When an integrated controller exists, LTE or 5G resource allocation may be determined by the integrated controller, and may be transmitted to the 5G base station via an X2. Therefore, when the LTE system and the 5G system are operated in different resources by dividing resources, the integrated controller may select resource allocation to the LTE system and the 5G system, and may transmit allocation information to the base station via the X2, whereby the resources for the LTE system and the 5G system may be separately used.

When no integrated controller exists, the LTE base station or the 5G base station may select LTE or 5G resource allocation and transmit the same to another base station, as shown in the base station procedure of FIG. 4B.

In operation S1412, the 5G base station performs transmission or reception of data, control information, and reference signals for a 5G service with a terminal based on the locations where 5G uplink or downlink transmission starts and ends in the 5G resource.

Subsequently, referring to FIG. 14B, a 5G terminal procedure will be described.

In operation S1420, the 5G terminal is synchronized and obtains system information for 5G from a 5G base station. The synchronization signal for 5G may be a synchronization signal different for each of eMBB, mMTC, and URLLC, which use different numerologies, or may be a common synchronization signal transmitted via a predetermined 5G resource using one numerology. The system information may be a common system signal transmitted via a predetermined 5G resource using one numerology, or may be different system information for each of eMBB, mMTC, and URLLC, which use different numerologies.

In operation S1421, the 5G terminal may receive a signal indicating 5G resource allocation from the 5G base station. The 5G resource allocation signal may be an upper signal or may be a physical signal. The LTE or 5G resource allocation signal is information indicating where an LTE or 5G resource is located, and may include frequency information (a carrier frequency, a physical resource block, or the like), time information (a radio frame index, a subframe index, MBSFN subframe information for 5G transmission, uplink subframe information for 5G transmission, information on a blank resource which is determined not to be used by 5G terminals for 5G transmission, or the like), antenna information, spatial information, duplexing information (FDD DL, UL carrier information, TDD UL/DL configuration information, LAA-operation-related information), a signal used for a terminal to recognize, in real time, whether an LTE/5G resource is occupied by transmission of a reference signal or a synchronization signal, or the like. Also, the 5G resource allocation signal may include information indicating whether a 5G resource is an LTE special subframe according to FIGS. 12, 13A and 13B. Also, the 5G resource allocation signal may be a signal indicating where 5G downlink transmission according to FIGS. 12, 13A, and 13B starts and ends, and where 5G uplink transmission starts and ends. Synchronization information of an LTE system may be additionally obtained by the 5G-capable terminal, or a value of the difference between 5G synchronization and LTE synchronization may be received from the 5G base station.

In operation S1422, the 5G terminal may perform transmission or reception of data, control information, and reference signals for a 5G service with a base station, based on a 5G resource size determined based on the locations where the 5G uplink or downlink transmission starts and ends, which is obtained from the signal received in operation S1421.

FIG. 15 is a diagram illustrating a method of aligning OFDM symbol lengths of frame structures based on various numerologies.

Since 5G needs to support different numerologies, particularly, different subcarrier spacings, for services, different numerologies may be multiplexed in the time or frequency on a single carrier. In this instance, as a subcarrier spacing becomes wider, an OFDM symbol length becomes shorter. Accordingly, when services having different subcarrier spacings are supported, the length of a slot or subframe may be changed according to the number of OFDM symbols. In this instance, not all of the resource may be used, or interference may occur during coexistence with LTE and resource may not be effectively used. Therefore, although different subcarrier spacings are used, an OFDM symbol length needs to be adjusted to be aligned with an OFDM symbol length based on 15 kHz used in LTE.

In LTE, a first OFDM symbol in each slot is designed to have a cyclic prefix longer than those of the 6 remaining OFDM symbols. Accordingly, in order to align OFDM symbol lengths according to the OFDM symbol length based on 15 kHz, the cyclic prefix of a first OFDM symbol for each 0.5 ms of a different subcarrier spacing needs to be adjusted to be suitable for the length of a first OFDM symbol for each 0.5 ms in 15 kHz.

Referring to FIG. 15, diagram 1501 illustrates an OFDM symbol length in 15 kHz. Particularly, a first OFDM symbol has a length of 71.875 us 1511 including a cyclic prefix of 5.208 us. The 6 remaining OFDM symbols have a length of 71.354 us 1512 including a cyclic prefix having a length of 4.688 us, respectively.

Diagram 1502 of FIG. 15 illustrates a method of configuring OFDM symbols in 30 kHz to be aligned with OFDM symbols in 15 kHz. In 30 kHz, the number of OFDM symbols may be the double the number of OFDM symbols in 15 kHz, and the length of an OFDM symbol is reduced by half. In this instance, when a cyclic prefix of a first OFDM symbol for each 0.5 ms is set to 5.208−4.688/2=2.865 us, the length of one OFDM symbol in 15 kHz and the length of two OFDM symbols in 30 kHz become equal.

Diagram 1503 of FIG. 15 illustrates a method of configuring OFDM symbols in 60 kHz to be aligned with OFDM symbols in 15 kHz. In 60 kHz, the number of OFDM symbols may be the double the number of OFDM symbols in 30 kHz, and the length of an OFDM symbol is reduced by half. In this instance, when a cyclic prefix of a first OFDM symbol for each 0.5 ms is set to 2.865−2.344/2=1.693 us, the length of one OFDM symbol in 15 kHz and the length of four OFDM symbols in 60 kHz become equal.

Diagram 1504 of FIG. 15 illustrates a method of configuring OFDM symbols in 120 kHz to be aligned with OFDM symbols in 15 kHz. In 120 kHz, the number of OFDM symbols may be the double the number of OFDM symbols in 60 kHz, and the length of an OFDM symbol is reduced by half. In this instance, when a cyclic prefix of a first OFDM symbol for each 0.5 ms is set to 1.693−1.172/2=1.107 us, the length of one OFDM symbol in 15 kHz and the length of eight OFDM symbols in 120 kHz become equal.

In the same manner, an OFDM symbol length when a subcarrier spacing is longer than the above-described case may be aligned with the OFDM symbol length in 15 kHz.

Figure 16A:
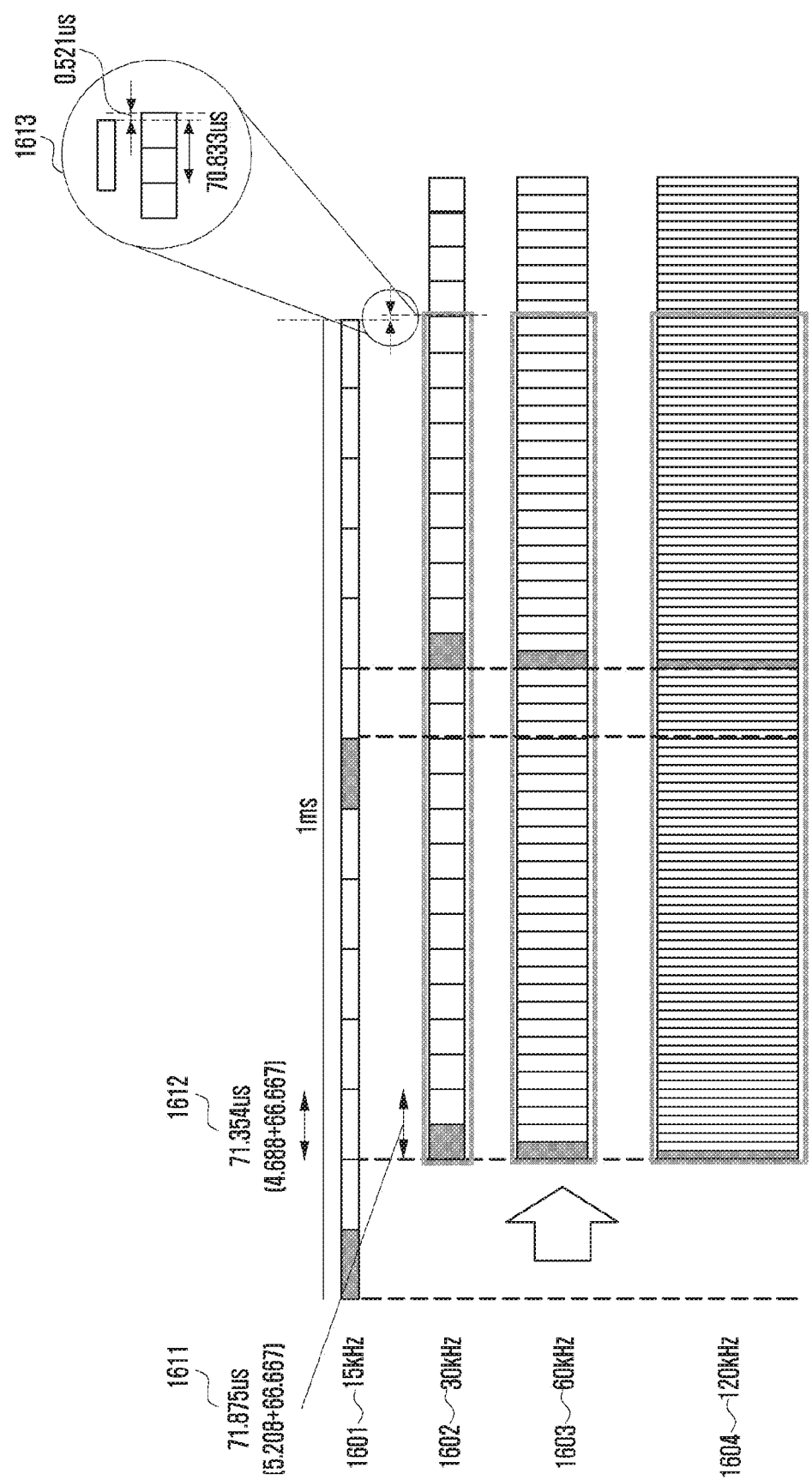
FIGS. 16A and 16B are diagrams illustrating the frame structure that is needed when 5G transmission is performed via an MBSFN subframe in frame structures based on various numerologies.
Figure 16B:
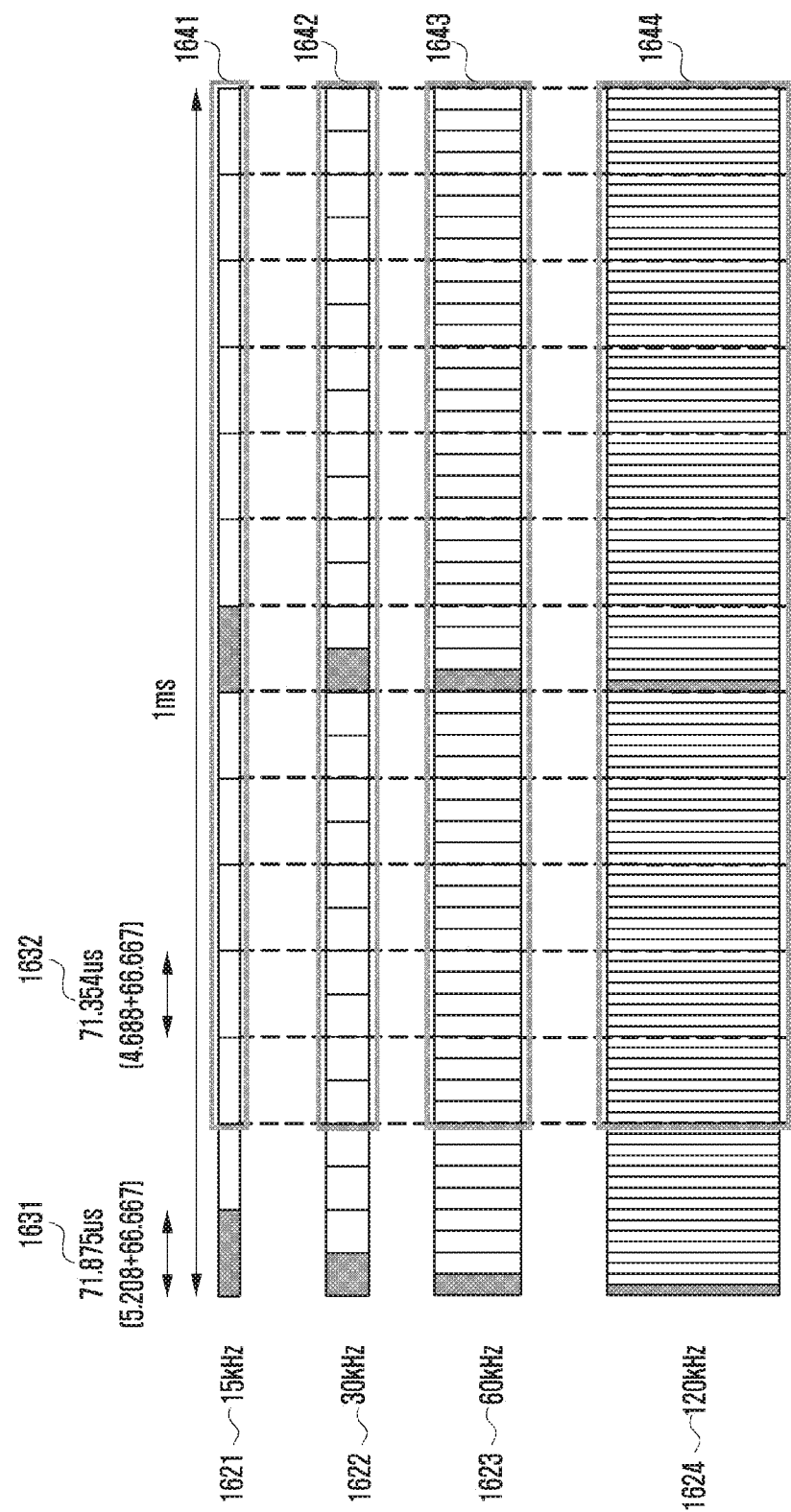

FIGS. 16A and 16B are diagrams illustrating a frame structure needed when 5G transmission is performed via an MBSFN subframe in frame structures based on various numerologies.

An issue associated with when an MBSFN subframe is used for the coexistence of LTE and NR, and when an OFDM symbol length in 15 kHz and OFDM symbols in different subcarrier spacings are aligned in the case in which various subcarrier spacing are supported as shown in FIG. 15, and a solution therefor will be described with reference to FIGS. 16A and 16B.

As described in FIGS. 11A to 11C of the disclosure, an MBSFN subframe in LTE may be utilized for NR transmission. However, first two OFDM symbols are used for PDCCH transmission of LTE and thus, an NR signal may be transmitted in the 12 remaining OFDM symbols. Therefore, a frame structure that enables NR transmission to start from a third OFDM symbol is needed. The frame structure needs to be aligned with the length of OFDM symbols of 15 kHz. The embodiment illustrates an example in which an NR signal is transmitted in the 12 remaining OFDM symbols since first two OFDM symbols are used for PDCCH transmission of LTE. However, the embodiment may be applicable to the case in which a first OFDM symbol is used for PDCCH transmission of LTE and an NR signal is transmitted in the remaining 13 OFDM symbols.

Referring to FIG. 16A, when a different subcarrier spacing 1602, 1603, or 1604 is used, a frame structure may be shifted such that NR transmission starts from a third OFDM symbol of 15 kHz. In this instance, as shown in diagram 1613, when a service is provided using a subcarrier spacing of 30 kHz, an OFDM symbol length in 15 kHz and the length of OFDM symbols in 30 kHz are not aligned and thus, NR transmission may not be performed during 0.521 us of a last OFDM symbol. In order to solve the drawback, when a different subcarrier spacing 1622, 1623, or 1624 is used as shown in FIG. 16B, a part corresponding to the length to a second OFDM symbol of 15 kHz is not used, but symbol alignment may be continuously maintained by using a slot 1641, 1642, 1643, or 1644 corresponding to a part from a third OFDM symbol to an $14^{th}$ OFDM symbol of 15 kHz.

Figure 17:
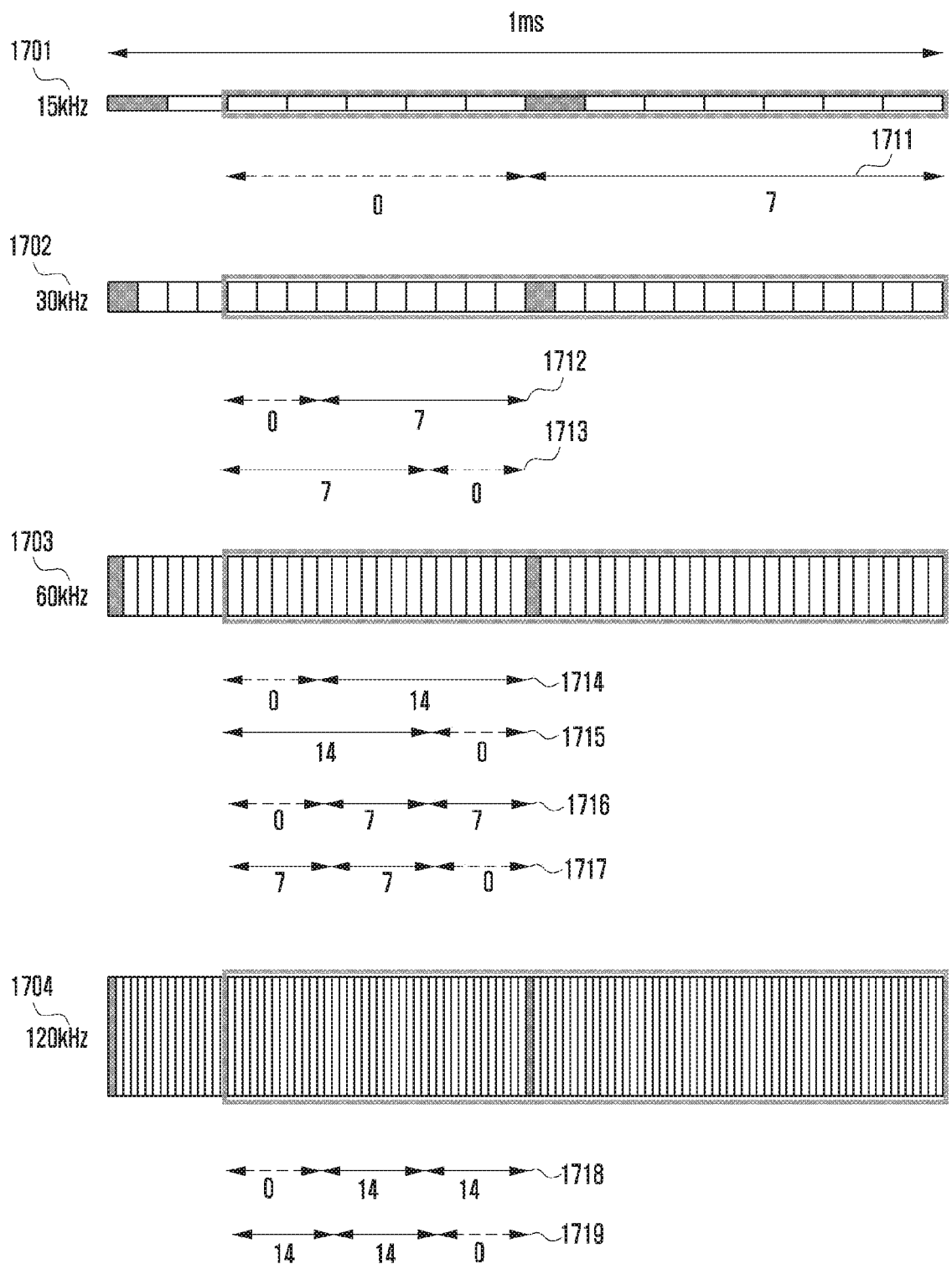
FIG. 17 is a diagram illustrating an embodiment that supports NR transmission without changing the length of an NR slot when 5G transmission is performed via an MBSFN subframe.

Subsequently, FIG. 17 is a diagram illustrating an embodiment that supports NR transmission using only a normal NR slot when 5G transmission is performed via an MBSFN subframe as shown in the embodiments of FIG. 7 or FIGS. 11A to 11C.

The embodiment illustrates an example in which an NR signal is transmitted in the 12 remaining OFDM symbols since first two OFDM symbols are used for PDCCH transmission of LTE. However, the embodiment may be applicable to the case in which a first OFDM symbol is used for PDCCH transmission of LTE and an NR signal is transmitted in the remaining 13 OFDM symbols.

Similar to a subframe, which is a time unit used for data transmission in LTE, a slot or a mini-slot is defined in NR as a time unit for data transmission. The length of a slot and the number of OFDM symbols may be different for each subcarrier spacing. Up to 60 kHz, the number of OFDM symbols of a slot may be defined to be 7 or 14, or may be defined to be one selected from 7 and 14 based on upper configuration and may be used for data transmission. Beyond 60 kHz, the number of OFDM symbols of a slot may always be defined to be 14. When the number of OFDM symbols of a slot is defined, a terminal may perform data transmission or reception based on the slot according to the defined number of OFDM symbols. When the number of OFDM symbols of a slot is configured by an upper signal, the terminal may perform data transmission or reception based on the slot according to the number of OFDM symbols configured via reception of the upper signal.

When NR transmission is performed using various subcarrier spacings including 15 kHz, based on the frame structure of FIG. 16B, a slot including 7 or 14 OFDM symbols and a partial slot including some OFDM symbols may be supported. The embodiment is the case that does not support the partial slot, and supports only a normal slot including only 7 or 14 OFDM symbols. Therefore, when a slot including 7 or 14 OFDM symbols is not configured, the remaining OFDM symbols may not be used for NR transmission.

Subsequently, a method of defining, or indicating to a terminal, that the normal slot is to be used for NR transmission or reception, will be described. A base station transmits a location where a normal slot starts to a terminal via a signal. The terminal receives the signal, and attempts RS reception, downlink control channel decoding, and data transmission or reception at the location where the normal slot starts. The location of the normal slot may be defined in advance in the standard and may be fixed. Alternatively, the base station transmits an RS and a downlink control channel in only a normal slot, and the terminal may receive the RS and downlink control channel in only the normal slot via blind decoding. The signal indicating the location where the normal slot starts may be defined as follows. The signal may include an offset indicating the location where 5G transmission begins as shown in FIGS. 11A to 11C, and may additionally include an offset indicating the location where the normal slot begins. Alternatively, the signal may be a signal indicating a blank resource, may include first and second OFDM symbols and a partial slot of an MBSFN subframe in which LTE transmission is performed, and may be transmitted to a terminal. The terminal that receives the signal indicating the blank resource may determine that the first and second OFDM symbols and the partial slot of the MBSFN subframe is not used for 5G transmission, and may attempt RS reception, downlink control channel decoding, and data transmission or reception by assuming that a normal slot is transmitted in a resource excluding the blank resource. Alternatively, the signal may include an RS or downlink control channel at the location of a predetermined OFDM symbol of the normal slot.

Subsequently, FIG. 17 illustrates embodiments of slot configurations for NR transmission which support various subcarrier spacings. In the embodiment of FIG. 17, the normal slots of which the number of OFDM symbols is indicated are used for NR transmission, and partial slots of which the number of OFDM symbols is indicated as 0 are not used for NR transmission.

In FIG. 17, diagram 1711 in diagram 1701 is an embodiment of a slot configuration for NR transmission which supports a subcarrier spacing of 15 kHz. "0" of the first section marked by the broken line indicates a partial slot including 5 OFDM symbols, and "7" of the second section marked by the solid line indicates a normal slot including 7 OFDM symbols. Therefore, in the example, only the normal slot including 7 OFDM symbols may be used for NR transmission.

Diagram 1712 in diagram 1702 is an embodiment of a slot configuration for NR transmission which supports a subcarrier spacing of 30 kHz. "0" of the first section marked by the broken line indicates a partial slot including 3 OFDM symbols, and "7" of the second section marked by the solid line indicates a normal slot including 7 OFDM symbols. Therefore, in the example, only the normal slot including 7 OFDM symbols may be used for NR transmission.

Diagram 1713 in diagram 1702 is an embodiment of a slot configuration for NR transmission which supports a subcarrier spacing of 30 kHz. "7" of the first section marked by the solid line indicates a normal slot including 7 OFDM symbols, and "0" of the second section marked by the broken line indicates a partial slot including 3 OFDM symbols. Therefore, in the example, only the normal slot including 7 OFDM symbols may be used for NR transmission.

Diagram 1714 in diagram 1703 is an embodiment of a slot configuration for NR transmission which supports a subcarrier spacing of 60 kHz. "0" of the first section marked by the broken line indicates a partial slot including 6 OFDM symbols, and "14" of the second section marked by the solid line indicates a normal slot including 14 OFDM symbols. Therefore, in the example, only the normal slot including 14 OFDM symbols may be used for NR transmission.

Diagram 1715 in diagram 1703 is an embodiment of a slot configuration for NR transmission which supports a subcarrier spacing of 60 kHz. "14" of the first section marked by the solid line indicates a normal slot including 14 OFDM symbols, and "0" of the second section marked by the broken line indicates a partial slot including 6 OFDM symbols. Therefore, in the example, only the normal slot including 14 OFDM symbols may be used for NR transmission.

Diagram 1716 in diagram 1703 is an embodiment of a slot configuration for NR transmission which supports a subcarrier spacing of 60 kHz. "0" of the first section marked by the broken line indicates a partial slot including 6 OFDM symbols, and "7" of the second section and "7" of the third section marked by the solid line indicate normal slots including 7 OFDM symbols, respectively. Therefore, in the example, only the normal slots including 7 OFDM symbols may be used for NR transmission.

Diagram 1717 in diagram 1703 is an embodiment of a slot configuration for NR transmission which supports a subcarrier spacing of 60 kHz. "7" of the first section and "7" of the second section marked by the solid line indicate normal slots including 7 OFDM symbols, respectively, and "0" of the third section marked by the broken line indicates a partial slot including 6 OFDM symbols. Therefore, in the example, only the normal slots including 7 OFDM symbols may be used for NR transmission.

Diagram 1718 in diagram 1704 is an embodiment of a slot configuration for NR transmission which supports a subcarrier spacing of 120 kHz. "0" of the first section marked by the broken line indicates a partial slot including 12 OFDM symbols, and "14" of the second section and "14" of the third section marked by the solid line indicate normal slots including 14 OFDM symbols, respectively. Therefore, in the example, only the normal slots including 14 OFDM symbols may be used for NR transmission.

Diagram 1719 in diagram 1704 is an embodiment of a slot configuration for NR transmission which supports a subcarrier spacing of 120 kHz. "14" of the first section and "14" of the second section marked by the solid line indicate normal slots including 14 OFDM symbols, respectively, and "0" of the third section marked by the broken line indicates a partial slot including 12 OFDM symbols. Therefore, in the example, only the normal slots including 14 OFDM symbols may be used for NR transmission.

Figure 18A:
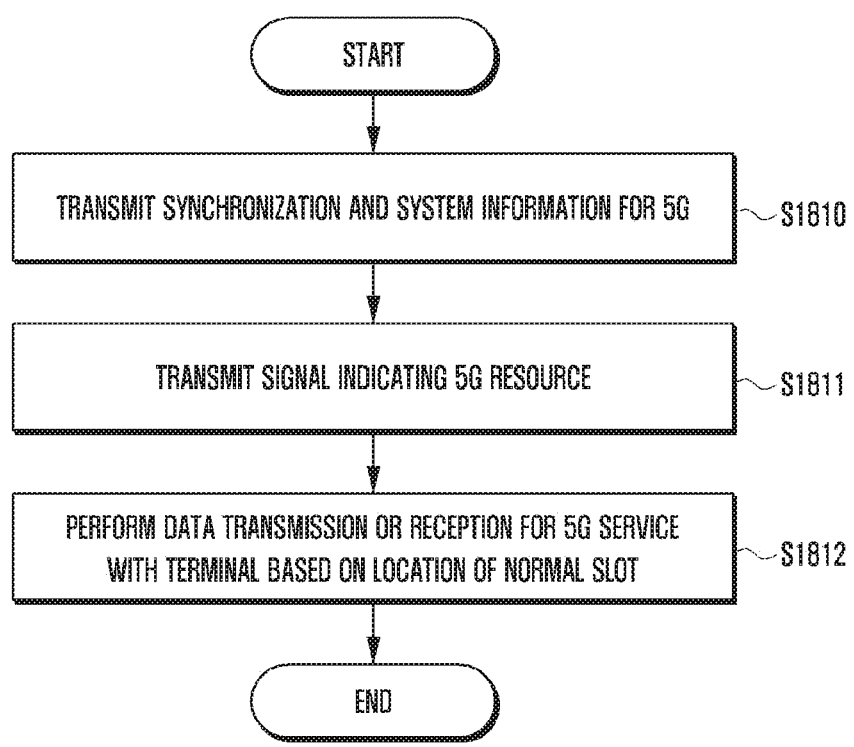
FIGS. 18A and 18B are diagrams illustrating a base station procedure and a terminal procedure according to an embodiment of FIG. 17.
Figure 18B:
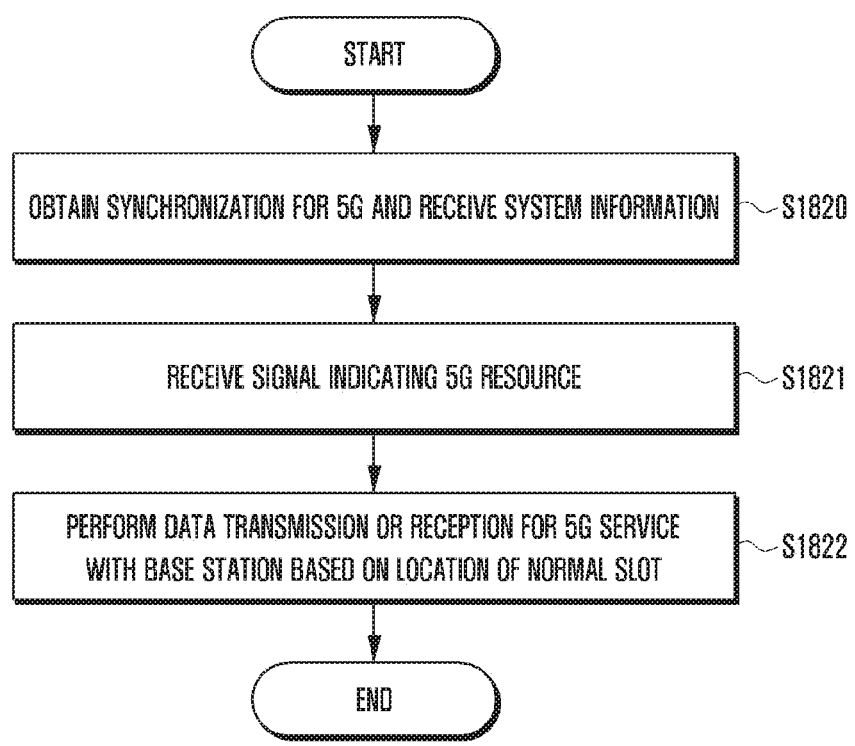

FIGS. 18A and 18B are diagrams illustrating a base station procedure and a terminal procedure according to an embodiment of FIG. 17.

First, referring to FIG. 18A, a 5G base station procedure will be described.

In operation S1810, a 5G base station transmits synchronization and system information for 5G to a 5G-capable terminal in a resource configured for 5G transmission. In the case of 15 kHz, the synchronization signal for 5G may be designed to always be transmitted from a third OFDM. Therefore, this helps erase the effect of whether a subframe for 5G transmission starts from a first OFDM symbol or a third OFDM symbol, when a terminal is synchronized and obtains system information for 5G. Alternatively, in the case of 15 kHz, the synchronization signal for 5G may be designed to always be transmitted from an eighth OFDM. Therefore, this helps erase the effect of whether a subframe for 5G transmission starts from a first OFDM symbol or a third OFDM symbol, when the terminal is synchronized and obtains system information for 5G.

The synchronization signal for 5G may be a synchronization signal different for each of eMBB, mMTC, and URLLC, which use different numerologies, or may be a common synchronization signal transmitted via a predetermined 5G resource using one numerology. Alternatively, a synchronization signal which uses a predetermined numerology for a predetermined frequency domain, for example, a frequency domain less than or equal to 6 GHz or a frequency domain greater than or equal to 6 GHz, and a system signal may be transmitted. The system information may be a common system signal transmitted via a predetermined 5G resource using one numerology, or may be different system information for each of the eMBB, mMTC, and URLLC, which use different numerologies.

In operation S1811, the 5G base station transmits a signal indicating 5G resource allocation to a 5G terminal. When the base station transmits a 5G resource allocation signal to a 5G-capable terminal, the signal may be an upper signal or may be a physical signal. The LTE or 5G resource allocation signal is information indicating where an LTE or 5G resource is located, and may include frequency information (a carrier frequency, a physical resource block, or the like), time information (a radio frame index, a subframe index, MBSFN subframe information for 5G transmission, uplink subframe information for 5G transmission, information on a blank resource which is determined not to be used by 5G terminals for 5G transmission, a signal for directing a terminal to use a normal slot for NR transmission or reception in FIG. 17, or the like), antenna information, spatial information, duplexing information (FDD DL, UL carrier information, TDD UL/DL configuration information, LAA-operation-related information), a signal used for a terminal to recognize, in real time, whether an LTE/5G resource is occupied by transmission of a reference signal or a synchronization signal, or the like. Also, the 5G resource allocation signal may include information indicating whether a 5G resource is an LTE uplink subframe or an LTE MBSFN subframe. Also, the 5G resource allocation signal may include information indicating whether a 5G resource starts from a first OFDM symbol, a second OFDM symbol, or a third OFDM symbol, from the perspective of 15 kHz. Also, the 5G resource allocation signal may include offset information (in 15 kHz) indicating the location where a 5G resource starts in each subframe or each slot. Also, the 5G resource allocation signal may include information indicating whether 12 OFDM symbols or 14 OFDM symbols are to be used for 5G transmission from the perspective of 15 kHz. Synchronization information of an LTE system may be additionally obtained by the 5G-capable terminal, or the value of the difference between LTE synchronization and 5G synchronization may be transmitted by the 5G base station.

When an integrated controller exists, the LTE or 5G resource allocation may be determined by the integrated controller and may be transmitted to the 5G base station via an X2. Therefore, when the LTE system and the 5G system are operated in different resources by dividing resources, the integrated controller may select resource allocation to the LTE system and the 5G system, and may transmit allocation information to the base station via the X2, whereby the resources for the LTE system and the 5G system may be separately used.

When no integrated controller exists, the LTE base station or the 5G base station may select LTE or 5G resource allocation and transmit the same to another base station, as shown in the base station procedure of FIG. 4B.

In operation S1812, the 5G base station may perform transmission or reception of data, control information, and reference signals for a 5G service with a terminal in a slot based on the location of a normal slot according to the embodiment of FIG. 17 and a frame structure associated with a location where a 5G resource starts in the 5G resource (e.g., whether an OFDM symbol where 5G transmission starts is a first OFDM symbol or a third OFDM symbol) or the size that a 5G resource occupies in a single subframe (e.g., whether 5G transmission transmits over 14, 13, or 12 OFDM symbols).

Subsequently, referring to FIG. 18B, a 5G terminal procedure will be described.

In operation S1820, the 5G terminal is synchronized and obtains system information for 5G from a 5G base station. The synchronization signal for 5G may be designed to always be transmitted from a third OFDM. Therefore, this helps erase the effect of whether a subframe for 5G transmission starts from a first OFDM symbol or a third OFDM symbol, when the terminal is synchronized and obtains system information for 5G. Alternatively, in the case of 15 kHz, the synchronization signal for 5G may be designed to always be transmitted from an eighth OFDM. Therefore, this helps erase the effect of whether a subframe for 5G transmission starts from a first OFDM symbol or a third OFDM symbol when the terminal is synchronized and obtains system information for 5G.

The synchronization signal for 5G may be a synchronization signal different for each of eMBB, mMTC, and URLLC, which use different numerologies, or may be a common synchronization signal received via a predetermined 5G resource using one numerology. Alternatively, a synchronization signal which uses a predetermined numerology for a predetermined frequency domain, for example, a frequency domain less than or equal to 6 GHz or a frequency domain greater than or equal to 6 GHz, and a system signal may be transmitted. The system information may be a common system signal received via a predetermined 5G resource using one numerology, or may be different system information for each of eMBB, mMTC, and URLLC, which use different numerologies.

In operation S1821, the 5G terminal may receive a signal indicating 5G resource allocation from the 5G base station. The 5G resource allocation signal may be an upper signal or may be a physical signal. The LTE or 5G resource allocation signal is information indicating where an LTE or 5G resource is located, and may include frequency information (a carrier frequency, a physical resource block, or the like), time information (a radio frame index, a subframe index, MBSFN subframe information for 5G transmission, uplink subframe information for 5G transmission, information on a blank resource which is determined not to be used by 5G terminals for 5G transmission, a signal for directing a terminal to use a normal slot for NR transmission or reception in FIG. 17, or the like), antenna information, spatial information, duplexing information (FDD DL, UL carrier information, TDD UL/DL configuration information, LAA-operation-related information), a signal used for a terminal to recognize, in real time, whether an LTE/5G resource is occupied by transmission of a reference signal or a synchronization signal, or the like. Also, the 5G resource allocation signal may include information indicating whether a 5G resource is an LTE uplink subframe or an LTE MBSFN subframe. Also, the 5G resource allocation signal may include information indicating whether a 5G resource starts from a first OFDM symbol or a third OFDM symbol, from the perspective of 15 kHz. Also, the 5G resource allocation signal may include offset information (in 15 kHz) indicating the location where a 5G resource starts in each subframe or each slot. Also, the 5G resource allocation signal may include information indicating whether 12 OFDM symbols or 14 OFDM symbols are to be used for 5G transmission. Synchronization information of an LTE system may be additionally obtained by the 5G-capable terminal, or the value of the difference between 5G synchronization and LTE synchronization may be received from the 5G base station.

In operation S1822, based on the signal received in operation S1821, the 5G terminal may determine the location where the 5G resource starts in the 5G transmission resource (e.g., whether an OFDM symbol where 5G transmission starts is a first OFDM symbol or a third OFDM symbol) or the size that the 5G resource occupies in a single subframe (e.g., whether 5G transmission is transmitted over 14 or 12 OFDM symbols), may determine the location of a normal slot according to the embodiment of FIG. 17, and may perform transmission or reception of data, control information, and reference signals for a 5G service with a base station in a slot based on a slot structure and a frame structure associated with the determined 5G resource size and the location where the 5G resource starts.

Figure 19:
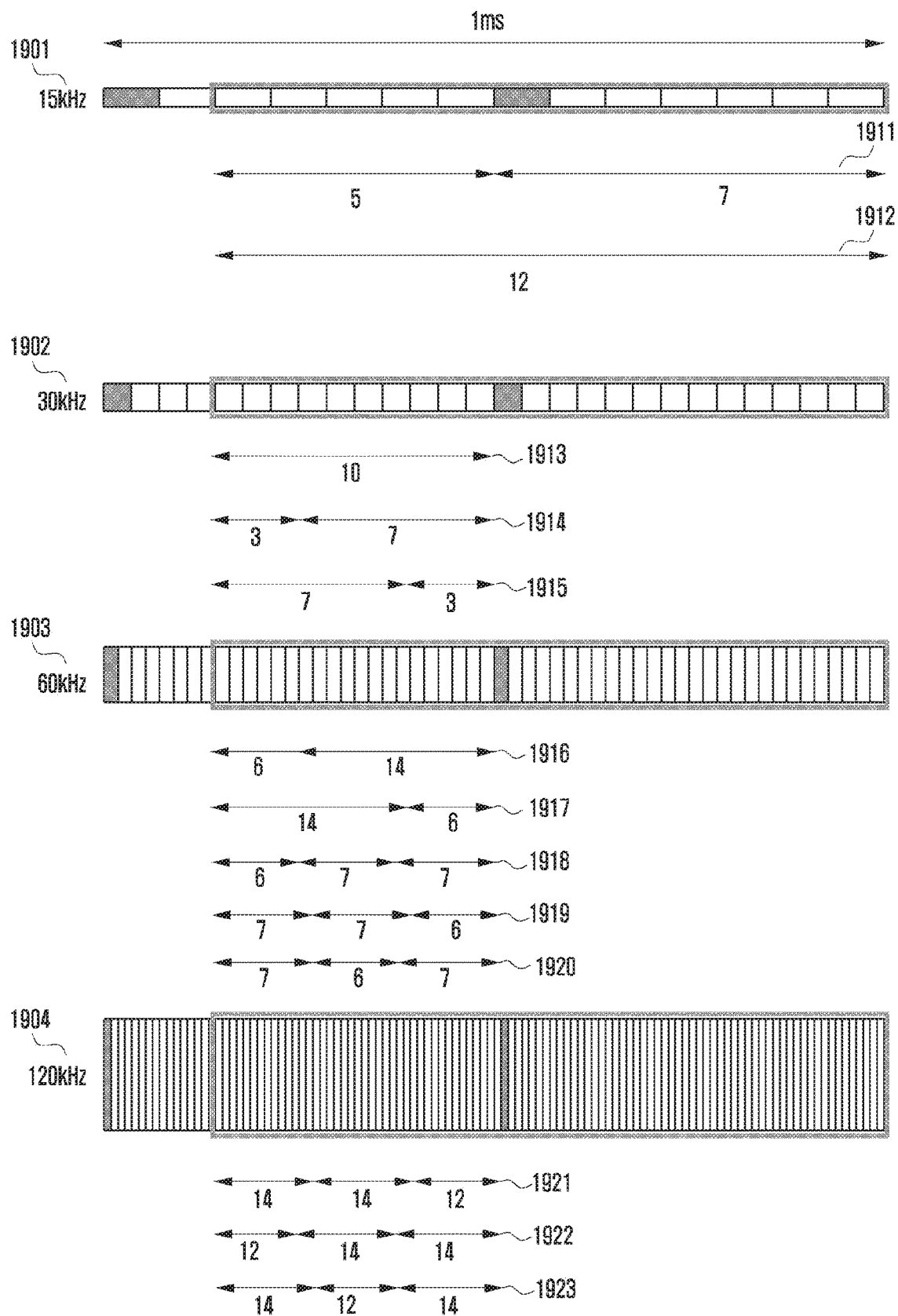
FIG. 19 is a diagram illustrating an embodiment that supports NR transmission via NR slots having various lengths when 5G transmission is performed via an MBSFN subframe.

Subsequently, FIG. 19 is a diagram illustrating an embodiment that supports NR transmission using NR slots having various lengths when 5G transmission is performed via an MBSFN subframe, as shown in the embodiments of FIG. 7 or FIGS. 11A to 11C.

The embodiment illustrates an example in which an NR signal is transmitted in the 12 remaining OFDM symbols since the first two OFDM symbols are used for PDCCH transmission of LTE. However, the embodiment may be applicable to the case in which a first OFDM symbol is used for PDCCH transmission of LTE and an NR signal is transmitted in the remaining 13 OFDM symbols.

Similar to a subframe, which is the time unit used for data transmission in LTE, a slot or a mini-slot is defined in NR as a time unit for data transmission. The length of a slot and the number of OFDM symbols may be different for each subcarrier spacing. Up to 60 kHz, the number of OFDM symbols of a slot may be defined to be 7 or 14, or may be defined to be one selected from 7 and 14 based on an upper configuration, and may be used for data transmission. Beyond 60 kHz, the number of OFDM symbols of a slot is always defined to be 14. When the number of OFDM symbols of a slot is defined, a terminal may perform data transmission or reception based on the slot according to the defined number of OFDM symbols. When the number of OFDM symbols of a slot is configured by an upper signal, the terminal may perform data transmission or reception based on the slot according to the number of OFDM symbols configured via reception of the upper signal.

When NR transmission is performed using various subcarrier spacings, including 15 kHz, based on the frame structure of FIG. 16B, a slot including 7 or 14 OFDM symbols and a partial slot including some OFDM symbols may be supported. The embodiment relates to the case in which a normal slot and a partial slot are supported. Therefore, even though a slot including 7 or 14 OFDM symbols is not configured, an OFDM symbol may not be used for NR transmission.

Subsequently, a method of defining, or indicating to a terminal, that a partial slot and a normal slot are to be used for NR transmission or reception will be described. A base station transmits locations where a partial slot and a normal slot start to a terminal via a signal. The terminal receives the signal and attempts RS reception, downlink control channel decoding, and data transmission or reception at the locations where the partial slot and the normal slot start. The locations of the partial slot and the normal slot are defined in advance in the standard and may be fixed. Alternatively, the base station may transmit an RS and downlink control channel only in a normal slot, and the terminal may receive the RS and downlink control channel only in the normal slot via blind decoding, and a downlink control channel transmitted in the normal slot may perform scheduling of data transmission in a partial slot. The signal indicating the locations of the partial slot and the normal slot may be defined as follows.

The signal may include an offset indicating the location where 5G transmission begins, as shown in FIGS. 11A to 11C, and may additionally include a signal indicating location information of a partial slot and a normal slot. Alternatively, the signal may include an RS or a downlink control channel in a predetermined OFDM symbol of a partial slot or a normal slot (e.g., a first OFDM symbol of the partial slot or a first OFDM symbol of the normal slot).

The transport block size of data transmitted in a partial slot may be smaller than the transport block size of data that may be transmitted in a normal slot. Therefore, a first method of determining the transport block size of data transmitted in a partial slot is to multiply M, which is the transport block size defined to be transmitted in a normal slot, by a scaling factor associated with the number of OFDM symbols of the partial slot and the number of OFDM symbols of the normal slot. That is, if the transport block size of data transmitted in the partial slot is P, $$P=\text{floor}[M*(\text{the number of OFDM symbols of partial slot})/(\text{the number of OFDM symbols of normal slot})].$$

For example, when the transport block size defined to be transmitted in the normal slot is 10000, the number of OFDM symbols of the partial slot is 6, and the number of OFDM symbols of the normal slot is 14, the transport block size of data transmitted in the partial slot may be determined to be floor[10000*6/14]=4285.

A second method of determining the transport block size of data transmitted in a partial slot is to multiply M, which is the number of physical resource blocks included in a normal slot, by a scaling factor associated with the number of OFDM symbols of the partial slot and the number of OFDM symbols of the normal slot, in order to determine the number of physical resource blocks included in the partial slot, and to determine the transport block size based on the physical resource blocks. That is, when the number of physical resource blocks included in the partial slot is P, $$P=\text{floor}[M*(\text{the number of OFDM symbols of partial slot})/(\text{the number of OFDM symbols of normal slot})].$$

For example, when the number of physical resource blocks included in the normal slot is 1000, the number of OFDM symbols of the partial slot is 6, and the number of OFDM symbols of the normal slot is 14, the number of physical resource blocks included in the partial slot may be determined to be floor[1000*6/14]=428.

The transport block size corresponding to the physical resource blocks may be obtained from a table showing the relationship between a physical resource block and a transport block size, which is to be defined in the standard.

Based on the determined transport block size, a base station and a terminal may perform data transmission or reception in the partial slot.

Subsequently, FIG. 19 illustrates embodiments of slot configurations for NR transmission which support various subcarrier spacings. According to the embodiment of FIG. 19, the number of OFDM symbols of a partial slot and the number of OFDM symbols of a normal slot may be marked on each slot.

Diagram 1911 in diagram 1901 is an embodiment of a slot configuration for NR transmission which supports a subcarrier spacing of 15 kHz. "5" in the first section, marked by the solid line, indicates a partial slot including 5 OFDM symbols, and "7" in the second section, marked by the solid line, indicates a normal slot including 7 OFDM symbols. Therefore, in the example, the partial slot and the normal slot may be used for NR transmission.

Diagram 1912 in diagram 1901 is an embodiment of a slot configuration for NR transmission which supports a subcarrier spacing of 15 kHz. "12" in the first section, marked by the solid line, indicates a partial slot including 12 OFDM symbols. Therefore, in the example, the partial slot is used for NR transmission.

Diagram 1713 in diagram 1902 is an embodiment of a slot configuration for NR transmission which supports a subcarrier spacing of 30 kHz. "10" in the first section, marked by the solid line, indicates a partial slot including 10 OFDM symbols. Therefore, in the example, the partial slot including 10 OFDM symbols is used for NR transmission.

Diagram 1914 in diagram 1902 is an embodiment of a slot configuration for NR transmission which supports a subcarrier spacing of 30 kHz. "3" in the first section, marked by the solid line, indicates a partial slot including 3 OFDM symbols. "7" in the second section, marked by the solid line, indicates a normal slot including 7 OFDM symbols, and accordingly, the partial slot and the normal slot are used for NR transmission in the example.

Diagram 1915 in diagram 1902 is an embodiment of a slot configuration for NR transmission which supports a subcarrier spacing of 30 kHz. "7" in the first section, marked by the solid line, indicates a normal slot including 7 OFDM symbols, and "3" in the second section, marked by the solid line, indicates a partial slot including 3 OFDM symbols. Therefore, in the example, the partial slot and the normal slot may be used for NR transmission.

Diagram 1916 in diagram 1903 is an embodiment of a slot configuration for NR transmission which supports a subcarrier spacing of 60 kHz. "6" in the first section, marked by the solid line, indicates a partial slot including 6 OFDM symbols. "14" in the second section, marked by the solid line, indicates a normal slot including 14 OFDM symbols, and accordingly, the partial slot and the normal slot are used for NR transmission in the example.

Diagram 1917 in diagram 1903 is an embodiment of a slot configuration for NR transmission which supports a subcarrier spacing of 60 kHz. "14" in the first section, marked by the solid line, indicates a normal slot including 14 OFDM symbols. "6" in the second section, marked by the solid line, indicates a partial slot including 6 OFDM symbols, and accordingly, the partial slot and the normal slot are used for NR transmission in the example.

Diagram 1918 in diagram 1903 is an embodiment of a slot configuration for NR transmission which supports a subcarrier spacing of 60 kHz. "6" in the first section, marked by the solid line, indicates a partial slot including 6 OFDM symbols, and "7" in the second section and "7" in the third section, marked by the solid line, respectively indicate normal slots including 7 OFDM symbols. Therefore, in the example, the partial slot and the normal slots are used for NR transmission.

Diagram 1919 in diagram 1903 is an embodiment of a slot configuration for NR transmission which supports a subcarrier spacing of 60 kHz. "7" in the first section and "7" in the second section, marked by the solid line, indicate normal slots including 7 OFDM symbols, respectively, and "6" in the third section, marked by the solid line, indicates a partial slot including 6 OFDM symbols. Therefore, in the example, the partial slot and the normal slots are used for NR transmission.

Diagram 1920 in diagram 1903 is an embodiment of a slot configuration for NR transmission which supports a subcarrier spacing of 60 kHz. "7" in the first section and "7" in the third section, marked by the solid line, indicate normal slots including 7 OFDM symbols, respectively, and "6" in the second section, marked by the solid line, indicates a partial slot including 6 OFDM symbols. Therefore, in the example, the partial slot and the normal slots are used for NR transmission.

Diagram 1921 in diagram 1904 is an embodiment of a slot configuration for NR transmission which supports a subcarrier spacing of 120 kHz. "14" in the first section and "14" in the second section, marked by the solid line, indicate normal slots including 14 OFDM symbols, respectively, and "12" in the third section, marked by the solid line, indicates a partial slot including 12 OFDM symbols. Therefore, in the example, the partial slot and the normal slots are used for NR transmission.

Diagram 1922 in diagram 1904 is an embodiment of a slot configuration for NR transmission which supports a subcarrier spacing of 120 kHz. "14" in the second section and "14" in the third section, marked by the solid line, indicate normal slots including 14 OFDM symbols, respectively, and "12" in the first section, marked by the solid line, indicates a partial slot including 12 OFDM symbols. Therefore, in the example, only the normal slots including 14 OFDM symbols may be used for NR transmission.

Diagram 1923 in diagram 1904 is an embodiment of a slot configuration for NR transmission which supports a subcarrier spacing of 120 kHz. "14" in the first section and "14" in the third section, marked by the solid line, indicate normal slots including 14 OFDM symbols, respectively, and "12" in the second section, marked by the solid line, indicates a partial slot including 12 OFDM symbols. Therefore, in the example, only the normal slots including 14 OFDM symbols may be used for NR transmission.

Figure 20A:
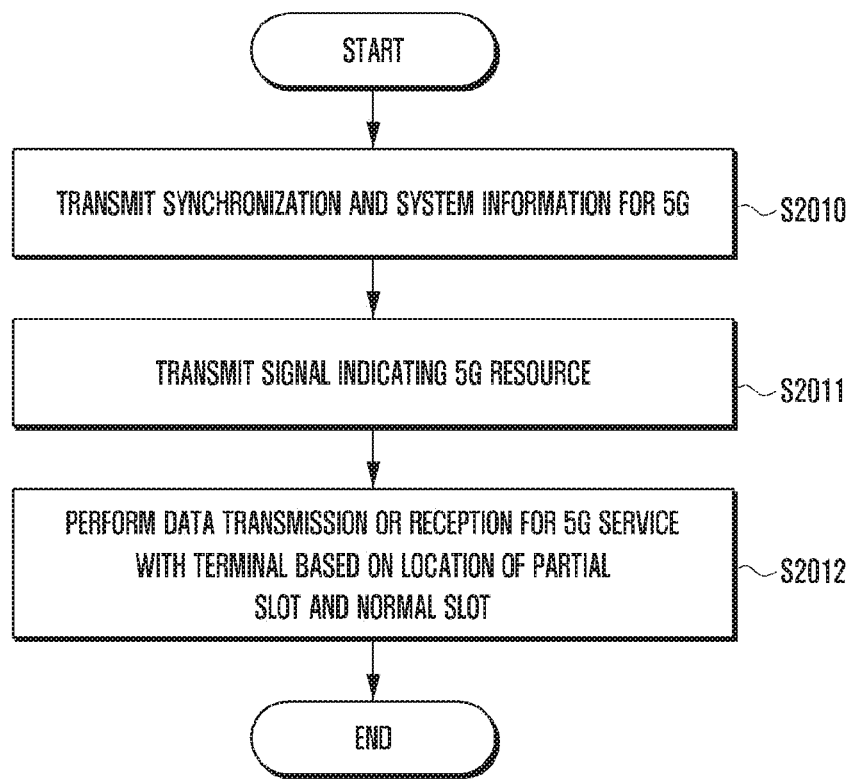
FIGS. 20A and 20B are diagrams illustrating a base station procedure and a terminal procedure according to an embodiment of FIG. 19.
Figure 20B:
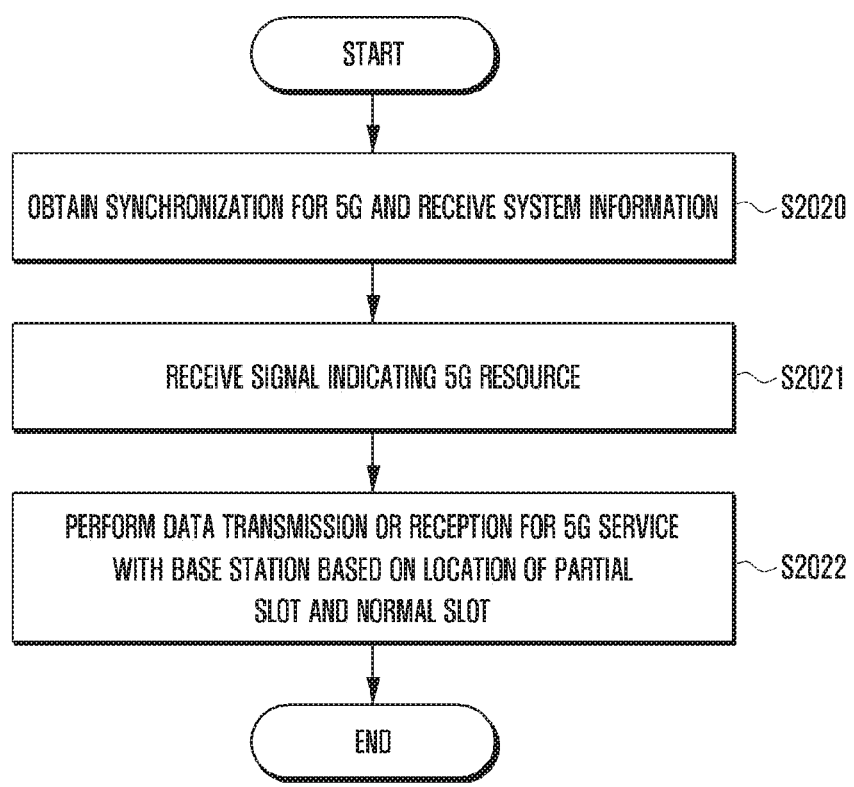

FIGS. 20A and 20B are diagrams illustrating a base station procedure and a terminal procedure according to an embodiment of FIG. 19.

First, referring to FIG. 20A, a 5G base station procedure will be described.

In operation S2010, a 5G base station transmits synchronization and system information for 5G to a 5G-capable terminal in a resource configured for 5G transmission. In the case of 15 kHz, the synchronization signal for 5G may be designed to always be transmitted from a third OFDM. Therefore, that may help erase the effect of whether a subframe for 5G transmission starts from a first OFDM symbol, a second OFDM symbol, or a third OFDM symbol when the terminal is synchronized and obtains system information for 5G. Alternatively, in the case of 15 kHz, the synchronization signal for 5G may be designed to always be transmitted from an eighth OFDM. Therefore, that may help erase the effect of whether a subframe for 5G transmission starts from a first OFDM symbol, a second OFDM symbol, or a third OFDM symbol when the terminal is synchronized and obtains system information for 5G.

The synchronization signal for 5G may be a synchronization signal different for each of eMBB, mMTC, and URLLC, which use different numerologies, or may be a common synchronization signal transmitted via a predetermined 5G resource using one numerology. Alternatively, a synchronization signal which uses a predetermined numerology for a predetermined frequency domain, for example, a frequency domain less than or equal to 6 GHz or a frequency domain greater than or equal to 6 GHz, and a system signal may be transmitted. The system information may be a common system signal transmitted via a predetermined 5G resource using one numerology, or may be different system information for each of eMBB, mMTC, and URLLC, which use different numerologies.

In operation S2011, the 5G base station transmits a signal indicating 5G resource allocation to a 5G terminal. When a 5G resource allocation signal is transmitted to a 5G-capable terminal, the signal may be an upper signal or may be a physical signal. The LTE or 5G resource allocation signal is information indicating where an LTE or 5G resource is located, and may include frequency information (a carrier frequency, a physical resource block, or the like), time information (a radio frame index, a subframe index, MBSFN subframe information for 5G transmission, uplink subframe information for 5G transmission, information on a blank resource which is determined not to be used by 5G terminals for 5G transmission, a signal for directing a terminal to use a partial slot and a normal slot for NR transmission or reception in FIG. 19, or the like), antenna information, spatial information, duplexing information (FDD DL, UL carrier information, TDD UL/DL configuration information, LAA-operation-related information), a signal used for a terminal to recognize, in real time, whether an LTE/5G resource is occupied by transmission of a reference signal or a synchronization signal, or the like. Also, the 5G resource allocation signal may include information indicating whether a 5G resource is an LTE uplink subframe or an LTE MBSFN subframe. Also, the 5G resource allocation signal may include information indicating whether a 5G resource starts from a first OFDM symbol or a third OFDM symbol from the perspective of 15 kHz. Also, the 5G resource allocation signal may include offset information (in 15 kHz) indicating the location where a 5G resource starts in each subframe or each slot. Also, the 5G resource allocation signal may include information indicating whether 12 OFDM symbols or 14 OFDM symbols are to be used for 5G transmission from the perspective of 15 kHz. Synchronization information of an LTE system may be additionally obtained by the 5G-capable terminal, or the value of the difference between LTE synchronization and 5G synchronization may be transmitted by the 5G base station.

When an integrated controller exists, the LTE or 5G resource allocation may be determined by the integrated controller, and may be transmitted to the 5G base station via an X2. Therefore, when the LTE system and the 5G system are operated using different resources by dividing resources, the integrated controller may select resource allocation to the LTE system and the 5G system, and may transmit allocation information to the base station via the X2, whereby the resources for the LTE system and the 5G system may be separately used.

When no integrated controller exists, the LTE base station or the 5G base station may select LTE or 5G resource allocation and transmit the same to another base station, as shown in the base station procedure of FIG. 4B.

In operation S2012, the 5G base station may perform transmission or reception of data, control information, and reference signals for a 5G service with a terminal in a slot based on the locations of a partial slot and a normal slot according to the embodiment of FIG. 19 and a frame structure associated with a location where a 5G resource starts in the 5G resource (e.g., whether an OFDM symbol where 5G transmission starts is a first OFDM symbol or a third OFDM symbol), or the size that a 5G resource occupies in a single subframe (e.g., whether 5G transmission transmits over 14, 13, or 12 OFDM symbols).

Subsequently, referring to FIG. 20B, a 5G terminal procedure will be described.

In operation S2020, the 5G terminal is synchronized and obtains system information for 5G from a 5G base station. The synchronization signal for 5G may be designed to always be transmitted from a third OFDM. Therefore, this helps erase the effect of whether a subframe for 5G transmission starts from a first OFDM symbol, a second OFDM symbol, or a third OFDM symbol when the terminal is synchronized and obtains system information for 5G. Alternatively, in the case of 15 kHz, the synchronization signal for 5G may be designed to always be transmitted from an eighth OFDM. Therefore, this may help erase the effect of whether a subframe for 5G transmission starts from a first OFDM symbol, a second OFDM symbol, or a third OFDM symbol when the terminal is synchronized and obtains system information for 5G.

The synchronization signal for 5G may be a synchronization signal different for each of eMBB, mMTC, and URLLC, which use different numerologies, or may be a common synchronization signal transmitted via a predetermined 5G resource using one numerology. Alternatively, a synchronization signal which uses a predetermined numerology for a predetermined frequency domain, for example, a frequency domain less than or equal to 6 GHz or a frequency domain greater than or equal to 6 GHz, and a system signal may be transmitted. The system information may be a common system signal received via a predetermined 5G resource using one numerology, or may be different system information for each of the eMBB, mMTC, and URLLC, which use different numerologies.

In operation S2021, the 5G terminal may receive a signal indicating 5G resource allocation from the 5G base station. The 5G resource allocation signal may be an upper signal or may be a physical signal. The LTE or 5G resource allocation signal is information indicating where an LTE or 5G resource is located, and may include frequency information (a carrier frequency, a physical resource block, or the like), time information (a radio frame index, a subframe index, MBSFN subframe information for 5G transmission, uplink subframe information for 5G transmission, information on a blank resource which is determined not to be used by 5G terminals for 5G transmission, a signal for directing a terminal to use a partial slot and a normal slot for NR transmission or reception in FIG. 19, or the like), antenna information, spatial information, duplexing information (FDD DL, UL carrier information, TDD UL/DL configuration information, LAA-operation-related information), a signal used for a terminal to recognize, in real time, whether an LTE/5G resource is occupied by transmission of a reference signal or a synchronization signal, or the like. Also, the 5G resource allocation signal may include information indicating whether a 5G resource is an LTE uplink subframe or an LTE MBSFN subframe. Also, the 5G resource allocation signal may include information indicating whether a 5G resource starts from a first OFDM symbol, a second OFDM symbol, or a third OFDM symbol from the perspective of 15 kHz. Also, the 5G resource allocation signal may include offset information (in 15 kHz) indicating the location where a 5G resource starts in each subframe or each slot. Also, the 5G resource allocation signal may include information indicating whether 12 OFDM symbols, 13 OFDM symbols, or 14 OFDM symbols are to be used for 5G transmission. Synchronization information of an LTE system may be additionally obtained by the 5G-capable terminal, or the value of the difference between 5G synchronization and LTE synchronization may be received from the 5G base station.

In operation S2022, based on the signal received in FIG. 2021, the 5G terminal may determine the location where the 5G resource starts in the 5G transmission resource (e.g., whether an OFDM symbol where 5G transmission starts is a first OFDM symbol, a second OFDM symbol, or a third OFDM symbol) or the size that the 5G resource occupies in a single subframe (e.g., whether 5G transmission is transmitted over 14, 13, or 12 OFDM symbols), may determine the locations of a partial slot and a normal slot according to the embodiment of FIG. 19, and may perform transmission or reception of data, control information, and reference signals for a 5G service with a base station in a slot based on a slot structure and a frame structure associated with the determined 5G resource size and the location where the 5G resource starts.

Figure 21:
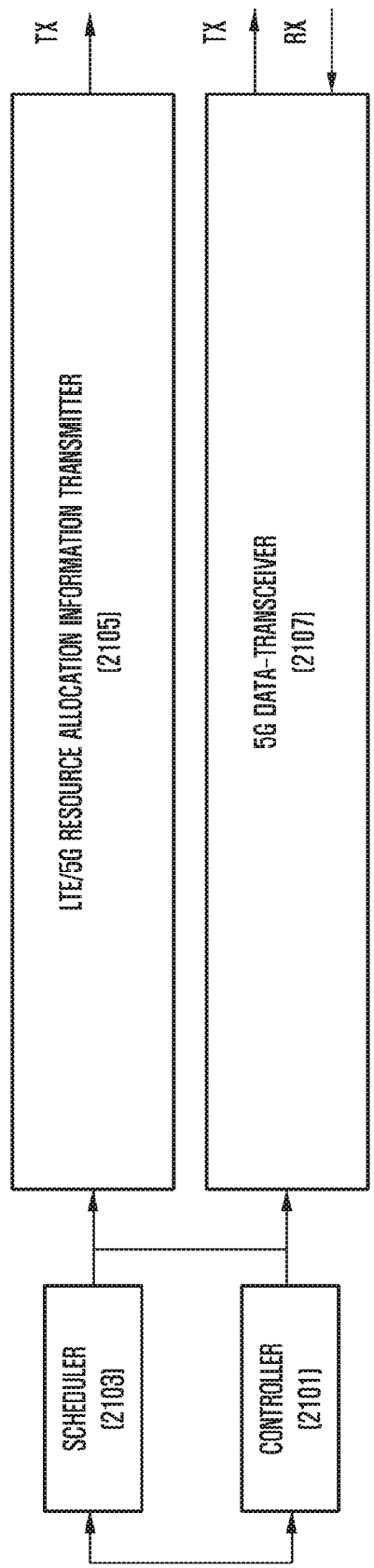
FIG. 21 is a diagram of a base station device according to the disclosure.

Subsequently, FIG. 21 is a diagram illustrating a base station according to the disclosure.

A controller 2101 controls LTE/5G resource allocation according to a base station procedure described with reference to FIGS. 3B, 4B, 5B, 11B, 14A, 18A, and 20A, and an LTE/5G division operating method described with reference to FIGS. 6, 7, 8, 9, 10, 11A, 12, 17, and 19, performs transmission to a terminal or another base station via an LTE/5G resource allocation information transmitter 2105, performs scheduling 5G data in the 5G resource using a scheduler 2103, and performs 5G data transmission or reception with a 5G terminal via a 5G data-transceiver 2107.

Figure 22:
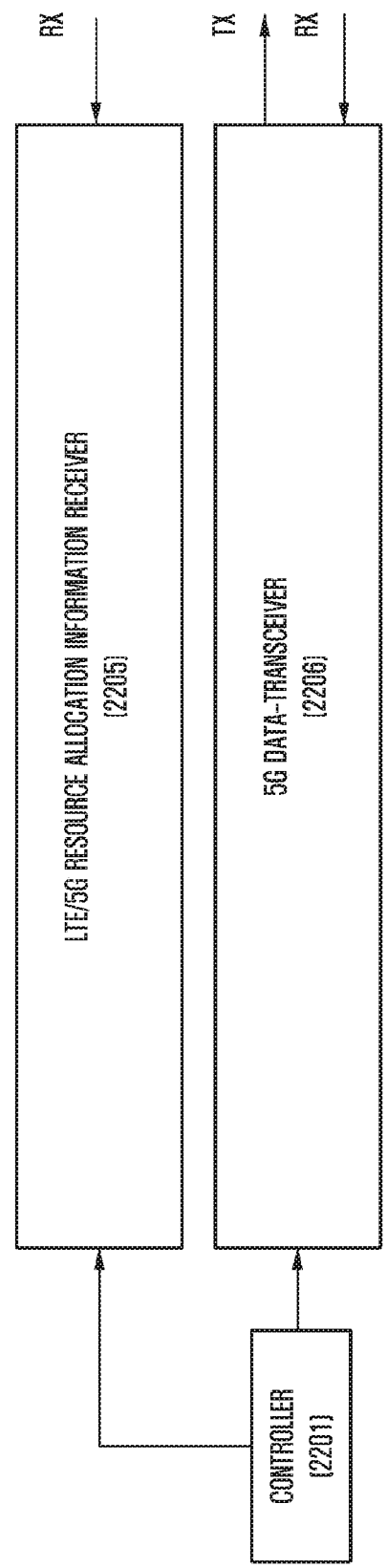
FIG. 22 is a diagram of a terminal device according to the disclosure.

Subsequently, FIG. 22 is a diagram illustrating a terminal device according to the disclosure.

According to a terminal procedure described with reference to FIGS. 3C, 4C, 5C, 11C, 18B, and 20B and an LTE/5G division operating method described with reference to FIGS. 6, 7, 8, 9, 11A, 12, 17, and 19, an LTE/5G resource allocation information receiver 2205 may receive LTE/5G resources allocated from a base station, and a controller 2201 may perform transmission or reception of 5G data, which is scheduled in the allocated 5G resource, with a 5G base station via a 5G data-transceiver 2206.

The embodiments disclosed in the specifications and drawings are provided merely to readily describe and to help a thorough understanding of the disclosure but are not intended to limit the scope of the disclosure. Therefore, it should be construed that, in addition to the embodiments disclosed herein, all modifications and changes or modified and changed forms derived from the technical idea of the disclosure fall within the scope of the disclosure.

The invention claimed is:

1. A method performed by a first base station supporting a first radio access technology (RAT) in a wireless communication system, the method comprising:

identifying first resources for a reference signal (RS) of the first RAT and a second resource not to be used for a data transmission of the first RAT; and transmitting, to a second base station supporting a second RAT, which is different from the first RAT, via an X2 interface between the first base station and the second base station, a message including resource allocation information for coordinating resources between the first base station and the second base station, the resource allocation information including first information associated with the first resources and second information on the second resource, wherein the second information includes information associated with a physical resource block for the second resource, wherein the first RAT is for a long term evolution (LTE) communication system, wherein the second RAT is for a new radio (NR) communication system, and wherein the first base station shares a spectrum with the second base station.

2. The method of claim 1, wherein the first information indicates a timing of receiving the first resources for the RS, the timing being indicated by a system frame number.

3. The method of claim 1, wherein a higher layer signaling including configuration information associated with resources for the first RAT is transmitted to a terminal, and wherein the configuration information includes multicast broadcast single frequency network (MBSFN) subframe configuration information, carrier frequency information for the first RAT, and RS related information for the first RAT.

4. A method performed by a second base station supporting a second radio access technology (RAT) in a wireless communication system, the method comprising:

receiving, from a first base station supporting a first RAT, which is different from the second RAT, via an X2 interface between the second base station and the first base station, a message including resource allocation information for coordinating resources between the first base station and the second base station, the resource allocation information including first information associated with first resources for a reference signal (RS) of the first RAT and second information on a second resource not to be used for a data transmission of the first RAT; and identifying resource allocation of the first base station based on the resource allocation information and the second resource not to be used for the data transmission of the first RAT based on the second information, wherein the second information includes information associated with a physical resource block for the second resource, wherein the first RAT is for a long term evolution (LTE) communication system, wherein the second RAT is for a new radio (NR) communication system, and wherein the second base station shares a spectrum with the first base station.

5. The method of claim 4, wherein the first information indicates a timing of receiving the first resources for the RS, the timing being indicated by a system frame number.

6. The method of claim 4, further comprising transmitting, to a terminal, a higher layer signaling including configuration information associated with resources for the first RAT, wherein the configuration information includes multicast broadcast single frequency network (MBSFN) subframe configuration information, carrier frequency information for the first RAT, and RS related information for the first RAT.

7. A first base station supporting a first radio access technology (RAT) in a wireless communication system, the first base station comprising:
a transceiver configured to transmit and receive a signal; and
a controller coupled with the transceiver and configured to:
identify first resources for a reference signal (RS) of the first RAT and a second resource not to be used for a data transmission of the first RAT, and
transmit, to a second base station supporting a second RAT, which is different from the first RAT, via an X2 interface between the first base station and the second base station, a message including resource allocation information for coordinating resources between the first base station and the second base station, the resource allocation information including first information associated with the first resources and second information on the second resource,
wherein the second information includes information associated with a physical resource block for the second resource,
wherein the first RAT is for a long term evolution (LTE) communication system,
wherein the second RAT is for a new radio (NR) communication system, and
wherein the first base station shares a spectrum with the second base station.

8. The first base station of claim 7, wherein the first information indicates a timing of receiving the first resources for the RS, the timing being indicated by a system frame number.

9. The first base station of claim 7, wherein a higher layer signaling including configuration information associated with resources for the first RAT is transmitted to a terminal, and
wherein the configuration information includes multicast broadcast single frequency network (MBSFN) subframe configuration information, carrier frequency information for the first RAT, and RS related information for the first RAT.

10. A second base station supporting a second radio access technology (RAT) in a wireless communication system, the second base station comprising:
a transceiver configured to transmit and receive a signal; and
a controller coupled with the transceiver and configured to:
receive, from a first base station supporting a first RAT, which is different from the second RAT, via an X2 interface between the second base station and the first base station, a message including resource allocation information for coordinating resources between the first base station and the second base station, the resource allocation information including first information associated with first resources for a reference signal (RS) of the first RAT and second information on a second resource not to be used for a data transmission of the first RAT, and
identify resource allocation of the first base station based on the resource allocation information and the second resource not to be used for the data transmission of the first RAT based on the second information,
wherein the second information includes information associated with a physical resource block for the second resource,
wherein the first RAT is for a long term evolution (LTE) communication system,
wherein the second RAT is for a new radio (NR) communication system, and
wherein the second base station shares a spectrum with the first base station.

11. The second base station of claim 10, wherein the first information indicates a timing of receiving the first resources for the RS, the timing being indicated by a system frame number.

12. The second base station of claim 10, wherein the controller is further configured to transmit, to a terminal, a higher layer signaling including configuration information associated with resources for the first RAT, and
wherein the configuration information includes multicast broadcast single frequency network (MBSFN) subframe configuration information, carrier frequency information for the first RAT, and RS related information for the first RAT.

* * * * *